US012437605B2

(12) United States Patent
Lockheed

(10) Patent No.: US 12,437,605 B2
(45) Date of Patent: Oct. 7, 2025

(54) SPACE-EFFICIENT HOLD-AND-SPIN FEATURE GAME GRAPHICAL USER INTERFACE

(71) Applicant: Aristocrat Technologies, Inc., Las Vegas, NV (US)

(72) Inventor: Kelly Lockheed, Elkridge, MD (US)

(73) Assignee: Aristocrat Technologies, Inc., Las Vegas, NV (US)

(*) Notice: Subject to any disclaimer, the term of this patent is extended or adjusted under 35 U.S.C. 154(b) by 289 days.

(21) Appl. No.: 18/301,892

(22) Filed: Apr. 17, 2023

(65) Prior Publication Data

US 2024/0346875 A1 Oct. 17, 2024

(51) Int. Cl.
*G07F 17/32* (2006.01)

(52) U.S. Cl.
CPC ........ *G07F 17/3213* (2013.01); *G07F 17/326* (2013.01); *G07F 17/3267* (2013.01)

(58) Field of Classification Search
None
See application file for complete search history.

(56) References Cited

U.S. PATENT DOCUMENTS

2018/0061174 A1 3/2018 Boese
2019/0304244 A1 10/2019 Kennedy
2020/0202664 A1* 6/2020 Mizue ................. G07F 17/3246
2021/0264742 A1* 8/2021 Rucker ................... G07F 17/34
2021/0390821 A1* 12/2021 Hawkins ............. G07F 17/3213
2022/0277616 A1 9/2022 Ceniceroz

* cited by examiner

*Primary Examiner* — Jason T Yen
(74) *Attorney, Agent, or Firm* — Weaver Austin Villeneuve & Sampson LLP

(57) ABSTRACT

A graphical user interface for providing a game of chance with a hold-and-spin feature game mechanic in a format that features a smaller number of reels than is provided in typical hold-and-spin games. The graphical interface is configured to nevertheless provide a hold-and-spin gameplay experience similar to that found in hold-and-spin games having a larger number of reels.

20 Claims, 38 Drawing Sheets

| Permutation | # of Symbol Positions per Column | | |
|---|---|---|---|
| | Left Column | Middle Column | Right Column |
| 1 | 3 | 3 | 3 |
| 2 | 3 | 3 | 4 |
| 3 | 3 | 3 | 5 |
| 4 | 3 | 4 | 3 |
| 5 | 3 | 4 | 4 |
| 6 | 3 | 4 | 5 |
| 7 | 4 | 3 | 3 |
| 8 | 4 | 3 | 4 |
| 9 | 4 | 3 | 5 |
| 10 | 4 | 4 | 3 |
| 11 | 4 | 4 | 4 |
| 12 | 4 | 4 | 5 |
| 13 | 5 | 3 | 3 |
| 14 | 5 | 3 | 4 |
| 15 | 5 | 3 | 5 |
| 16 | 5 | 4 | 3 |
| 17 | 5 | 4 | 4 |
| 18 | 5 | 4 | 5 |

FIG. 33

| L/M/R Symbol Position Count | Set 1 | Set 2 | Set 3 | ... | Set X-2 | Set X-1 | Set X |
|---|---|---|---|---|---|---|---|
| 3/3/3 | 100 | 50 | 100 | ... | 0 | 0 | 0 |
| 3/3/4 | 10 | 60 | 100 | ... | 0 | 0 | 0 |
| 3/3/5 | 0 | 0 | 20 | ... | 0 | 0 | 0 |
| 3/4/3 | 10 | 60 | 0 | ... | 0 | 0 | 0 |
| 3/4/4 | 0 | 0 | 0 | ... | 0 | 0 | 0 |
| 3/4/5 | 0 | 0 | 0 | ... | 0 | 0 | 0 |
| 4/3/3 | 10 | 60 | 0 | ... | 0 | 0 | 0 |
| 4/3/4 | 0 | 0 | 0 | ... | 0 | 0 | 0 |
| 4/3/5 | 0 | 0 | 0 | ... | 0 | 0 | 0 |
| 4/4/3 | 0 | 0 | 0 | ... | 0 | 0 | 0 |
| 4/4/4 | 0 | 0 | 0 | ... | 0 | 0 | 0 |
| 4/4/5 | 0 | 0 | 0 | ... | 0 | 0 | 0 |
| 5/3/3 | 0 | 0 | 0 | ... | 40 | 30 | 20 |
| 5/3/4 | 0 | 0 | 0 | ... | 50 | 10 | 10 |
| 5/3/5 | 0 | 0 | 0 | ... | 40 | 40 | 0 |
| 5/4/3 | 0 | 0 | 0 | ... | 20 | 25 | 45 |
| 5/4/4 | 0 | 0 | 0 | ... | 70 | 10 | 5 |
| 5/4/5 | 0 | 0 | 0 | ... | 60 | 15 | 10 |

FIG. 34

| A | B | C | D | E | F | G | H | I | J | K | L | M | N | O | P | Q | R | S | T | U | V |
|---|---|---|---|---|---|---|---|---|---|---|---|---|---|---|---|---|---|---|---|---|---|
| | No Symbol Positions Added to Left Column Since Feature Game Initiated | | | | | | | | | | | | One or More Symbol Positions Added to Left Column Since Feature Game Initiated | | | | | | | | |
| | 3 Symbol Positions | | | 4 Symbol Positions | | | | 5 Symbol Positions | | | | | 4 Symbol Positions | | | | 5 Symbol Positions | | | | |
| | 0 | 1 | 2 | 0 | 1 | 2 | 3 | 0 | 1 | 2 | 3 | 4 | 0 | 1 | 2 | 3 | 0 | 1 | 2 | 3 | 4 |
| # | 0 Held Symbols | 1 Held Symbol | 2 Held Symbols | 0 Held Symbols | 1 Held Symbol | 2 Held Symbols | 3 Held Symbols | 0 Held Symbols | 1 Held Symbol | 2 Held Symbols | 3 Held Symbols | 4 Held Symbols | 0 Held Symbols | 1 Held Symbol | 2 Held Symbols | 3 Held Symbols | 0 Held Symbols | 1 Held Symbol | 2 Held Symbols | 3 Held Symbols | 4 Held Symbols |
| 1 | O | O | O | O | O | O | O | O | O | O | O | O | O | O | O | O | O | O | O | O | O |
| 2 | O | O | O | X | O | O | O | O | O | O | O | O | O | O | O | O | X | O | O | O | O |
| 3 | X | X | O | O | O | O | O | O | O | O | O | O | X | O | O | O | O | O | O | O | O |
| 4 | O | O | O | O | X | O | O | O | O | O | O | O | O | O | O | O | O | O | O | O | O |
| 5 | X | O | X | O | O | O | O | O | O | O | O | O | O | O | O | O | O | X | O | O | O |
| 6 | O | O | O | O | O | X | O | O | O | O | O | O | O | O | O | O | O | O | O | O | O |
| 7 | O | O | O | X | X | O | O | O | O | O | O | O | O | X | O | O | O | O | O | O | O |
| 8 | X | X | O | O | O | O | X | O | O | O | O | O | O | O | O | O | O | O | O | O | O |
| 9 | X | O | O | O | O | O | O | O | X | O | O | O | O | O | O | O | O | O | O | O | O |
| 10 | O | O | O | O | O | O | O | X | O | X | X | O | O | O | O | X | O | O | X | O | O |
| ... | ... | ... | ... | ... | ... | ... | ... | ... | ... | ... | ... | ... | ... | ... | ... | ... | ... | ... | ... | ... | ... |

FIG. 35

| First Wheel Segments | 1 spin | 2 spins | 3 spins |
|---|---|---|---|
| 50 | 30 | 25 | 20 |
| 75 | 20 | 15 | 10 |
| 100 | 15 | 10 | 5 |
| 150 | 10 | 5 | 3 |
| Next Phase | 5 | 5 | 3 |
| Next Phase | 5 | 5 | 3 |

| Second Wheel Segments | 1 spin | 2 spins | 3 spins |
|---|---|---|---|
| 200 | 40 | 35 | 15 |
| 200 | 40 | 35 | 15 |
| 250 | 20 | 15 | 15 |
| 250 | 20 | 15 | 15 |
| MINI | 10 | 5 | 2 |
| MINI | 10 | 5 | 2 |
| MINOR | 5 | 5 | 2 |
| Next Phase | 5 | 5 | 2 |

| Third Wheel Segments | 1 spin | 2 spins | 3 spins |
|---|---|---|---|
| 500 | 15 | 20 | 10 |
| 750 | 15 | 20 | 10 |
| 1000 | 15 | 15 | 10 |
| 1250 | 15 | 15 | 10 |
| 1500 | 15 | 15 | 10 |
| 2000 | 15 | 10 | 5 |
| 2500 | 15 | 10 | 5 |
| 5000 | 15 | 10 | 5 |
| MAJOR | 2 | 2 | 1 |
| MAJOR | 2 | 2 | 1 |
| GRAND | 1 | 1 | 1 |
| GRAND | 1 | 1 | 1 |

FIG. 36

SPACE-EFFICIENT HOLD-AND-SPIN FEATURE GAME GRAPHICAL USER INTERFACE

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some games of chance, e.g., slot-type games, there may be certain symbols that, when displayed (or when at least a certain number of them are displayed) as part of a game outcome cause awards specific to each such symbol to be awarded to the player. Such symbols are typically referred to as "cash-on-reel" symbols.

SUMMARY

Some games of chance may include a base game in which players try and obtain winning combinations of symbols, e.g., a winning combination of symbols along a payline. In some such games of chance, there may be a specified number of paylines, and only combinations of symbols that occur along one or more such paylines may be considered to potentially be winning patterns. In other games of chance, any combination of a displayed symbol from each of the reels may be considered to potentially be a winning pattern. For example, for a 5-reel slot machine game in which each reel has three symbol positions in which to display symbols, there may be 3 to the $5^{th}$ power, i.e., 243, potential combinations of symbols drawn from the three symbols displayed by each reel. In other words, for a slot game with 5 reels, each showing symbols in three symbol positions in a game outcome, there are 243 paylines covering all possible 5-symbol combinations involving one symbol from each reel. The winning symbol combinations that may be obtained along such paylines may result in an award of credits or other items to a player that obtains such winning symbol combinations.

In some such games of chance, there may be a feature game that may be triggerable from the base game. There are a multitude of different feature games that may be used for this purpose, but one popular feature game is a hold-and-spin feature game. In a typical hold-and-spin feature game, each play of the feature game results in one or more symbols being newly selected for display in symbol positions that do not already have a symbol of a particular type displayed therein. For example, if the particular type of symbol is a cash-on-reel (COR) symbol, each COR symbol that is shown in one of the symbol positions during the feature game may be "held" in place during the next play of the feature game. Thus, only the symbols shown in the symbol positions without COR symbols would see a change in the symbols displayed during a play of the feature game.

When such a feature game is initiated for a player, the player receives a set number, e.g., three, spins or plays of the feature game. The number of plays of the feature game is decremented by one for each play of the feature game engaged in by the player. However, if a play of the feature game results in presentation of a symbol of the particular type of symbol, e.g., a COR symbol, that is to be "held" in place (and which was not displayed by virtue of having been "held" in place from a previous play of the feature game), the number of plays of the feature game may be reset or adjusted to a higher number. For example, in some implementations, each time there is a feature game play in which one or more COR symbols are displayed in symbol positions that did not have such COR symbols displayed after the game play that occurred immediately prior to the current game play, the number of plays remaining that the player may have may be reset to three.

Such feature games may end either when the number of plays remaining reaches zero (and no additional symbol of the particular type of symbol is shown as a result of the last feature game play) or when all of the symbol positions have symbols of the particular type of symbol shown. When the feature game ends, the player may, in some cases, be awarded with one or more prizes. In some instances, such prizes may include credit or point awards that are commensurate with values associated with the symbols having the particular symbol type. For example, symbols that are COR symbols may each have a numeric value associated therewith; such values may be pre-assigned to the COR symbols or may be randomly assigned to a COR symbol at the time that the COR symbol is displayed.

Such feature game GUIs may be less effective when displayed on some displays—particularly small-format displays such as smartphone displays. For example, such displays may, when presenting such a feature game having a larger number of symbol columns, e.g., five symbol columns, require that the size of the displayed symbols be reduced such that it is more difficult for a player to discern what the symbols are.

The present disclosure is directed at games of chance featuring a hold-and-spin feature game that operates in a different manner—one that makes the game of chance GUIs discussed herein better tailored for use with devices featuring a limited screen size and/or screen dimensions in which the screen is larger in the vertical direction than the horizontal, e.g., smartphone screens when oriented in portrait mode. The GUIs discussed herein generally accomplish this by displaying a smaller number of reels than is typically displayed in such games of chance. However, the manner in which the GUI is manipulated in the base game and in the feature game provides a gameplay experience that is different from the typical base game/hold-and-spin feature game experience discussed above. Such differences offset the limitations of a more limited number of reels being used in such GUIs.

In particular, the GUIs of the present disclosure may feature a set of N columns of symbol positions (each column may, for example, represent a reel that is spun (virtually) during a base game play to select a plurality of symbols that are then displayed in the symbol positions associated therewith. In one example GUI, the number N may be three, although it will be understood that other implementations may feature a different number of columns. Generally speaking, it may be desirable to have an odd number of columns, but this is not a requirement, and even numbers of columns may also be used. In the context of a smartphone display, however, a GUI with three columns of symbol positions may provide enhanced visibility of the symbols shown in the symbol positions without necessarily having the symbol positions extend all the way to the edges of the display. For example, a typical smartphone display may have a width of ~2.5" when held in portrait orientation; a GUI for such a display may have three columns of symbol positions with each column being 0.5" wide and with 0.5" of margin space on either side of the columns of symbol positions. This allows for an uncrowded presentation of symbol positions and the symbols displayed therein. Of course, the margins may also be reduced in order to increase the width of the columns or increase the number of columns. However, it is noted that the ~0.5" width corresponds approximately with the width of a typical application icon on a smartphone display. Such application icon sizes are typically selected to have a size that allows a human user to easily perceive and recognize such icons when holding the smartphone at arm's length. Sizing the column widths to have a similar width may thus result in the symbols displayed within those symbol positions being similarly easy to perceive under similar circumstances. This has the effect of making the game easy for the player to see, regardless of the distance at which they hold the smartphone.

As noted above, such a GUI may have additional columns, e.g., extending all the way out to the edge of the display, but this may leave little in the way of a margin in between the outermost columns of symbol positions and the edge of the display. While this disclosure does not exclude such implementations, the maximal use of the display width in such implementations may prove to be less user-friendly than GUIs that do not make full use of the display width to display columns.

The columns of such GUIs may be able to be increased in size, e.g., to include more symbol positions in the vertical direction. Such increases may, as discussed below, occur during play of the feature game, but the increased column sizes may, in some cases, persist into the base game at the conclusion of the feature game. However, in other cases, the column sizes may be reset to corresponding base numbers of symbol positions at the conclusion of the feature game.

For example, each column of symbol positions may have a base number of symbol positions, e.g., a minimum number of symbol positions that the column may have, and a maximum number of symbol positions, i.e., a maximum number of symbol positions the column may have. During feature gameplay, when a play of the feature game results in a symbol or symbols of the particular type of symbol being displayed in a symbol position or positions of a column of symbol positions that does not already have the corresponding maximum number of symbol positions and such that all of the symbol positions in that column display symbols of the particular type of symbol, then the column of symbol positions may be caused to increase in size, e.g., by adding a further symbol position thereto. The symbols of the particular type of symbol in that column may then be caused to stop being held, e.g., such that on the next play of the feature game, new symbols are selected and displayed in all of the symbol positions of the newly expanded column of symbol positions. In some implementations, credits or point awards associated with the symbols of the particular type of symbol that were in the newly expanded column of symbol positions may be caused to be awarded to the player in association with the expansion of the column of symbol positions.

Such an approach has the effect of allowing the player to be awarded feature game awards multiple times for the same column. This may offset the reduction in such winnings that may occur, as compared with a hold-and-spin feature game featuring a greater number of columns of symbol positions. Additionally, the persistence of the expanded columns of symbol positions into the base game may also have the effect of increasing the number of potential ways to win in the base game.

In some implementations, such games of chance may be further provided with a GUI that provides a bonus game, e.g., such as a wheel that may be spun in order to allow a bonus game outcome to be selected. For example, in some implementations, a bonus game may be triggered when a designated one or more of the columns has reached its maximum number of symbol positions prior to conclusion of the feature game. In such implementations, when the feature game concludes under such conditions, the bonus game may then be provided by the GUI after the conclusion of the feature game and before game play returns to the base game.

These and other features of the GUIs discussed herein are discussed below in more detail with respect to the Figures. However, it will be understood that the present disclosure is directed at least to the following implementations.

In some implementations, a system may be provided that includes one or more displays, one or more processors, and one or more memory devices. The one or more memory devices may store computer-executable instructions which, when executed by the one or more processors, cause the one or more processors to cause a graphical user interface (GUI) for a base game of chance to be presented on the one or more displays, the GUI including a plurality of symbol positions arranged into X adjacent columns, each column having a corresponding base number of symbol positions; cause, responsive to each receipt of a signal indicating a play of the base game of chance, each symbol position of the plurality of symbol positions to display a corresponding symbol having a symbol type selected from a plurality of different symbol types, the different symbol types including at least a first symbol type; cause, responsive to a first triggering condition being met, a feature game to be initiated and a GUI for the feature game to be presented on the one or more displays, wherein the GUI for the feature game that is presented includes the plurality of symbol positions and any of the symbols of the first symbol type that are displayed in the symbol positions; cause, responsive to each receipt of a signal indicating a play of the feature game and for each of the symbol positions not displaying a symbol of the first symbol type, a symbol of one of the symbol types to be selected and displayed in that symbol position as part of the play of the feature game; and cause, for each column having less than a corresponding maximum number of symbol positions and in which the symbol displayed in each symbol position of that column as a result of a play of the feature game is of the first type of symbol: an additional symbol position to be added to that column, and the symbols of the first symbol type displayed in the symbol positions of that column to cease to be displayed in the symbol positions of that column. The instructions, when executed by the one or more processors, further cause the one or more processors to cause, responsive at least in part to a first column of the X columns having the corresponding maximum number of symbol positions, a bonus game to be initiated and a GUI for the bonus game to be presented on the one or more displays, the GUI for the bonus game including a plurality of outcome indicators; and cause, responsive to each receipt of a signal indicating a play of the bonus game, one of the outcome indicators to be indicated as a selected outcome indicator by the GUI for the bonus game.

In some implementations of the system, the one or more memory devices may further store additional computer-executable instructions which, when executed by the one or more processors, further cause the one or more processors to cause the GUI for the base game to be presented again, inclusive of any additional symbol positions added to any of the columns, responsive to a conclusion of the feature game that does not result in presentation of the GUI for the bonus game.

In some such implementations, the one or more memory devices may further store additional computer-executable instructions which, when executed by the one or more processors, further cause the one or more processors to cause the GUI for the base game to be presented again, with each column of symbol positions including only the corresponding base number of symbol positions, responsive to a conclusion of the bonus game.

In some implementations, X may be an odd number and the first column may be the middle column of the X columns.

In some such implementations, X may be 3.

In some further such implementations, the base number of symbol positions for each of the columns may be 3.

In some such implementations, the corresponding maximum number of symbol positions for each of the columns may be 5 or 6.

In some implementations, the one or more displays may be a smartphone display.

In some implementations, the plurality of outcome indicators may include a first plurality of first wheel segments arranged about a center point, each first wheel segment serving as one of the outcome indicators.

In some such implementations, the plurality of outcome indicators may further include a second plurality of second wheel segments arranged about the center point and the first plurality of first wheel segments may lie within the second plurality of second wheel segments, each second wheel segment serving as another one of the outcome indicators.

In some such implementations, the plurality of outcome indicators may further include a third plurality of third wheel segments arranged about the center point and the second plurality of second wheel segments may lie within the third plurality of third wheel segments, each third wheel segment serving as a further one of the outcome indicators.

In some such implementations, the GUI for the feature game may include a pointer indicator positioned atop the first column and the one or more memory devices may further store additional computer-executable instructions which, when executed by the one or more processors, further cause the one or more processors to: cause the pointer indicator to move upward with each additional symbol position that is added to the first column of symbol positions and cause the pointer indicator to be used, in each play of the bonus game, to indicate the selected outcome indicator in the GUI for the bonus game.

In some implementations of the system, the first plurality of first wheel segments may include a first wheel segment of a first wheel segment type, and the one or more memory devices may further store additional computer-executable instructions which, when executed by the one or more processors, further cause the one or more processors to: cause the bonus game to be in a first phase when the bonus game is initiated, cause the bonus game to conclude responsive to a number of plays of the bonus game since the bonus game was initiated exceeding a first amount of bonus game plays, cause, responsive to each receipt of the signal indicating the play of the bonus game while the bonus game is in the first phase, one of the first wheel segments to be indicated as the selected outcome indicator by the GUI for the bonus game, cause, responsive to the first wheel segment of the first wheel segment type being indicated as the selected outcome indicator, the bonus game to transition to a second phase and the first amount of bonus game plays to be incremented by at least one bonus game play, and cause, responsive to each receipt of the signal indicating the play of the bonus game while the bonus game is in the second phase, one of the second wheel segments to be indicated as the selected outcome indicator by the GUI for the bonus game.

In some such implementations, one or more of the outcome indicators may be a second wheel segment type, and the one or more memory devices may further store additional computer-executable instructions which, when executed by the one or more processors, further cause the one or more processors to cause, responsive to each indication of a selected outcome indicator that is of the second wheel segment type, the first amount of bonus game plays to be increased by one or more bonus game plays.

In some alternative such implementations, the plurality of outcome indicators may further include a third plurality of third wheel segments arranged about the center point and the second plurality of second wheel segments may lie within the third plurality of third wheel segments, each third wheel segment may serve as a further one of the outcome indicators, the second plurality of second wheel segments may include a second wheel segment of the first wheel segment type, and the one or more memory devices may further store additional computer-executable instructions which, when executed by the one or more processors, further cause the one or more processors to: cause, responsive to the second wheel segment of the first wheel segment type being indicated as the selected outcome indicator, the bonus game to transition to a third phase and the first amount of bonus game plays to be further incremented by at least one bonus game play, and cause, responsive to each receipt of the signal indicating the play of the bonus game while the bonus game is in the third phase, one of the third wheel segments to be indicated as the selected outcome indicator by the GUI for the bonus game.

In some implementations, the one or more memory devices may further store additional computer-executable instructions which, when executed by the one or more processors, further cause the one or more processors to, in conjunction with the initiation of the bonus game, cause the first amount of bonus game plays to be set to a first value when only the first column of symbol positions has the corresponding maximum number of symbol positions when the bonus game is initiated, the first amount of bonus game plays to be set to a second value when only the first column of symbol positions and one additional column of symbol positions each have the corresponding maximum number of symbol positions when the bonus game is initiated. In such implementations, the second value may be larger than the first value.

In some implementations, the one or more memory devices may further store additional computer-executable instructions which, when executed by the one or more processors, further cause the one or more processors to, in conjunction with the initiation of the bonus game, cause the first amount of bonus game plays to be set to a third value when only the first column of symbol positions and two additional columns of symbol positions each have the corresponding maximum number of symbol positions when the bonus game is initiated. In such implementations, the third value may be larger than the second value.

In some implementations of the system, the one or more memory devices may further store additional computer-executable instructions which, when executed by the one or more processors, further cause the one or more processors to cause the GUI for the bonus game to be presented on the one or more displays when the first column has the corresponding maximum number of symbol positions and the feature game has concluded.

In some such implementations, the one or more memory devices may further store additional computer-executable instructions which, when executed by the one or more processors, further cause the one or more processors to cause the feature game to conclude responsive to a number of plays of the feature game since the feature game was initiated exceeding a first amount of feature game plays and cause the first amount of feature game plays to increase by at least one feature game play each time a play of the feature game causes one or more of the symbol positions of the GUI for the feature game to transition to displaying the symbol or symbols of the first symbol type.

In some such implementations, the one or more memory devices may further store additional computer-executable instructions which, when executed by the one or more processors, further cause the one or more processors to cause the feature game to also conclude responsive to each of the columns having the corresponding maximum number of symbol positions and all of the symbol positions displaying symbols of the first symbol type.

In some such systems, the first triggering condition may be met when at least Y symbols that are of a triggering symbol type are displayed in the symbol positions.

In some further such systems, the triggering symbol type may be the same as the first symbol type.

In some implementations, X may be 3, the base number of symbol positions for each of the columns may be 3, and Y may be 5.

In some implementations, one or more computer-readable media may be provided that store computer-executable instructions which, when executed by one or more processors, cause the one or more processors to: cause a graphical user interface (GUI) for a base game of chance to be presented on one or more displays of a gaming device, the GUI including a plurality of symbol positions arranged into X adjacent columns, each column having a corresponding base number of symbol positions; cause, responsive to each receipt of a signal indicating a play of the base game of chance, each symbol position of the plurality of symbol positions to display a corresponding symbol having a symbol type selected from a plurality of different symbol types, the different symbol types including at least a first symbol type; cause, responsive to a first triggering condition being met, a feature game to be initiated and a GUI for the feature game to be presented on the one or more displays, wherein the GUI for the feature game that is presented includes the plurality of symbol positions and any of the symbols of the first symbol type that are displayed in the symbol positions; cause, responsive to each receipt of a signal indicating a play of the feature game and for each of the symbol positions not displaying a symbol of the first symbol type, a symbol of one of the symbol types to be selected and displayed in that symbol position as part of the play of the feature game; and cause, for each column having less than a corresponding maximum number of symbol positions and in which the symbol displayed in each symbol position of that column as a result of a play of the feature game is of the first type of symbol: an additional symbol position to be added to that column, and the symbols of the first symbol type displayed in the symbol positions of that column to cease to be displayed in the symbol positions of that column. The computer-executable instructions may further cause, responsive at least in part to a first column of the X columns having the corresponding maximum number of symbol positions, a bonus game to be initiated and a GUI for the bonus game to be presented on the one or more displays, the GUI for the bonus game including a plurality of outcome indicators and cause, responsive to each receipt of a signal indicating a play of the bonus game, one of the outcome indicators to be indicated as a selected outcome indicator by the GUI for the bonus game.

In some implementations, the one or more computer-readable media may further store additional computer-executable instructions which, when executed by the one or more processors, further cause the one or more processors to cause the GUI for the base game to be presented again, inclusive of any additional symbol positions added to any of the columns, responsive to a conclusion of the feature game that does not result in presentation of the GUI for the bonus game.

In some further such implementations, the one or more computer-readable media may further store additional computer-executable instructions which, when executed by the one or more processors, further cause the one or more processors to cause the GUI for the base game to be presented again, with each column of symbol positions including only the corresponding base number of symbol positions, responsive to a conclusion of the bonus game.

In some implementations, X may be an odd number and the first column may be the middle column of the X columns.

In some such implementations, X may be 3.

In some further such implementations, the base number of symbol positions for each of the columns may be 3.

In some such implementations, the corresponding maximum number of symbol positions for each of the columns may be 5 or 6.

In some implementations, the one or more displays may be a smartphone display.

In some implementations, the plurality of outcome indicators may include a first plurality of first wheel segments arranged about a center point, each first wheel segment serving as one of the outcome indicators.

In some such implementations, the plurality of outcome indicators may further include a second plurality of second wheel segments arranged about the center point and the first plurality of first wheel segments may lie within the second plurality of second wheel segments, each second wheel segment serving as another one of the outcome indicators.

In some such implementations, the plurality of outcome indicators may further include a third plurality of third wheel segments arranged about the center point and the second plurality of second wheel segments may lie within the third plurality of third wheel segments, each third wheel segment serving as a further one of the outcome indicators.

In some implementations, the GUI for the feature game may include a pointer indicator positioned atop the first column and the one or more computer-readable media may further store additional computer-executable instructions which, when executed by the one or more processors, cause the one or more processors to cause the pointer indicator to move upward with each additional symbol position that is added to the first column of symbol positions and cause the pointer indicator to be used, in each play of the bonus game, to indicate the selected outcome indicator in the GUI for the bonus game.

In some implementations, the first plurality of first wheel segments may include a first wheel segment of a first wheel segment type, and the one or more computer-readable media may further store additional computer-executable instructions which, when executed by the one or more processors, cause the one or more processors to: cause the bonus game to be in a first phase when the bonus game is initiated, cause the bonus game to conclude responsive to a number of plays of the bonus game since the bonus game was initiated exceeding a first amount of bonus game plays, cause, responsive to each receipt of the signal indicating the play of the bonus game while the bonus game is in the first phase, one of the first wheel segments to be indicated as the selected outcome indicator by the GUI for the bonus game, cause, responsive to the first wheel segment of the first wheel segment type being indicated as the selected outcome indicator, the bonus game to transition to a second phase and the first amount of bonus game plays to be incremented by at least one bonus game play, and cause, responsive to each receipt of the signal indicating the play of the bonus game while the bonus game is in the second phase, one of the second wheel segments to be indicated as the selected outcome indicator by the GUI for the bonus game.

In some such implementations, one or more of the outcome indicators may be a second wheel segment type, and the one or more computer-readable media may further store additional computer-executable instructions which, when executed by the one or more processors, cause the one or more processors to cause, responsive to each indication of a selected outcome indicator that is of the second wheel segment type, the first amount of bonus game plays to be increased by one or more bonus game plays.

In some implementations, the plurality of outcome indicators may further include a third plurality of third wheel segments arranged about the center point and the second plurality of second wheel segments may lie within the third plurality of third wheel segments, each third wheel segment may serve as a further one of the outcome indicators, the second plurality of second wheel segments may include a second wheel segment of the first wheel segment type, and the one or more computer-readable media may further store additional computer-executable instructions which, when executed by the one or more processors, cause the one or more processors to: cause, responsive to the second wheel segment of the first wheel segment type being indicated as the selected outcome indicator, the bonus game to transition to a third phase and the first amount of bonus game plays to be further incremented by at least one bonus game play, and cause, responsive to each receipt of the signal indicating the play of the bonus game while the bonus game is in the third phase, one of the third wheel segments to be indicated as the selected outcome indicator by the GUI for the bonus game.

In some implementations, the one or more computer-readable media may further store additional computer-executable instructions which, when executed by the one or more processors, cause the one or more processors to, in conjunction with the initiation of the bonus game, cause: the first amount of bonus game plays to be set to a first value when only the first column of symbol positions has the corresponding maximum number of symbol positions when the bonus game is initiated and the first amount of bonus game plays to be set to a second value when only the first column of symbol positions and one additional column of symbol positions each have the corresponding maximum number of symbol positions when the bonus game is initiated. In such implementations, the second value may be larger than the first value.

In some implementations, the one or more computer-readable media may further store additional computer-executable instructions which, when executed by the one or more processors, cause the one or more processors to, in conjunction with the initiation of the bonus game, cause the first amount of bonus game plays to be set to a third value when only the first column of symbol positions and two additional columns of symbol positions each have the corresponding maximum number of symbol positions when the bonus game is initiated. In such implementations, the third value may be larger than the second value.

In some implementations, the one or more computer-readable media may further store additional computer-executable instructions which, when executed by the one or more processors, cause the one or more processors to cause the GUI for the bonus game to be presented on the one or more displays when the first column has the corresponding maximum number of symbol positions and the feature game has concluded.

In some such implementations, the one or more computer-readable media may further store additional computer-executable instructions which, when executed by the one or more processors, cause the one or more processors to cause the feature game to conclude responsive to a number of plays of the feature game since the feature game was initiated exceeding a first amount of feature game plays and cause the first amount of feature game plays to increase by at least one feature game play each time a play of the feature game causes one or more of the symbol positions of the GUI for the feature game to transition to displaying the symbol or symbols of the first symbol type.

In some such implementations, the one or more memory devices may further store additional computer-executable instructions which, when executed by the one or more processors, further cause the one or more processors to cause the feature game to also conclude responsive to each of the columns having the corresponding maximum number of symbol positions and all of the symbol positions displaying symbols of the first symbol type.

In some such implementations, the first triggering condition may be met when at least Y symbols that are of a triggering symbol type are displayed in the symbol positions.

In some further such implementations, the triggering symbol type may be the same as the first symbol type.

In some implementations, X may be 3, the base number of symbol positions for each of the columns may be 3, and Y may be 5.

In some implementations, a method may be provided that includes causing, by one or more processors, a graphical user interface (GUI) for a base game of chance to be presented on one or more displays, the GUI including a plurality of symbol positions arranged into X adjacent columns, each column having a corresponding base number of symbol positions; causing, by the one or more processors and responsive to each receipt of a signal indicating a play of the base game of chance, each symbol position of the plurality of symbol positions to display a corresponding symbol having a symbol type selected from a plurality of different symbol types, the different symbol types including at least a first symbol type; causing, by the one or more processors and responsive to a first triggering condition being met, a feature game to be initiated and a GUI for the feature game to be presented on the one or more displays, wherein the GUI for the feature game that is presented includes the plurality of symbol positions and any of the symbols of the first symbol type that are displayed in the symbol positions; causing, by the one or more processors and responsive to each receipt of a signal indicating a play of the feature game and for each of the symbol positions not displaying a symbol of the first symbol type, a symbol of one of the symbol types to be selected and displayed in that symbol position as part of the play of the feature game; and causing, by the one or more processors and for each column having less than a corresponding maximum number of symbol positions and in which the symbol displayed in each symbol position of that column as a result of a play of the feature game is of the first type of symbol an additional symbol position to be added to that column and the symbols of the first symbol type displayed in the symbol positions of that column to cease to be displayed in the symbol positions of that column. Such implementations may further include causing, by the one or more processors and responsive at least in part to a first column of the X columns having the corresponding maximum number of symbol positions, a bonus game to be initiated and a GUI for the bonus game to be presented on the one or more displays, the GUI for the bonus game including a plurality of outcome indicators and causing, by the one or more processors and responsive to each receipt of a signal indicating a play of the bonus game, one of the outcome indicators to be indicated as a selected outcome indicator by the GUI for the bonus game.

In some implementations of the method, the method may further include causing, by the one or more processors, the GUI for the base game to be presented again, inclusive of any additional symbol positions added to any of the columns, responsive to a conclusion of the feature game that does not result in presentation of the GUI for the bonus game.

In some such implementations, the method may further include causing, by the one or more processors, the GUI for the base game to be presented again, with each column of symbol positions including only the corresponding base number of symbol positions, responsive to a conclusion of the bonus game.

In some implementations, X may be an odd number and the first column may be the middle column of the X columns.

In some such implementations, X may be 3.

In some further such implementations, the base number of symbol positions for each of the columns may be 3.

In some such implementations, the corresponding maximum number of symbol positions for each of the columns may be 5 or 6.

In some implementations, the one or more displays may be a smartphone display.

In some implementations, the plurality of outcome indicators may include a first plurality of first wheel segments arranged about a center point, each first wheel segment serving as one of the outcome indicators.

In some such implementations, the plurality of outcome indicators may further include a second plurality of second wheel segments arranged about the center point and the first plurality of first wheel segments may lie within the second plurality of second wheel segments, each second wheel segment serving as another one of the outcome indicators.

In some such implementations, the plurality of outcome indicators may further include a third plurality of third wheel segments arranged about the center point and the second plurality of second wheel segments may lie within the third plurality of third wheel segments, each third wheel segment serving as a further one of the outcome indicators.

In some implementations, the GUI for the feature game may include a pointer indicator positioned atop the first column and the method may further include causing, by the one or more processors, the pointer indicator to move upward with each additional symbol position that is added to the first column of symbol positions and the pointer indicator to be used, in each play of the bonus game, to indicate the selected outcome indicator in the GUI for the bonus game.

In some implementations, the first plurality of first wheel segments may include a first wheel segment of a first wheel segment type, and the method may further include causing, by the one or more processors, the bonus game to be in a first phase when the bonus game is initiated; causing, by the one or more processors, the bonus game to conclude responsive to a number of plays of the bonus game since the bonus game was initiated exceeding a first amount of bonus game plays; causing, by the one or more processors and responsive to each receipt of the signal indicating the play of the bonus game while the bonus game is in the first phase, one of the first wheel segments to be indicated as the selected outcome indicator by the GUI for the bonus game; causing, by the one or more processors and responsive to the first wheel segment of the first wheel segment type being indicated as the selected outcome indicator, the bonus game to transition to a second phase and the first amount of bonus game plays to be incremented by at least one bonus game play; and causing, by the one or more processors and responsive to each receipt of the signal indicating the play of the bonus game while the bonus game is in the second phase, one of the second wheel segments to be indicated as the selected outcome indicator by the GUI for the bonus game.

In some implementations, one or more of the outcome indicators may be a second wheel segment type, and the method may further include causing, by the one or more processors and responsive to each indication of a selected outcome indicator that is of the second wheel segment type, the first amount of bonus game plays to be increased by one or more bonus game plays.

In some implementations, the plurality of outcome indicators may further include a third plurality of third wheel segments arranged about the center point and the second plurality of second wheel segments may lie within the third plurality of third wheel segments, each third wheel segment may serve as a further one of the outcome indicators, the second plurality of second wheel segments may include a second wheel segment of the first wheel segment type, and the method may further include causing, by the one or more processors and responsive to the second wheel segment of the first wheel segment type being indicated as the selected outcome indicator, the bonus game to transition to a third phase and the first amount of bonus game plays to be further incremented by at least one bonus game play and causing, by the one or more processors and responsive to each receipt of the signal indicating the play of the bonus game while the bonus game is in the third phase, one of the third wheel segments to be indicated as the selected outcome indicator by the GUI for the bonus game.

In some implementations, teh method may further include causing, by the one or more processors and in conjunction with the initiation of the bonus game, the first amount of bonus game plays to be set to a first value when only the first column of symbol positions has the corresponding maximum number of symbol positions when the bonus game is initiated and the first amount of bonus game plays to be set to a second value when only the first column of symbol positions and one additional column of symbol positions each have the corresponding maximum number of symbol positions when the bonus game is initiated. In such implementations, the second value may be larger than the first value.

In some such implementations, the method may further include causing, by the one or more processors and in conjunction with the initiation of the bonus game, the first amount of bonus game plays to be set to a third value when only the first column of symbol positions and two additional columns of symbol positions each have the corresponding maximum number of symbol positions when the bonus game is initiated. In such implementations, the third value may be larger than the second value.

In some implementations, the method may further include causing, by the one or more processors, the GUI for the bonus game to be presented on the one or more displays when the first column has the corresponding maximum number of symbol positions and the feature game has concluded.

In some implementations, the method may further include causing, by the one or more processors, the feature game to conclude responsive to a number of plays of the feature game since the feature game was initiated exceeding a first amount of feature game plays and the first amount of feature game plays to increase by at least one feature game play each time a play of the feature game causes one or more of the symbol positions of the GUI for the feature game to transition to displaying the symbol or symbols of the first symbol type.

In some implementations, the method may further include causing, by the one or more processors, the feature game to also conclude responsive to each of the columns having the corresponding maximum number of symbol positions and all of the symbol positions displaying symbols of the first symbol type.

In some such implementations, the first triggering condition may be met when at least Y symbols that are of a triggering symbol type are displayed in the symbol positions.

In some further such implementations, the triggering symbol type may be the same as the first symbol type.

In some implementations, X may be 3, the base number of symbol positions for each of the columns may be 3, and Y may be 5.

BRIEF DESCRIPTION OF THE DRAWINGS

FIG. 33 depicts a table of permutations of columns and number of symbol positions per column.

FIG. 34 depicts a table indicating selection weights for sets of ordered sequences of symbols.

FIG. 35 depicts a table indicating symbol sets that may be used in providing a feature game according to the present disclosure.

FIG. 36 depicts weighting tables that may be used for selection of outcome indicators during a bonus game of the present disclosure.

The Figures are provided for the purpose of providing examples and clarity regarding various aspects of this disclosure and are not intended to be limiting.

DETAILED DESCRIPTION

The following discussion provides overall context for gaming machines that may be used to implement a feature game mechanic such as is described above and later herein. Following this overview, a more focused discussion of the feature game mechanic concepts discussed above is provided.

Figure 1:
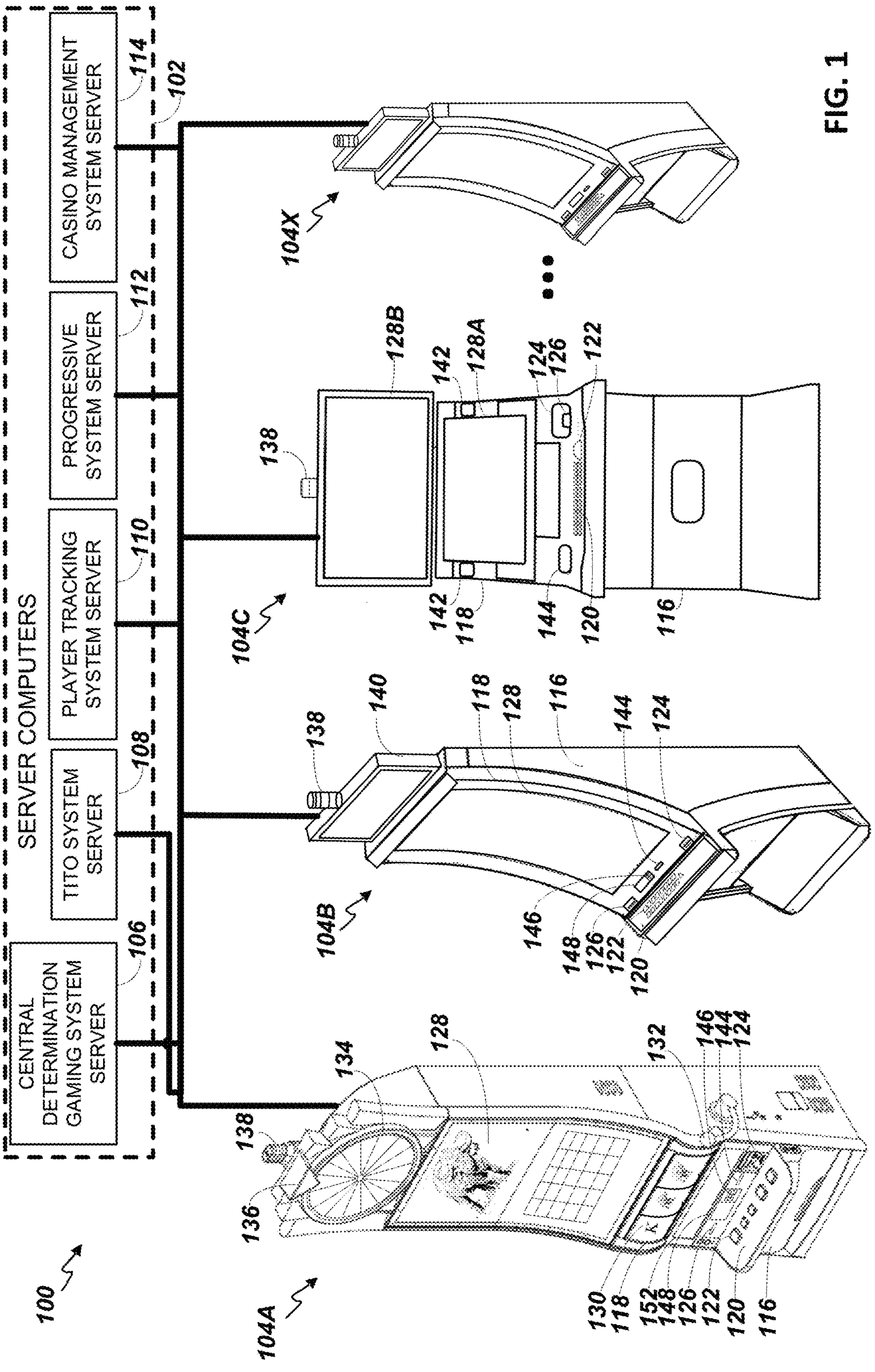
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and) Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
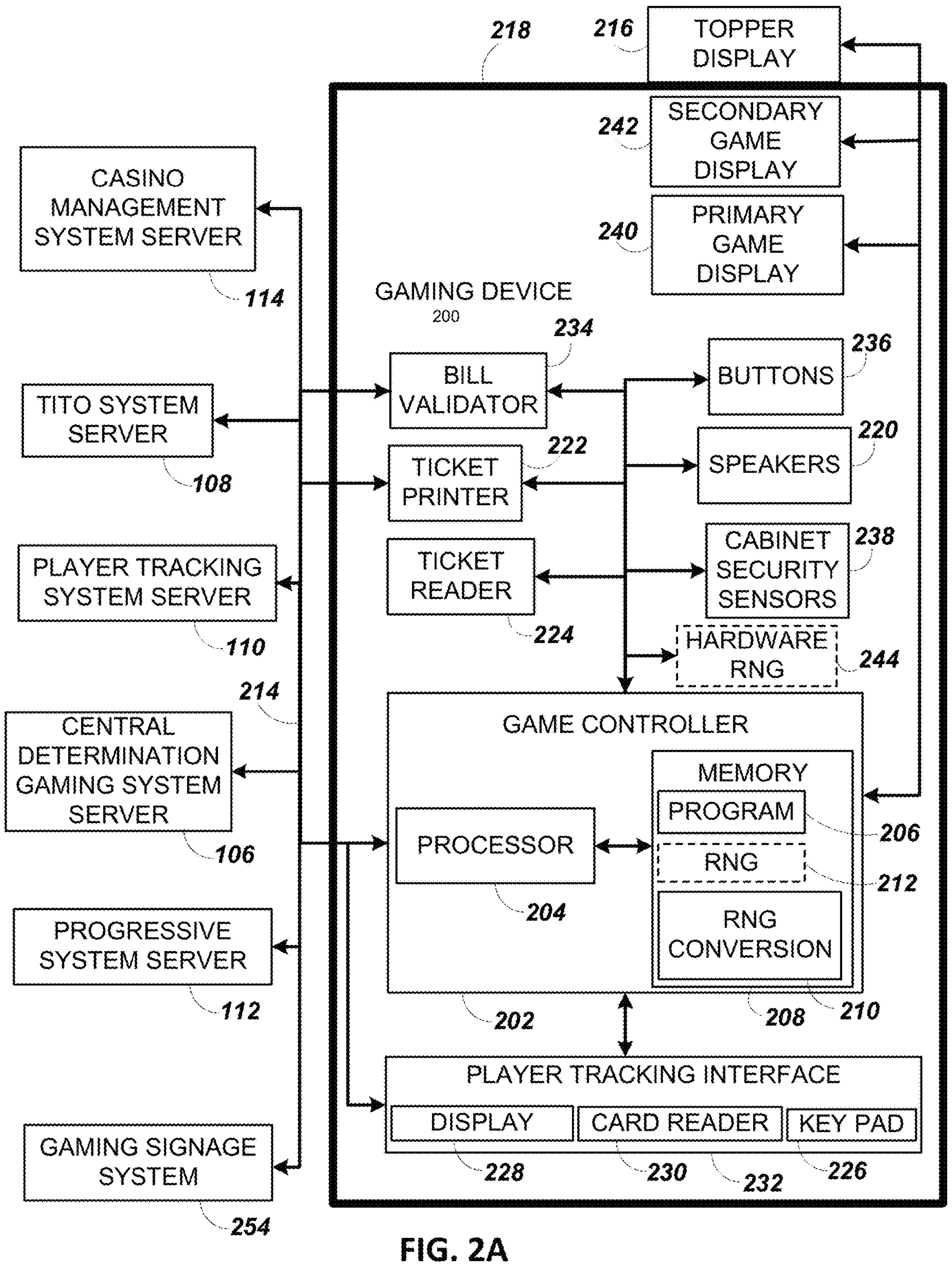
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
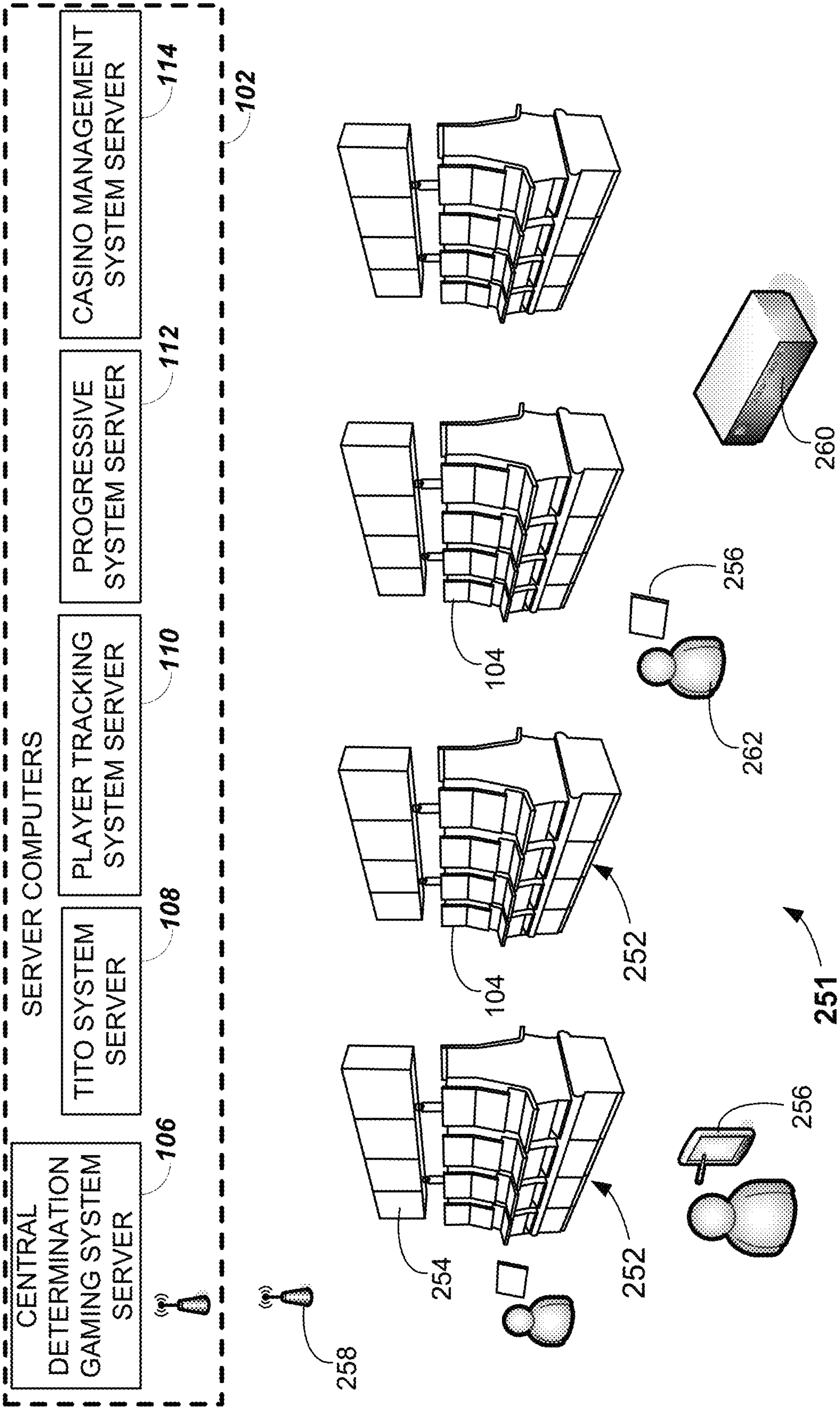
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
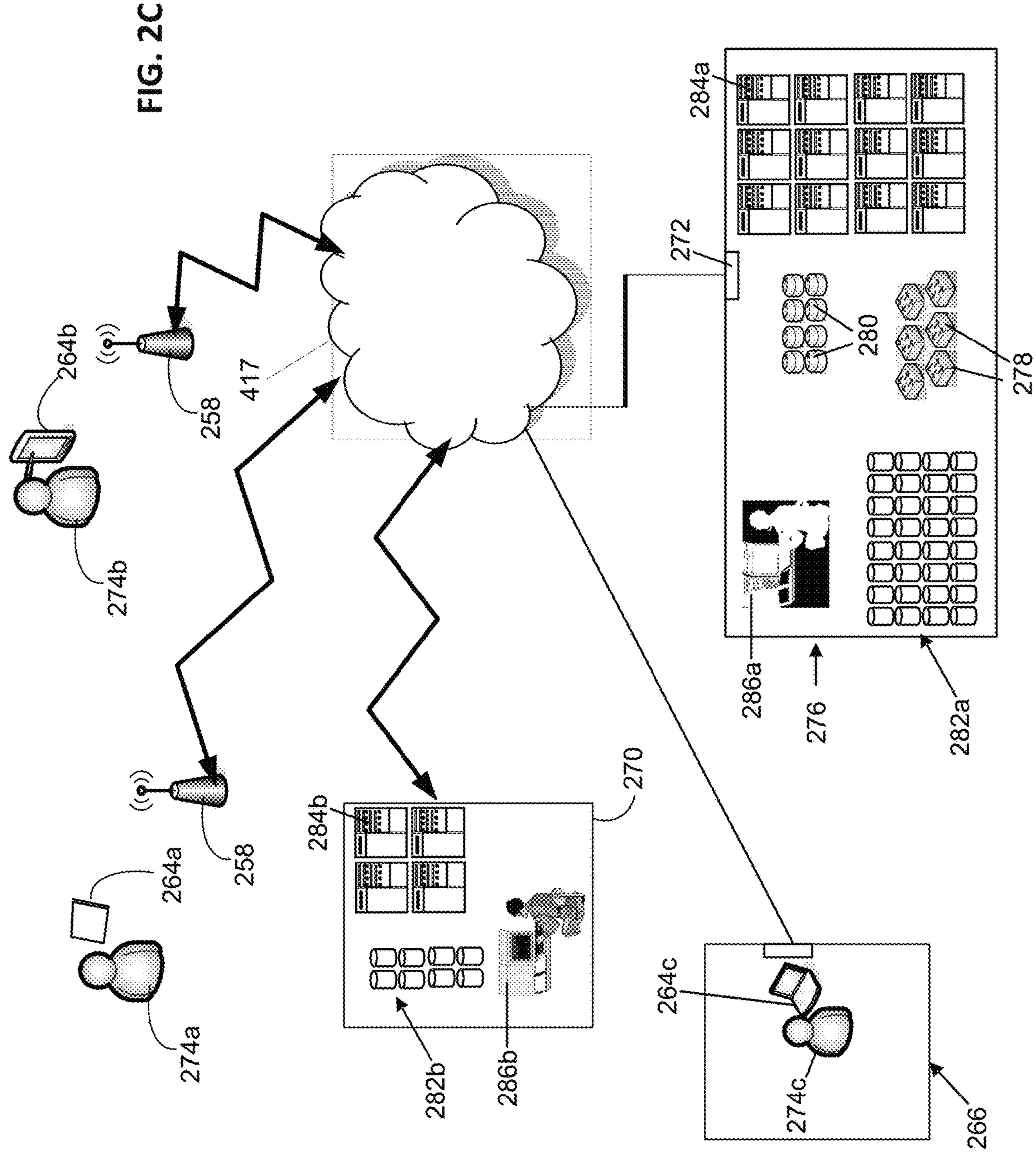
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
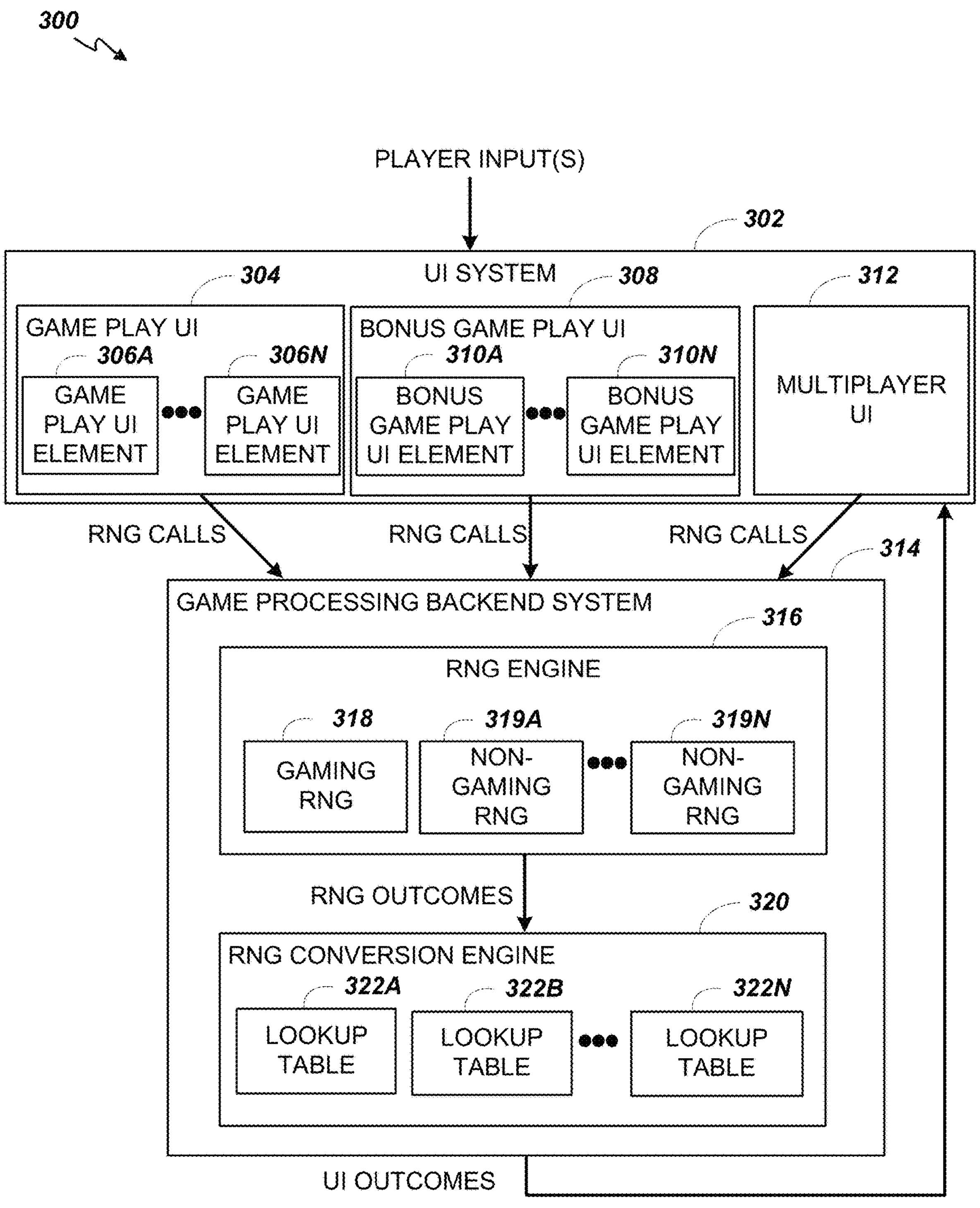
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed earlier, the present disclosure is directed at GUIs that may be used to present a base game, feature game, and bonus game. To assist in this discussion, FIGS. 4 through 32 are provided. FIGS. 4 through 32 depict a GUI or GUIs that illustrate the concepts discussed herein. Each of FIGS. 4 through 32 depicts a different game play state of the base game, feature game, or bonus game that may be provided using such a GUI.

Figure 4:
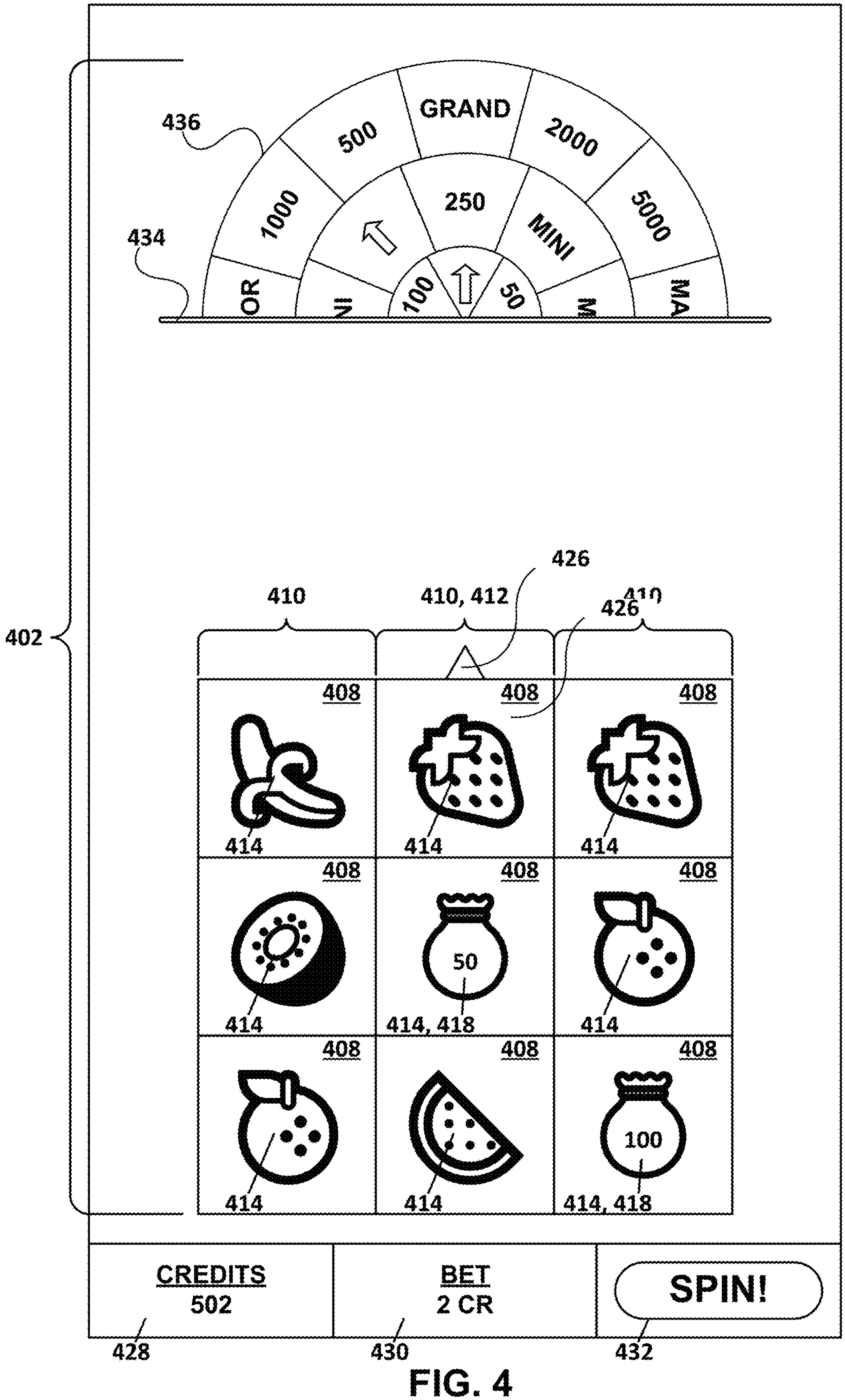
FIGS. 4 through 32 depict various states of a GUI according to the present disclosure.

In FIG. 4, a GUI for a base game 402 is displayed. The GUI for the base game 402 features a plurality of columns 410, including a first column 412, of symbol positions 408. Each symbol position 408 may, for example, serve as a placeholder in which a symbol 414 is displayed at the conclusion of a play of the base game. The symbols 414 may be selected from a plurality of different symbol types, including at least a triggering symbol type 418. The triggering symbol type 418, in this example, is a cash-on-reel symbol, which is represented by a money bag that is common to all of the cash-on-reel symbols and an award value, which may vary between cash-on-reel symbols. The symbol types may also include other types of symbols. For example, FIG. 4 also depicts symbols of another symbol type, e.g., fruit symbols. While not depicted here, the symbols 414 selected for display in the symbol positions 408 may be of a variety of other different types, such as multiplier symbol types (which may, in some cases, act to cause awards awarded as a result of a game outcome to be multiplied by a specified multiplier), free spin symbol types (which may, in some cases, cause one or more free or additional plays of the base game to be awarded to the player when displayed), wild symbol types (which may act/be treated as any symbol of at least one other symbol type when displayed), etc.

The GUI for the base game 402 may include, for example, a credit meter 428 (in implementations in which players play for points instead of credits, the references to "credit" herein will be understood to apply equally to points instead), a wager amount indicator 430, and a play button 432. The wager amount indicator 430 may indicate how many points or credits the player intends to pay in order to conduct a play of the base game.

As can be seen in FIG. 4, the GUI for the base game 402 includes three columns 410 of symbol positions 408. There may, as noted earlier, be fewer or more than three columns 410, although for implementations on mobile devices such as smartphones, a 3-column implementation may provide a good balance between making the GUI legible to users at arm's length and simultaneously providing enough columns 410 and symbol positions 408 that gameplay is engaging enough to maintain player interest.

The columns 410 in the example of FIG. 4 each have a base number of symbol positions 408, e.g., a default or minimum number of symbol positions 408 that each column 410 may initially start with or be reset to under appropriate conditions. While some implementations may feature columns 410 in which one or more of the columns 410 have a base number of symbol positions 408 that is different from that of one or more of the other columns 410, the implementation of FIG. 4 features columns 410 that each have the same base number of symbol positions 408. In this example, the base number of symbol positions 408 for each of the columns 410 is three symbol positions.

The columns 410 may also each have a maximum number of symbol positions 408 associated therewith. As with the base numbers of symbol positions 408, some implementations may feature columns 410 in which one or more of the columns 410 have a maximum number of symbol positions 408 that is different from that of one or more of the other columns 410. However, in the implementation shown in FIG. 4, the columns 410 all have the same maximum number of symbol positions 408, e.g., five symbol positions 408. However, since the columns 410 are shown in FIG. 4 having only their base number of symbol positions 408 visible, the additional symbol positions 408 for each column, e.g., the $4^{th}$ and $5^{th}$ symbol positions 408 for each column 410, are not shown. It will be understood that other values for the maximum number of symbol positions in each column may be used as well, e.g., four, six, seven, eight, nine, etc., symbol positions.

As noted earlier and as discussed later below, the number of symbol positions 408 shown for a given column 410 may be increased during play of a feature game associated with the base game. In some implementations, a maximum column height indicator 434 may be provided as part of the GUI for the base game 402. In this case, the maximum column height indicator 434 is a horizontal line that would, if the columns 410 were displaying their maximum number of symbol positions 408, be flush with the top of each column 410 of symbol positions 408. Such an element may, in some implementations, be omitted.

As noted above, one of the columns 410 may be deemed to be a first column 412. In some implementations, there may be multiple first columns 412. The first column(s) 412 may not have any special significance in the base game, but as will be explained with reference to later figures, may have a significant role to play in the feature game associated with the base game. In some implementations, a pointer indicator 426 may be positioned atop the first column 412. The pointer indicator 426 may, for example, not be actively used in the base game or the feature game but may play a role in an associated bonus game, if triggered. In other implementations, the pointer indicator 426 may be omitted entirely in the GUI of the base game 402 and/or a GUI of the feature game, but may be displayed as part of a GUI for the bonus game. It will be understood that the pointer indicator 426, while shown as a triangular pointer in FIG. 4, may take any of a variety of forms or shapes and may even be caused to morph or change prior to being used to indicate outcomes in the bonus game.

Also visible in FIG. 4 is a wheel display 436, which may be used during presentation of the bonus game, if triggered. In some implementations, the wheel display 436 (or other display elements, e.g., different from a wheel display 436 used to present the bonus game) may not be displayed in the GUI for the base game 402. However, implementations in which such elements from the GUI for providing the bonus game are displayed as part of the GUI for the base game may be more attractive to potential players since the players may be able to see the possible rewards associated with the bonus game.

During each play of the base game, the GUI for the base game 402 may be caused to present a plurality of symbols 414 in the symbol positions 408 responsive to a triggering input, e.g., receipt of a signal indicating a play of the base game received from the play button 432 responsive to a player's selection of the play button 432. The symbols 414 selected for display in the symbol positions 408 of each column may be selected in a variety of ways. In some implementations, each symbol 414 displayed in each symbol position 408 may be selected randomly and independently from the selection of other symbols 414 displayed in the other symbol positions 408. In other implementations, such as the one depicted in FIG. 4, the symbols 414 displayed in each of the symbol positions 408 of each column 410 may be randomly selected as a block from a larger, ordered sequence of symbols 414. For example, each column 410 may be associated with a particular ordered sequence of symbols 414, e.g., a reel strip, and a random selection may be made of X adjacent symbols 414 in that ordered sequence of symbols, where X is the number of symbol positions 408 in the associated column 410 of symbol positions 408 (the ordered sequences of symbols may be circular or modulo sequences such that when a selected block of symbols 414 extends past the start or end of the sequence, the symbols 414 at the other of the end and the start of the sequence are used to provide missing symbols 414).

If a first triggering condition is met during play of the base game, a feature game associated with the base game may be initiated and the GUI for the base game 402 may be caused to be replaced by, or morph into, a GUI for the feature game. While a variety of different first triggering conditions may be used to trigger the initiation of the feature game, in the example of FIG. 4, the feature game is initiated responsive to at least a particular number of symbols 414 of the triggering symbol type 418 being displayed in the symbol positions 408 responsive to a play of the base game. For example, the first triggering condition may be met when five or more symbols 414 of the triggering symbol type 418 are shown in the symbol positions 408 of the columns 410 as the result of a play of the base game. In FIG. 4, only two symbols 414 of the triggering symbol type 418 are shown as the result of a play of the base game, so the first triggering condition is not met.

Figure 5:
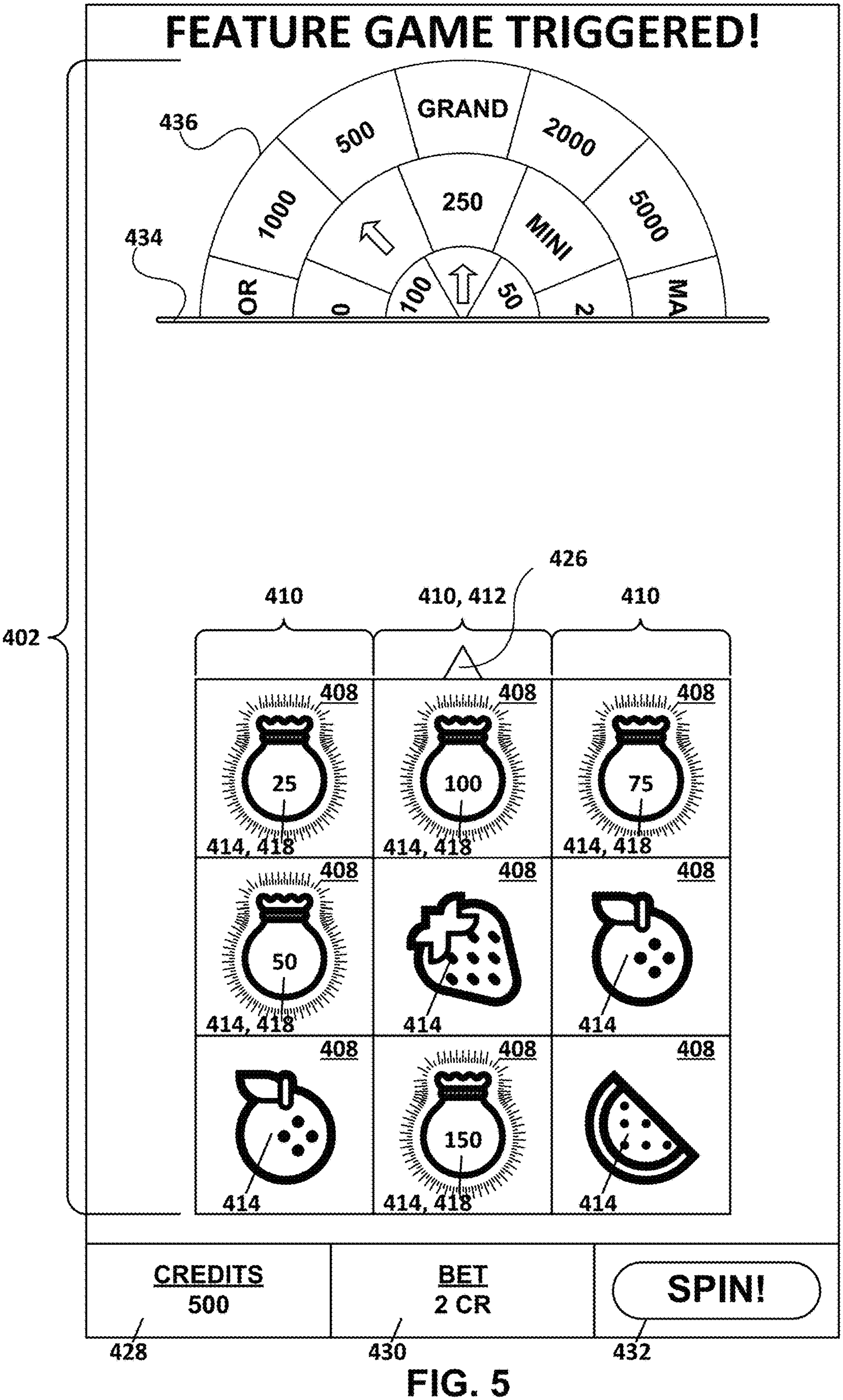

In FIG. 5, the GUI of the base game 402 has been updated to depict a new outcome for another play of the base game. In this particular game play, the symbols 414 selected for display in the symbol positions 408 of the columns 410 include five symbols 414 that are of the triggering symbol type 418, thereby causing the feature game to be initiated. The GUI for the base game 402 may, for example, be updated to indicate, e.g., via text such as "FEATURE GAME TRIGGERED!", that the feature game has been triggered.

Figure 6:
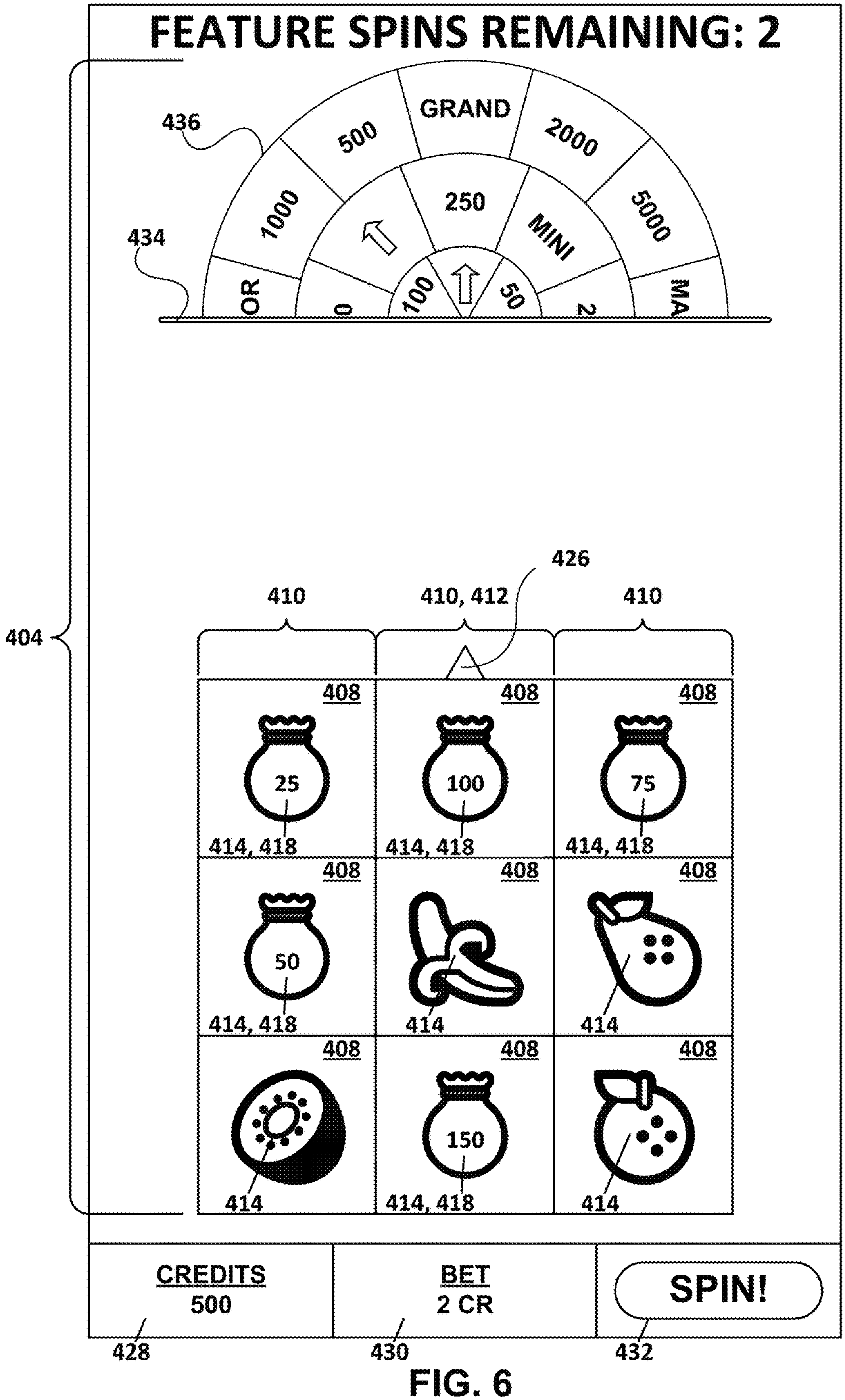

In FIG. 6, a GUI for the feature game 404 has been presented. The GUI for the feature game 404 shares many similarities with the GUI for the base game 402, e.g., sharing the columns 410 of symbol positions 408, as well as the symbols 414 shown in the symbol positions 408 that were displayed in the game outcome that resulted in the feature game being triggered. In the GUI for the feature game 404 of FIG. 6, the GUI has been updated to reflect that the player has initiated a first play of the feature game after the initiation of the feature game. During feature game play, symbols 414 that are of a first symbol type may generally be "held" in place during feature game plays, i.e., symbols 414 may be newly selected during each feature game play for symbol positions 408 that do not display symbols 414 that are of the first symbol type, while the symbols 414 that are of the first symbol type that are displayed remain unchanged during such feature game plays. In the present example, the first symbol type is the same as the triggering symbol type 418, and either may be referred to by the callout 418. However, in other implementations, the triggering symbol type 418 may be a different symbol type than the first symbol type. In such alternate implementations, the symbols 414 of the triggering symbol type 418 that triggered the initiation of the feature game due to being displayed in the GUI for the base game 402 may be replaced by newly selected symbols 414 in the first play of the feature game after the initiation of the feature game (although if symbols 414 of the first symbol type were also displayed in the outcome for the base game that resulted in triggering initiation of the feature game, those symbols 414 would be "held" in their symbol positions 408 during play of the feature game even though the symbols of the triggering symbol type 418 would be replaced with newly selected symbols 414).

In some implementations, the selection of symbols 414 for display in the symbol positions 408 during play of the feature game may, for example, be implemented by randomly selecting a symbol 414 for display in a symbol position 408 from a plurality of symbols 414 (which may generally include a mix of different symbols 414) associated with that symbol position 408. In other implementations, the symbols 414 displayed in each of the symbol positions 408 of each column 410 as a result of a play of the feature game may be randomly selected as a block from a larger, ordered sequence of symbols 414, similar to one of the potential symbol selection techniques discussed above with respect to the base game. For example, each column 410 may be associated with a particular ordered sequence of symbols 414, e.g., a reel strip, and a random selection may be made of X adjacent symbols 414 in that ordered sequence of symbols, where X is the number of symbol positions 408 in the associated column 410 of symbol positions 408 (the ordered sequences of symbols may be circular or modulo sequences such that when a selected block of symbols 414 extends past the start or end of the sequence, the symbols 414 at the other of the end and the start of the sequence are used to provide missing symbols 414). The corresponding symbol 414 in the selected block of symbols 414 for each symbol position 408 that does not currently display a symbol 414 of the first symbol type 418 may then be displayed in that symbol position 408.

As can be seen in FIG. 6, new symbols 414 have been selected and displayed in the GUI for the feature game 404 for the symbol positions 408 that do not already display the symbols 414 of the first symbol type 418 responsive to a most recent play of the feature game. The GUI for the feature game 404 may also indicate, in some fashion, a number of feature game plays remaining before the feature game terminates. For example, when a feature game is initiated, the player may be provided with a predetermined number of plays of the feature game that may limit the duration of the feature game. The indication of how many feature game plays remain before the feature game terminates may, generally speaking, be updated after each feature game play to reflect an updated number of feature game plays remaining, e.g., decrementing the number of feature game plays available by one play after each play of the feature game. In the GUI for the feature game 404, such an indication is provided by way of the text positioned at the top of the GUI for the feature game 404, e.g., that indicates “FEATURE SPINS REMAINING: 2.”

The newly selected symbols 414 include a banana symbol 414 and a pear symbol 414 in the middle and right symbol positions 408 of the middle row of symbol positions 408, as well as a kiwi symbol 414 and an orange symbol 414 in the left and right symbol positions 408 of the bottom row of symbol positions 408. Were the symbols 414 selected for display in such symbol positions to have included another symbol 414 of the first symbol type 418, then the total number of plays of the feature game provided to the player in association with the current presentation of the feature game would be increased by at least one feature game play. In this example, however, this has not occurred, and the indicated number of feature game plays available to the player (as indicated in the text across the top of the GUI for the feature game 404) has been decremented by one, indicating that the player has two remaining plays of the feature game available. In this example, three feature game plays were initially provided to the player at the initiation of the feature game.

Figure 7:
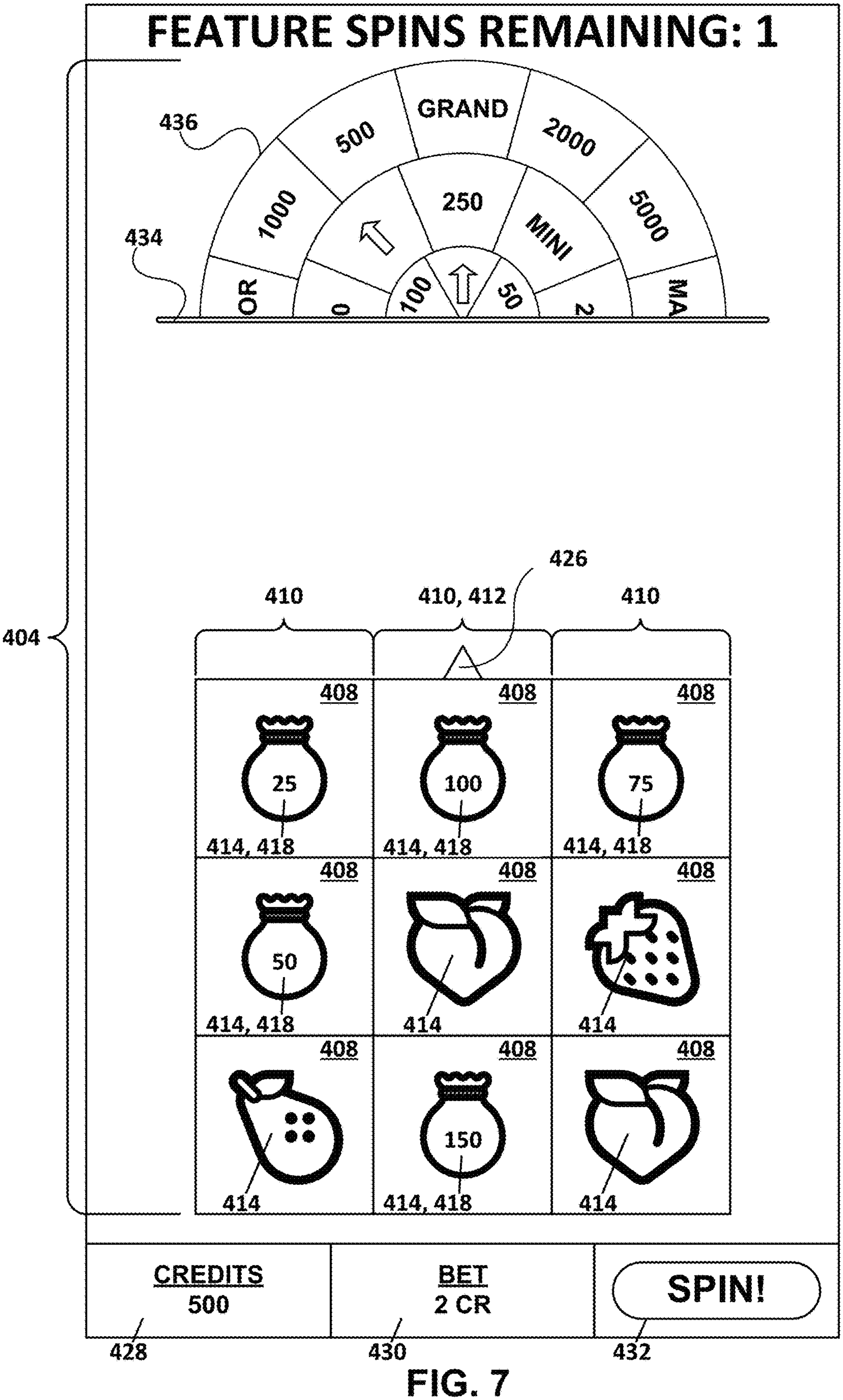

FIG. 7 depicts the GUI for the feature game 404 after a further play of the feature game has occurred. As with the feature game outcome shown in FIG. 6, the feature game outcome of FIG. 7 also does not feature any newly displayed symbols 414 of the first symbol type 418. Accordingly, the number of available plays of the feature game has been further decremented by one, leaving one play of the feature game remaining. If the next play of the feature game similarly results in no newly displayed symbols 414 of the first symbol type 418, then the feature game would be caused to conclude and the GUI for the feature game 404 would be caused to change to the GUI for the base game 402.

Figure 8:
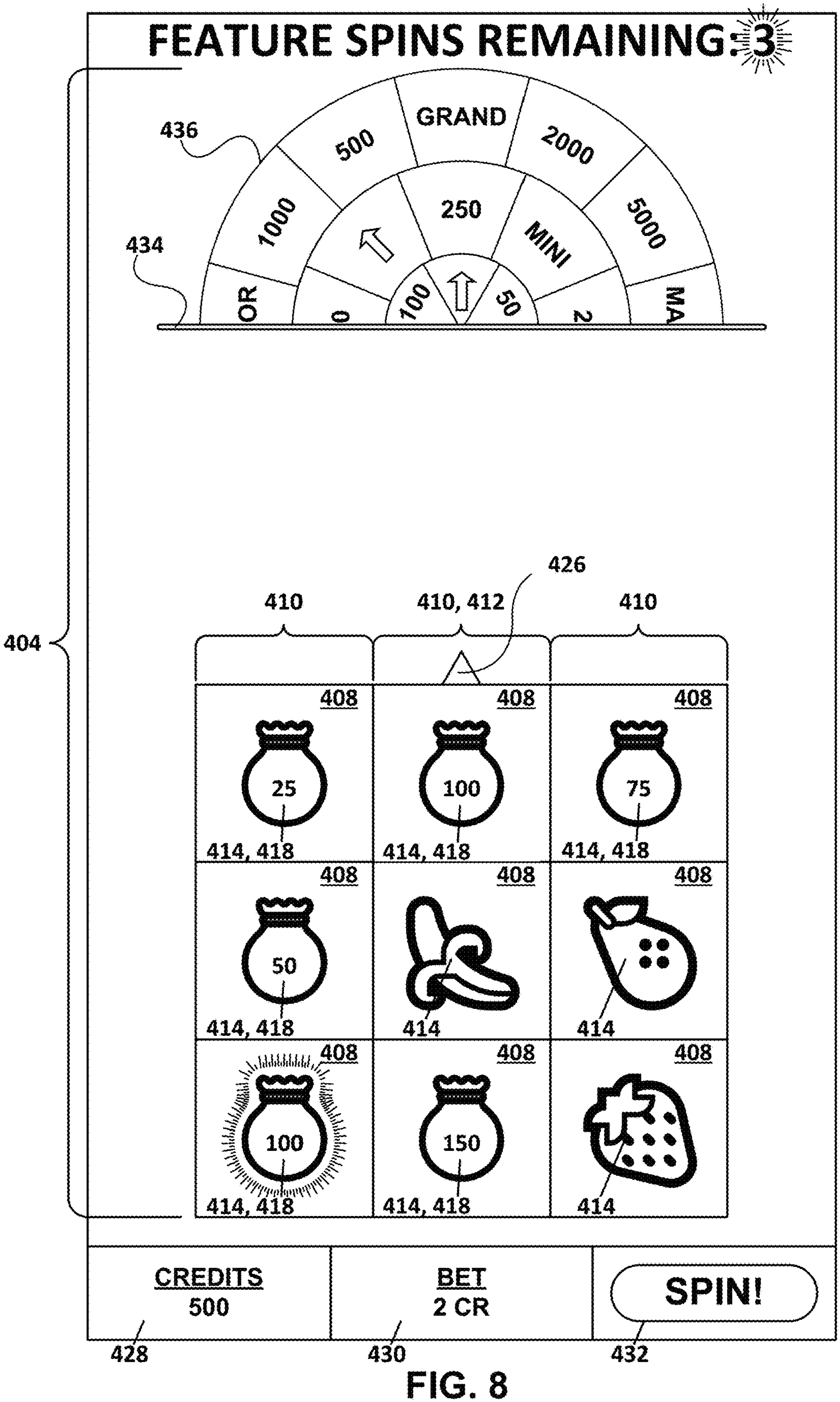

In FIG. 8, the GUI for the feature game 404 is shown depicting an outcome resulting from a third play of the feature game. As can be seen, one of the four newly displayed symbols 414, positioned in the lower left corner symbol position 408, is a symbol 414 of the first symbol type 418. Because a symbol 414 of the first symbol type 418 is newly displayed in one of the symbol positions 408 of the GUI for the feature game 404, the player is awarded with at least one additional play of the feature game. In this example, a display of one or more newly displayed symbols 414 of the first symbol type 418 as a result of a feature game play results in the total number of feature game plays remaining being incremented by an amount sufficient to restore the total number of feature game plays available to the player to the number of feature game plays that were initially made available to the player on initiation of the feature game, e.g., three feature game plays (as indicated by the updated value of “3” shown in association with the “FEATURE SPINS REMAINING:” text of FIG. 8). However, in other implementations, the number of additional feature game plays awarded to the player may be increased differently. For example, in some implementations, the number of additional feature game plays that may be awarded to a player as a result of a feature game play that results in one or more newly displayed symbols 414 of the first symbol type 418 being displayed in the symbol positions 408 may be dependent on the number of newly displayed symbols 414 of the first symbol type 418 that are displayed in the symbol positions 408. For example, one newly displayed symbol 414 of the first symbol type 418 being displayed in a symbol position 408 may result in X additional plays of the feature game being awarded to the player, while two newly displayed symbols 414 of the first symbol type 418 being displayed in corresponding symbol positions 408 may result in Y additional plays of the feature game being awarded to the player and three newly displayed symbols 414 of the first symbol type 418 being displayed in corresponding symbol position 408 may result in Z additional plays of the feature game being awarded to the player, where $X<Y<Z$.

Figure 9:
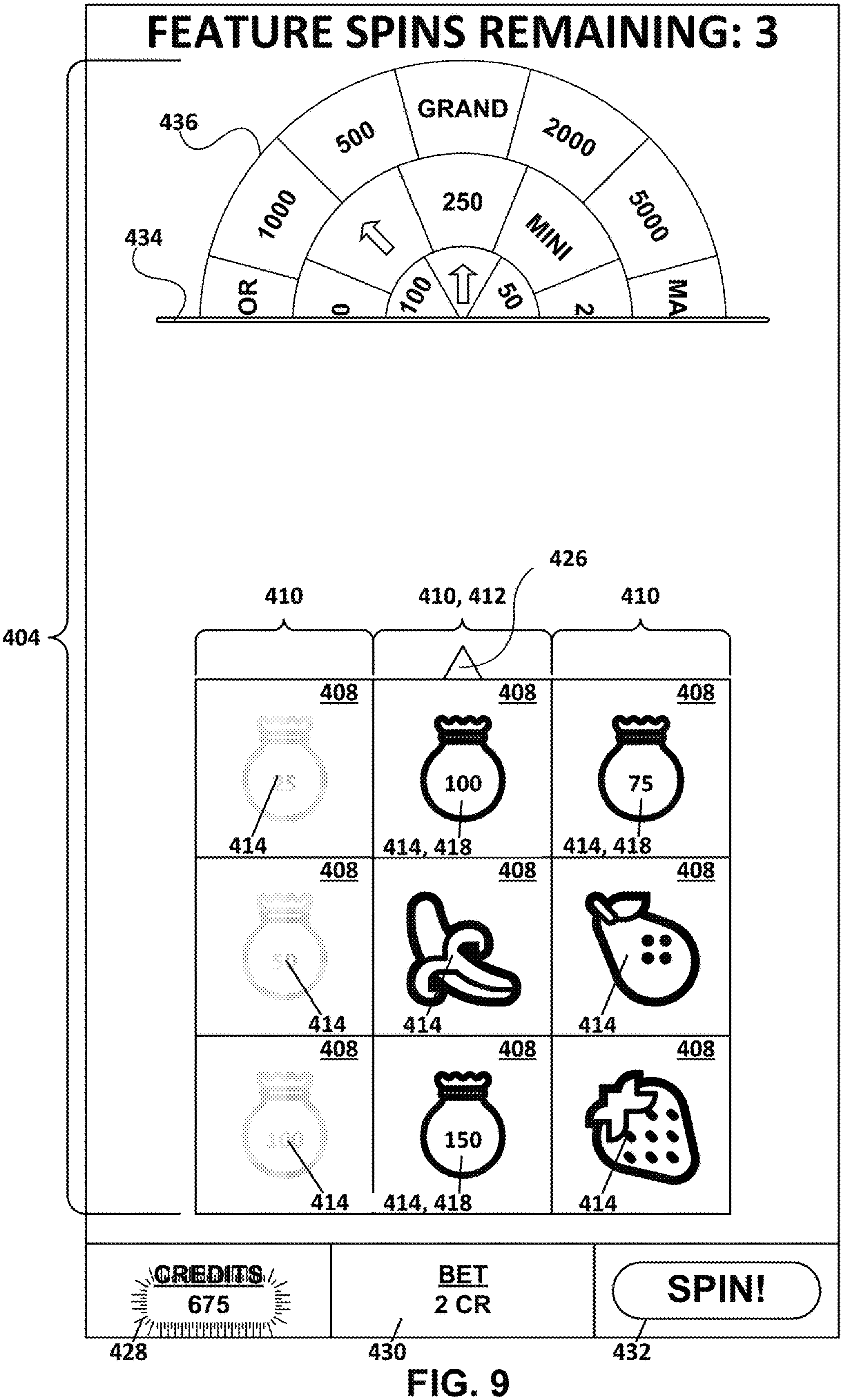

As can also be see in FIG. 8, the newly displayed symbol 414 of the first symbol type 418 results in all of the symbol positions 408 of the left-most column 410 of symbol positions 408 displaying symbols 414 of the first symbol type 418. As discussed earlier, if the number of symbol positions 408 for that column 410 of symbol positions 408 is less than the maximum number of symbol positions 408 for that column 410 of symbol positions 408, then the GUI for the feature game 404 may be caused to add an additional symbol position 408 to that column 410 of symbol positions 408. When such an expansion of a column 410 occurs, the symbols 414 of the first symbol type 418 that caused such an expansion may be caused to cease being “held” in their respective symbol positions 408 when the next play of the feature game occurs. For example, the symbols 414 of the first symbol type 418 that caused such an expansion may be caused to change to symbols 414 that are of a symbol type other than the first symbol type 418. In some instances, the symbols 414 of the first symbol type 418 that caused such an expansion may be caused to change to symbols 414 of a second symbol type that may look identical or nearly identical to the first symbol type, e.g., showing the same graphic but in greyscale instead of color, but which will not be “held” in the next play of the feature game. As can be seen in FIG. 9, the feature game of the present Figures is configured to change the symbols 414 of the first symbol type 418 that caused the expansion of the left column 410 of symbol positions 408 to symbols 414 of a second symbol type, e.g., a symbol type which is similar to the first symbol type 418 but which shows the symbol 414 in light grey and which will not be “held” when the next play of the feature game occurs.

In other instances, the symbols 414 of the first symbol type 418 that caused such an expansion may be caused to cease being displayed. In some such implementations, replacement symbols 414 may be selected for each symbol position 408 that is caused to cease displaying the symbol 414 of the first symbol type 418. In some such implementations, symbols 414 that are of the first symbol type 418 that are displayed as replacement symbols 414 may be "held" in the next play of the feature game.

In implementations in which the symbols 414 of the first symbol type 418 that caused such an expansion are caused to cease being displayed, the symbol positions 408 in which such symbols 414 were displayed may simply be left empty or devoid of a symbol 414 until a further feature game play occurs, in which case a new selection of symbols 414 for display in such symbol positions 418 may be made.

Additionally, in some implementations, awards of credits or points may be provided to a player in connection with the symbols 414 of the first symbol type 418 that caused such an expansion, For example, if the symbols 414 of the first symbol type 418 that caused such an expansion are COR symbols 414, then the credit or point amounts indicated for each of these COR symbols 414 may be provided to the player. As shown in FIGS. 9, the three symbols 414 of the first symbol type 418 (shown in FIG. 7) that caused the expansion of the left column 410 of symbol positions 408 had values of 25, 50, and 100 associated therewith, and the credit meter 428 has been caused to be updated to reflect that 175 credits have been provided to the player due to these COR symbols 414 causing the expansion of the left column 410 of symbol positions.

Figure 10:
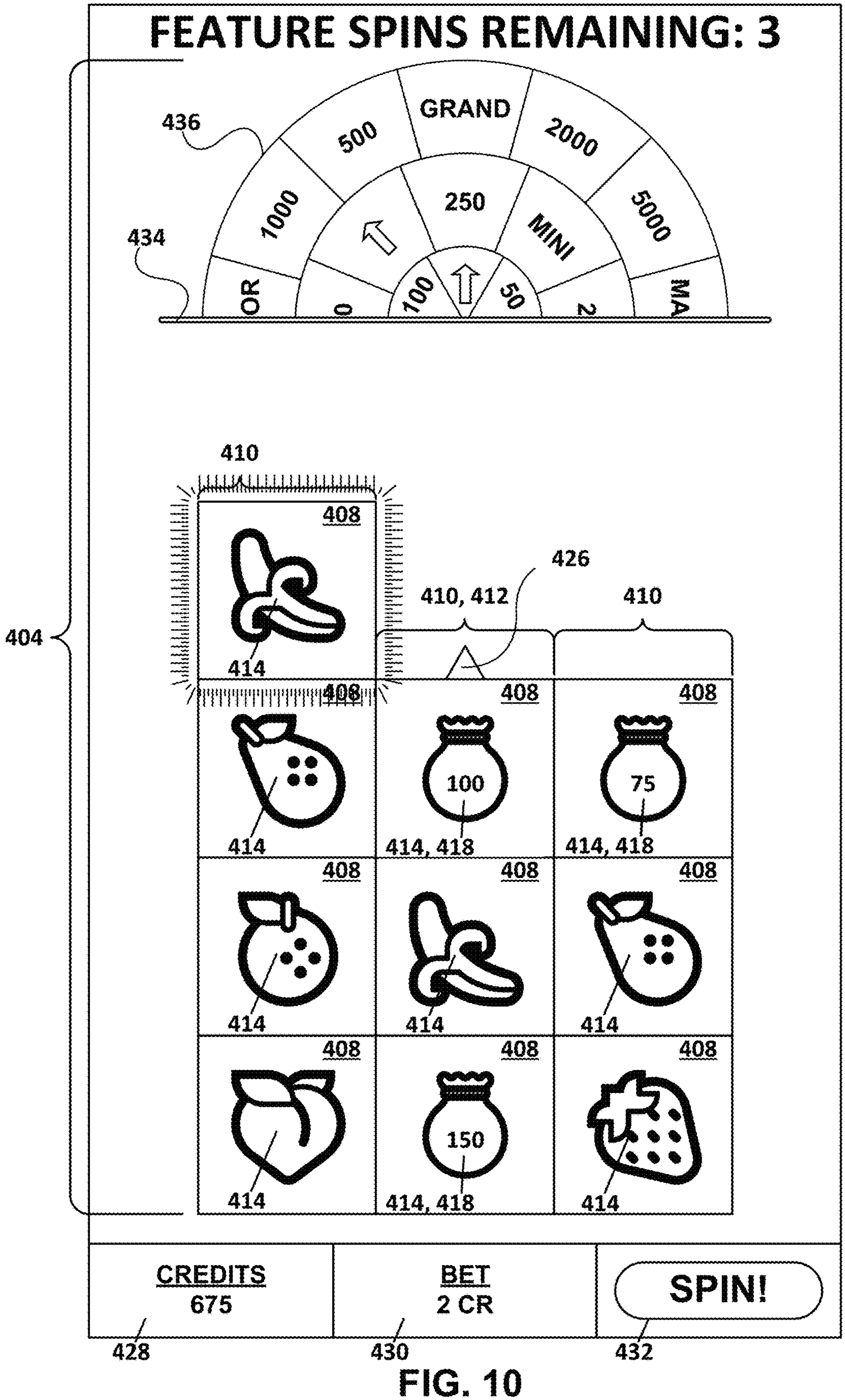

In FIG. 10, it can be seen that the GUI for the feature game 404 has been caused to display a further symbol position 408 in the left column 410 of symbol positions 408. The GUI for the feature game 404 has also caused the greyed-out COR symbols 414 (symbols 414 of the second symbol type) to be removed from display in the symbol positions 408 of the left column 410 and has been further caused to display a new selection of symbols 414 in the symbol positions 408 of the left column 410 of symbol positions 408. The selection and display of new symbols 414 in the symbol positions 408 of the left column 410 of symbol positions 408 is not the result of another play of the feature game, and thus does not cause the number of available plays of the feature game to be decremented.

Figure 11:
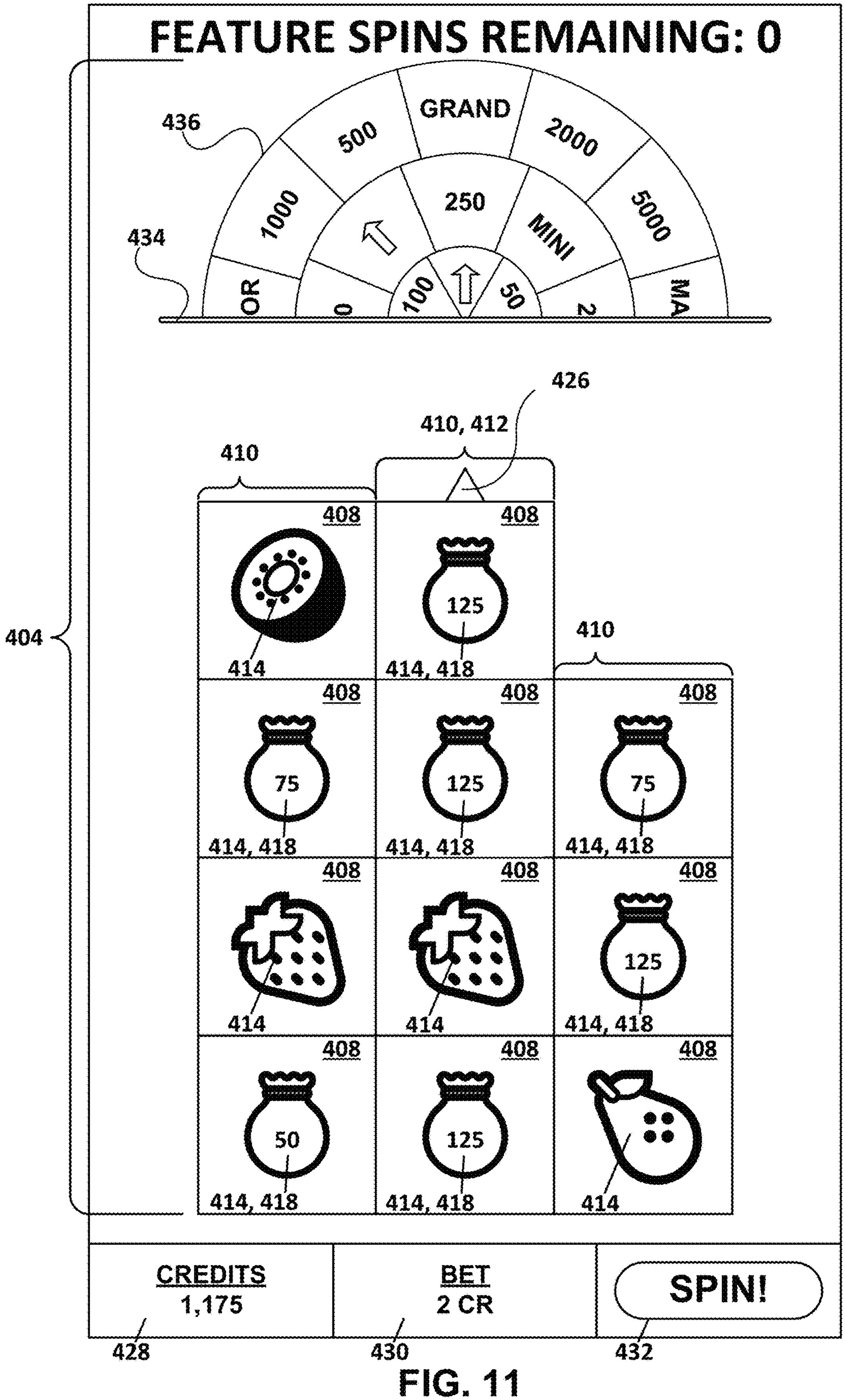
Figure 12:
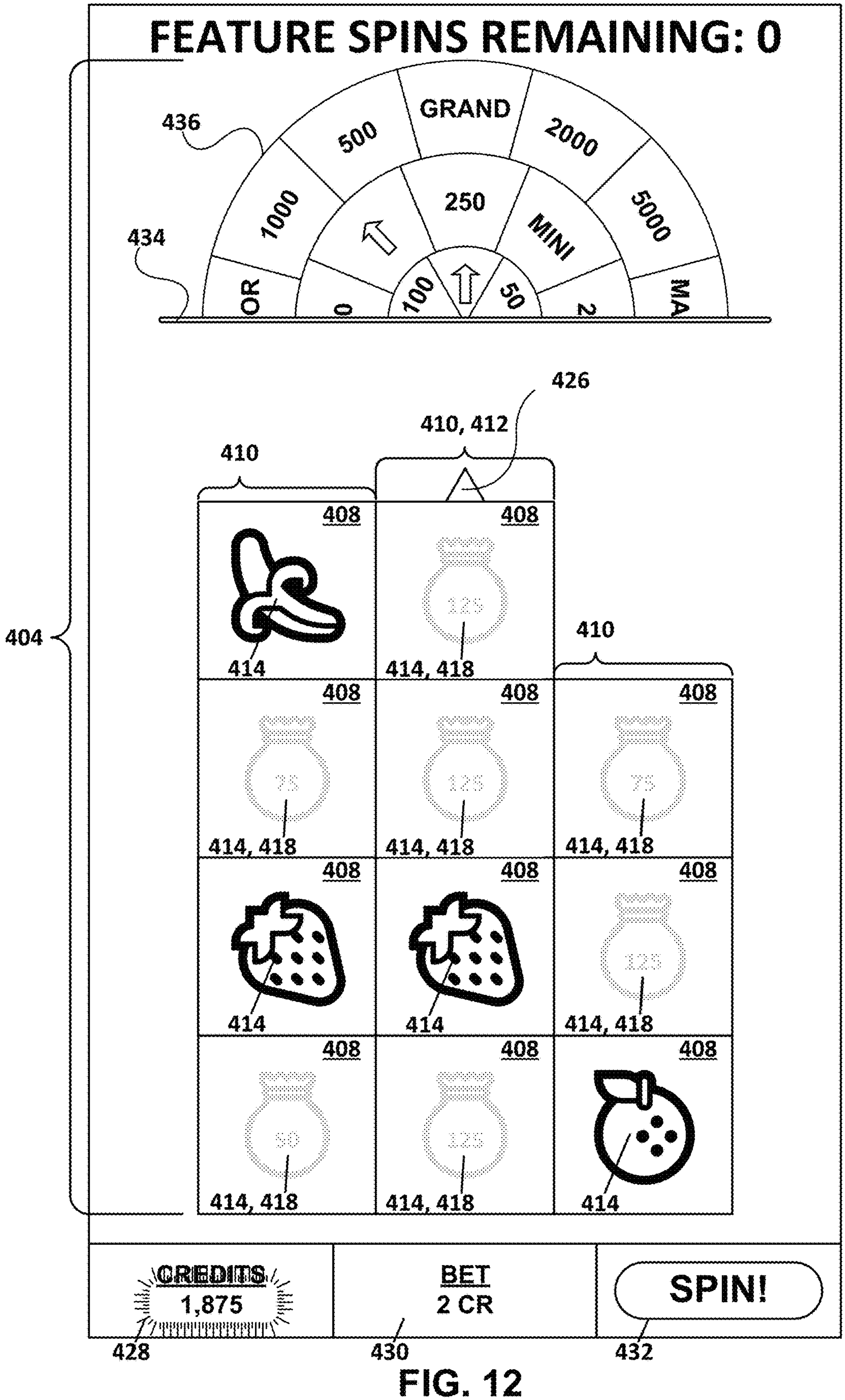

FIG. 11 shows the GUI for the feature game 404 some time after the occurrence of the events discussed above with respect to FIG. 10. In the interval between FIG. 10 and FIG. 11, the player has engaged in further feature game plays that have resulted in the first column 412 undergoing an expansion so as to include an additional symbol position 408. It will further be noted that the pointer indicator 426, if displayed or used, may also, in some implementations, be caused to move upward with the top edge of the top-most symbol indicator 408 in the first column 412 of symbol positions 408, thus approaching closer to the wheel display 436 with each expansion of the number of symbol positions 408 in the first column 412 of symbol positions 408. Additionally, the player's credit meter 428 has been updated to reflect the award of additional amounts of credits when the values associated with the symbols 414 of the first symbol type 418 that caused the above-referenced expansion of the first column 412 were provided to the player. It will be further noted that since the left column 410 and the first column 412 were expanded to each include an additional symbol position 408, additional plays of the feature game by the player have resulted in several additional symbols 414 of the first symbol type 418 being displayed in the symbol positions 408 of the left column 410 and the first column 412. However, as can be seen from the textual indicator at the top of the GUI for the feature game 404 indicating the number of feature game plays remaining, the most recent play of the feature game was the last play of the feature game, and this feature game play did not result in any newly displayed symbols 414 of the first symbol type 418. Accordingly, the number of feature game plays remaining is indicated as being zero.

As discussed above, there are at least two ways that a feature game such as that discussed above may terminate—FIG. 11 shows one of them, i.e., when the last available feature game play is used by the player without resulting in the player being provided with additional feature game plays as a result of any additional newly displayed symbol 414 of the first symbol type 418 being displayed in one of the symbol positions 408 in the columns 410 of the GUI of the feature game 404.

In some implementations in which the symbols 414 of the first symbol type 418 are COR symbols, as in the depicted example, at such a conclusion of the feature game, any amounts indicated by the symbols 414 of the first symbol type 418 may be awarded to the player. Thus, in FIG. 12, the credit meter 428 in the GUI of the feature game 404 indicates that the amounts of indicated by the symbols 414 of the first symbol type 418 that are shown in FIG. 11 have been added to the amount shown in the credit meter 428 in FIG. 11.

Figure 13:
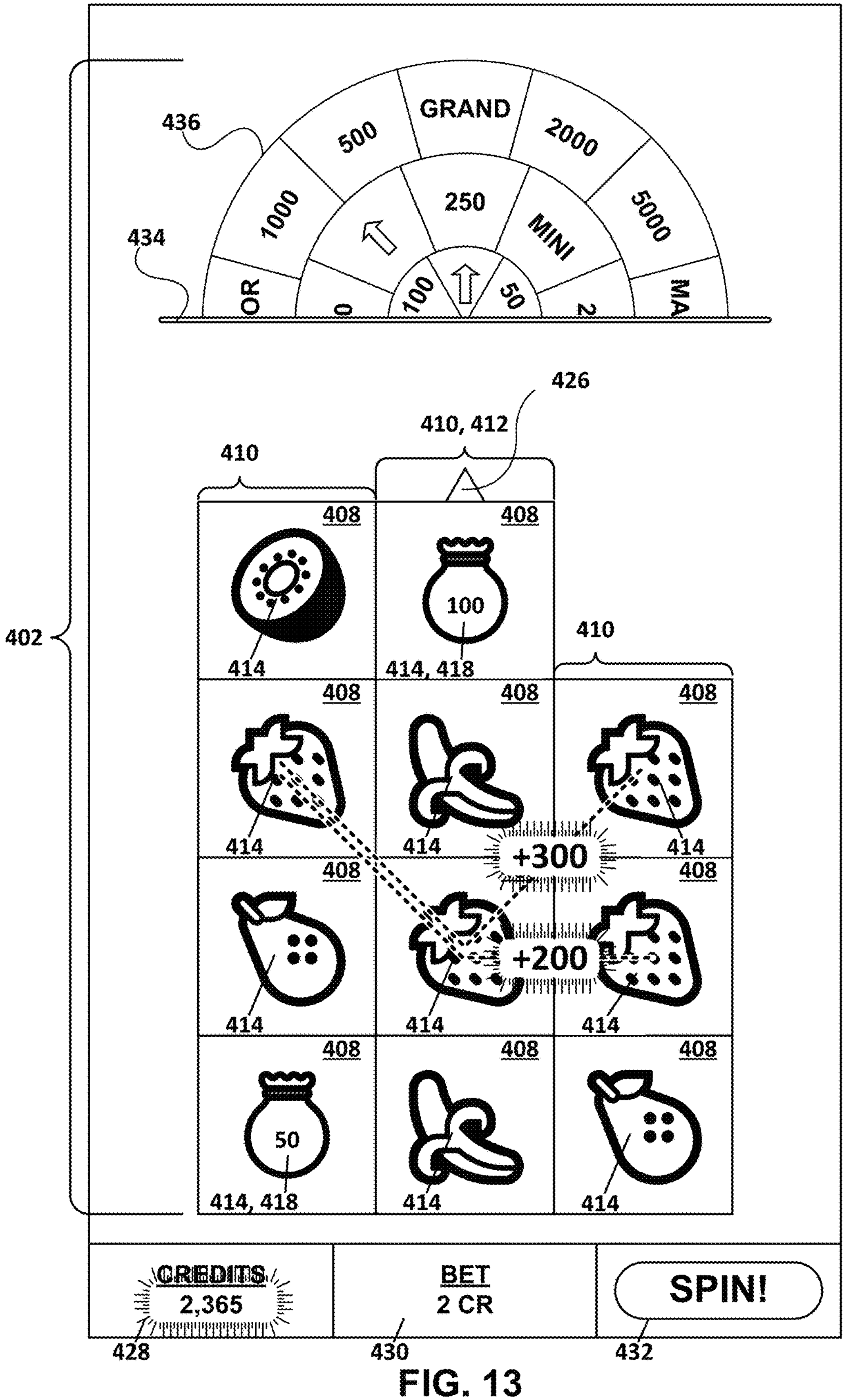

At the conclusion of the feature game, the GUI for the feature game 404 may be transitioned back to the GUI for the base game 402, as shown in FIG. 13. It will be noted that in the GUI for the base game 402, the columns 410 retain any extra symbol positions 408 that may have been added during play of the feature game. After the GUI for the base game 402 is presented again, the player may engage in further plays of the base game. During such play, for example, the player may cause new selections of symbols 414 to be displayed in the symbol positions 408 by engaging in further plays of the base game, e.g., by pressing the play button 432. When such a base game play results in certain winning patterns of symbols 414 being displayed, e.g., along a payline or paylines (such as the two dotted lines spanning the columns 410), the player may be awarded additional credits. In this example, the player has achieved three of the same type of symbol 414 along the two indicated paylines, resulting in an award of an additional 500 credits, which are shown as being added to the credit meter 428. In some implementations, each play of the base game may be made in exchange for a wager, e.g., by the wager amount shown by the wager amount indicator 430.

If, during play of the base game, the triggering condition for causing the feature game to be initiated is triggered again, then the GUI for the base game 402 may be caused to transition back to the GUI for the feature game 404. For example, in FIG. 14, the outcome for the base game shown in the GUI for the base game 402 includes five symbols 414 of the first symbol type 418, which, as discussed earlier, may satisfy the triggering condition that causes the feature game to be initiated in this example.

Figure 14:
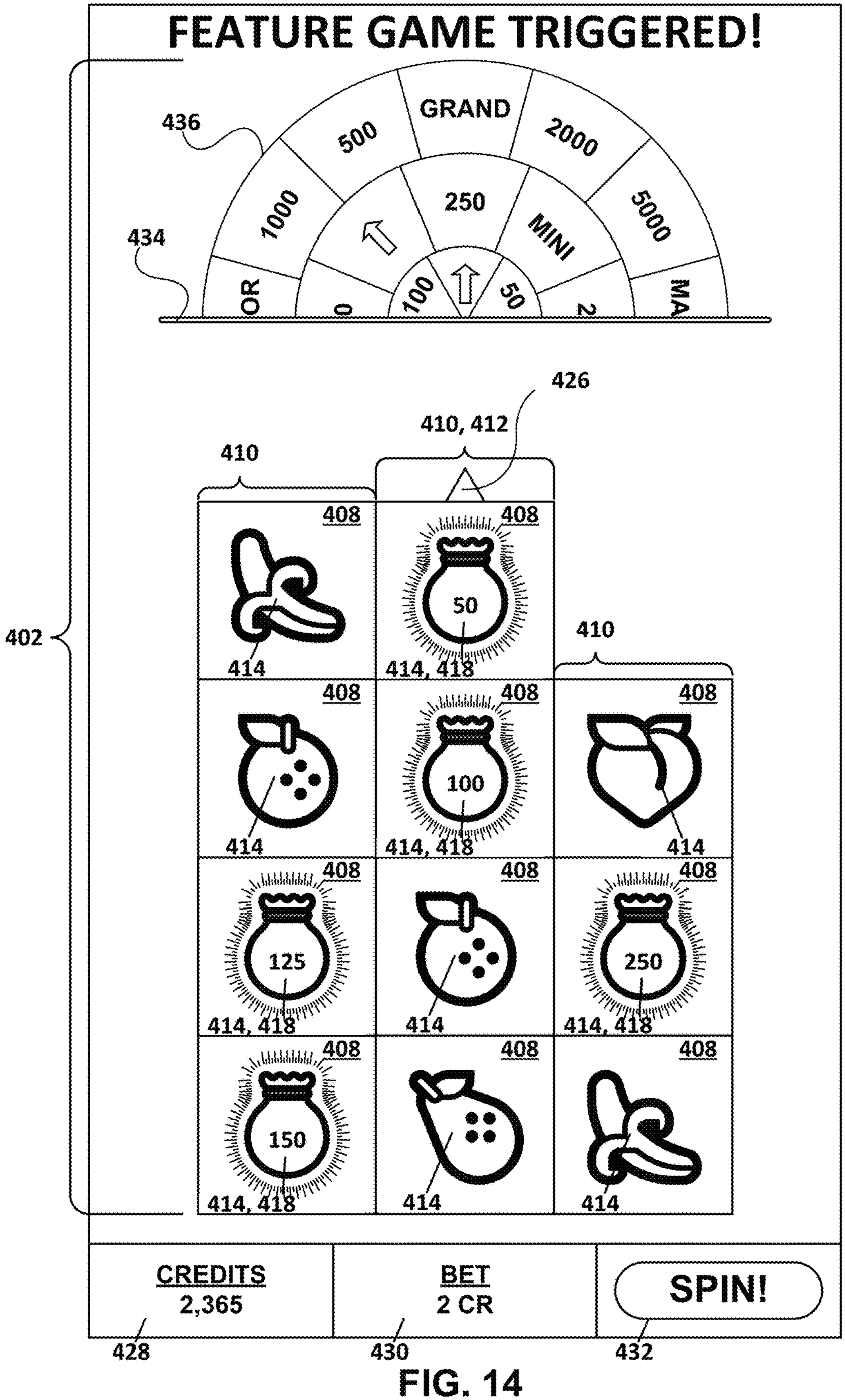
Figure 15:
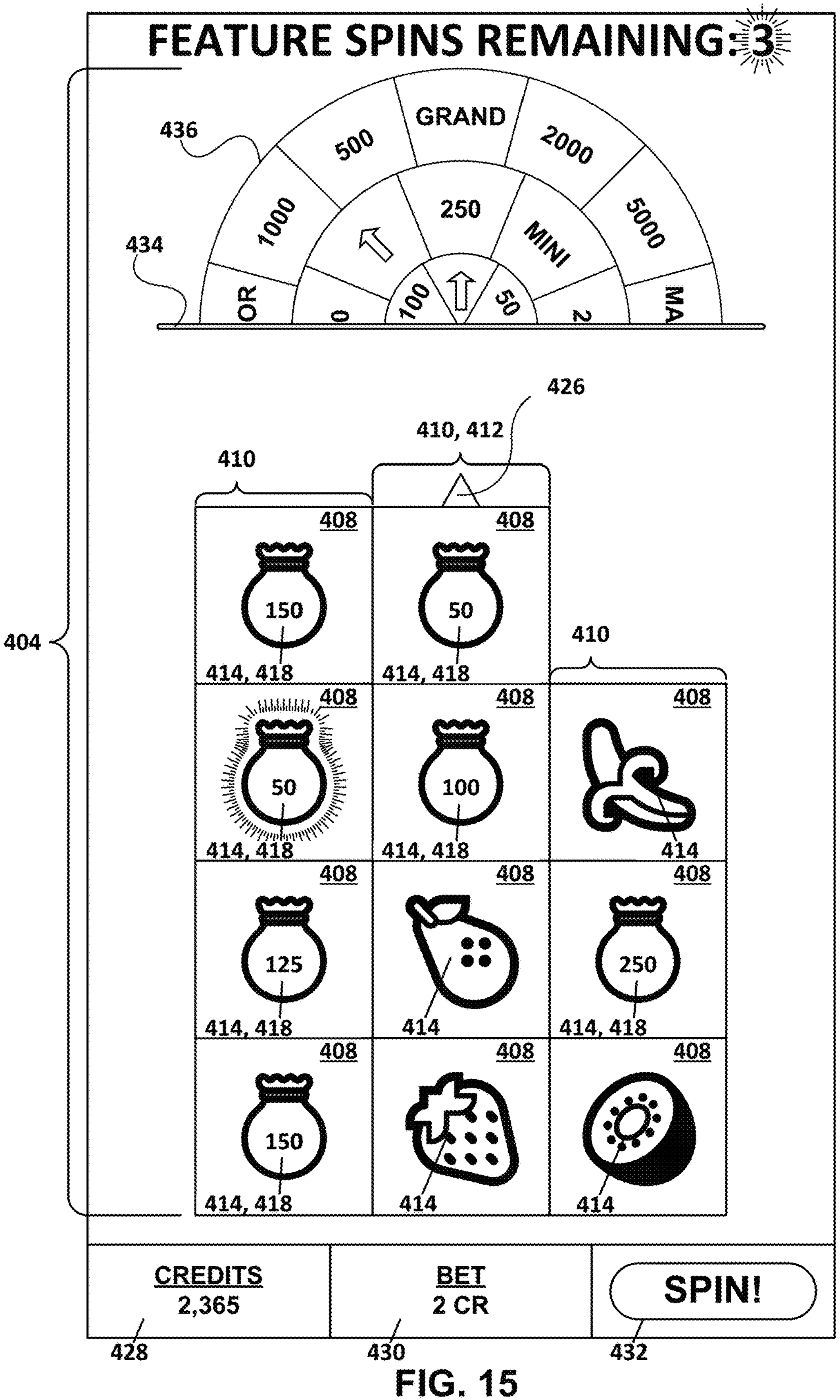

FIG. 15 shows the GUI for the feature game 404 again, after several plays of the feature game have occurred subsequent to the initiation of the feature game responsive to the outcome shown in FIG. 14. The symbols 414 of the first symbol type 418 shown in the bottom two symbol positions 408 of the left column 410, the top two symbol positions 408 of the first column 412, and the middle symbol position 408 of the right column 410 are the symbols 414 of the first symbol type 418 shown in FIG. 14 that triggered the initiation of the feature game and were held in place once the GUI for the feature game 404 was presented. As can be seen, an additional symbol 414 of the first symbol type 418 resulting from an earlier play of the feature game is shown in the upper left symbol position 408. In the outcome of the feature game depicted in the GUI for the feature game 404 shown in FIG. 15, a newly displayed symbol 414 of the first symbol type 418 is shown in the third symbol position 408 from the bottom of the left column 410. This results in all of the symbol positions 408 in the left column 410 displaying symbols 414 of the first symbol type 418. As the left column 410 has less than its corresponding maximum number of symbol positions 408, the display of the symbols 414 of the first symbol type 418 in all of the symbol positions 408 of the left column 410 will result in the addition of another symbol position 408 to the left column 410, making the number of symbol positions 408 in the left column 410 the maximum number of symbol positions 408 for the left column 410. It will also be noted that the number of available plays of the feature game indicated by the text along the top of the GUI for the feature game 404 has been updated to indicate that three plays of the feature game are remaining (due to the new display of a symbol 414 of the first symbol type 418).

Figure 16:
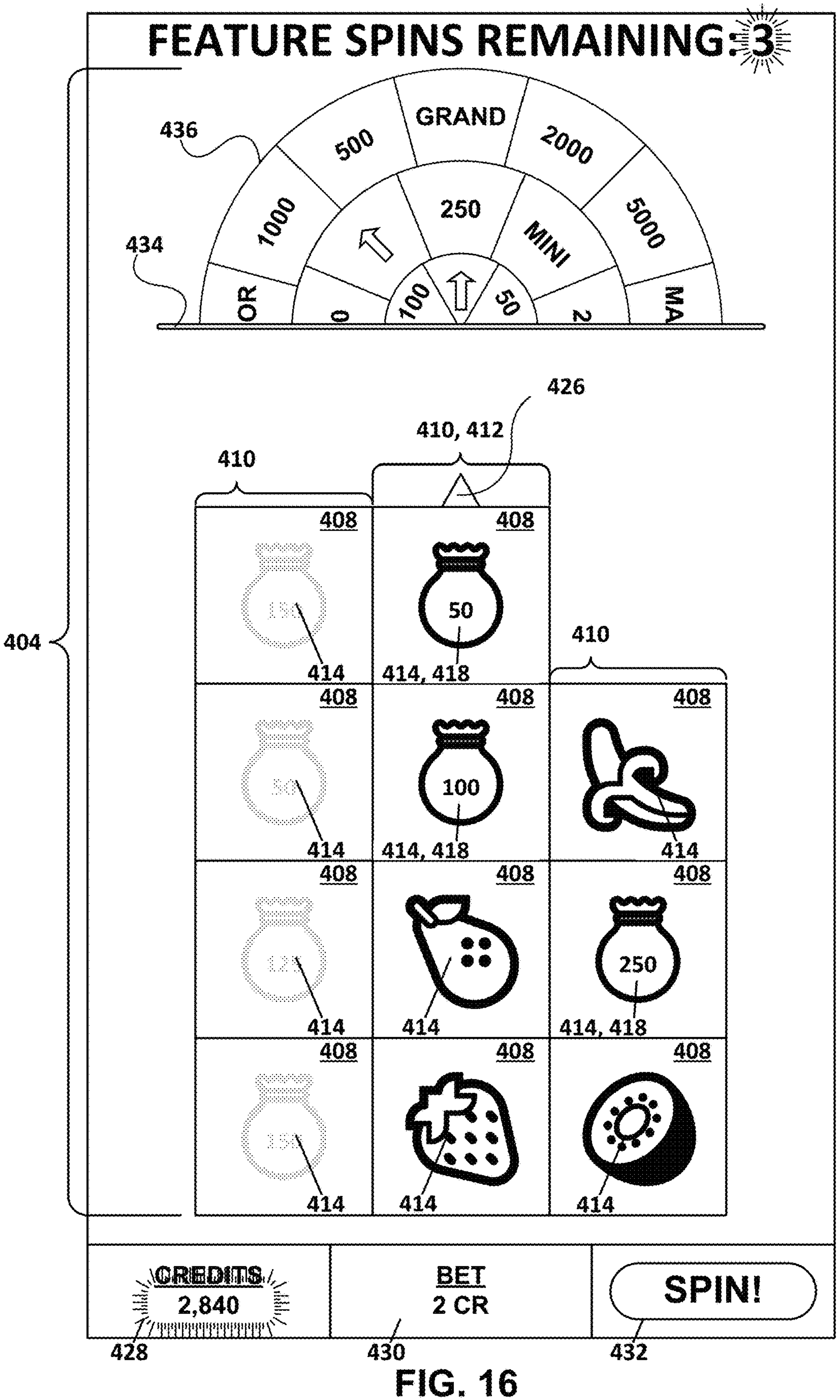

As with the earlier expansion of the left column 410, e.g., as shown in FIGS. 8 through 10, the values shown on the symbols 414 of the first symbol type 418 in the left column 410 may, prior to (or as part of) the expansion of the left column 410 of symbol positions 408, be awarded to the player, as reflected in the additional amount added to the credit meter 428 in FIG. 16.

Figure 17:
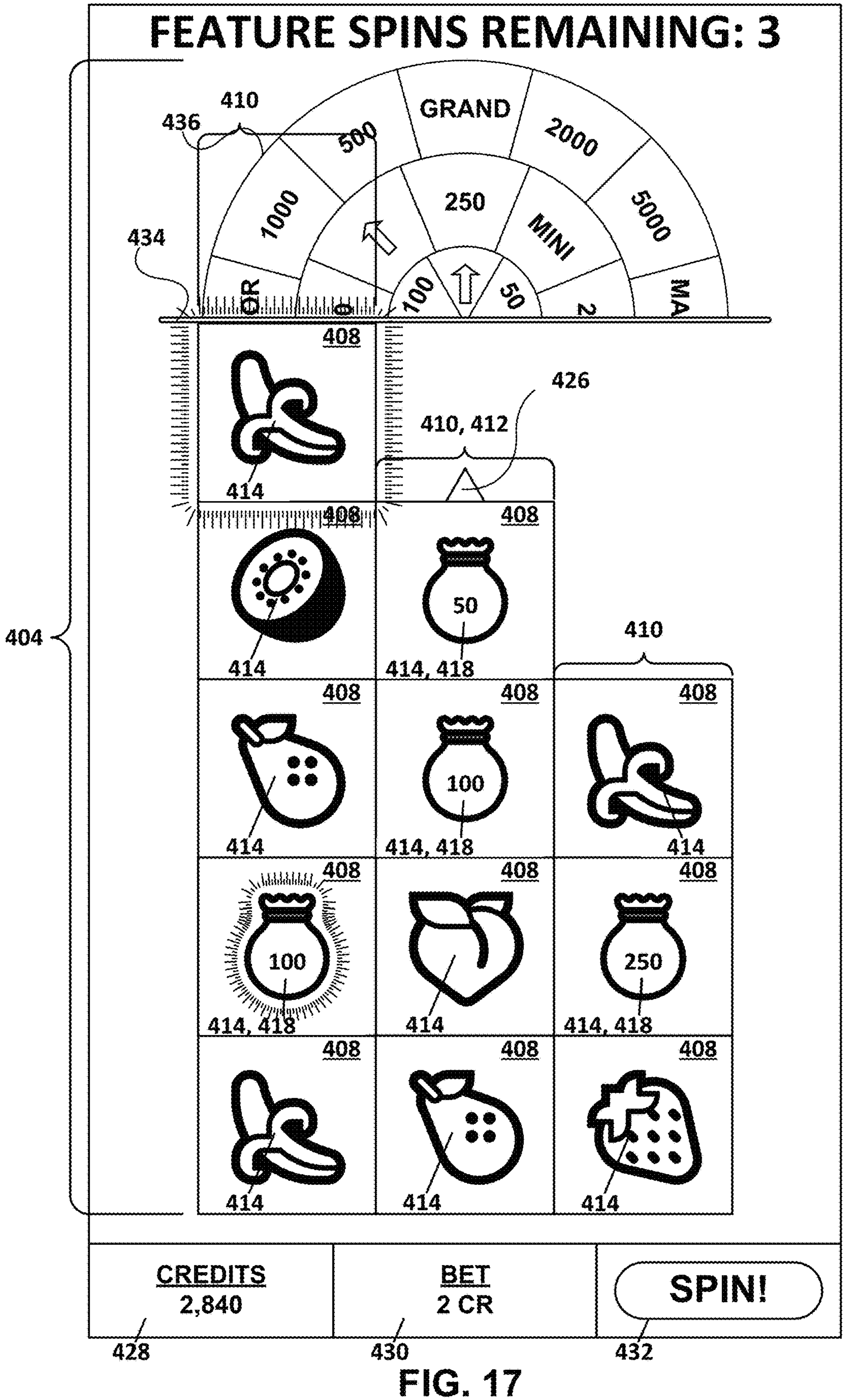

In FIG. 17, the GUI for the feature game 404 has been updated to add an additional symbol position 408 to the left column 410 of symbol positions 408. Moreover, newly selected symbols 414 have been caused to be displayed in the symbol positions 408 of the expanded left column 410 after the symbols 414 of the first symbol type 418 displayed in the symbol positions 408 of the left column 410 have been caused to cease being displayed. As can be seen, the newly displayed symbols 414 in the left column 410 include a newly displayed symbol 414 of the first symbol type 418, which will be held in subsequent plays of the feature game.

Figure 18:
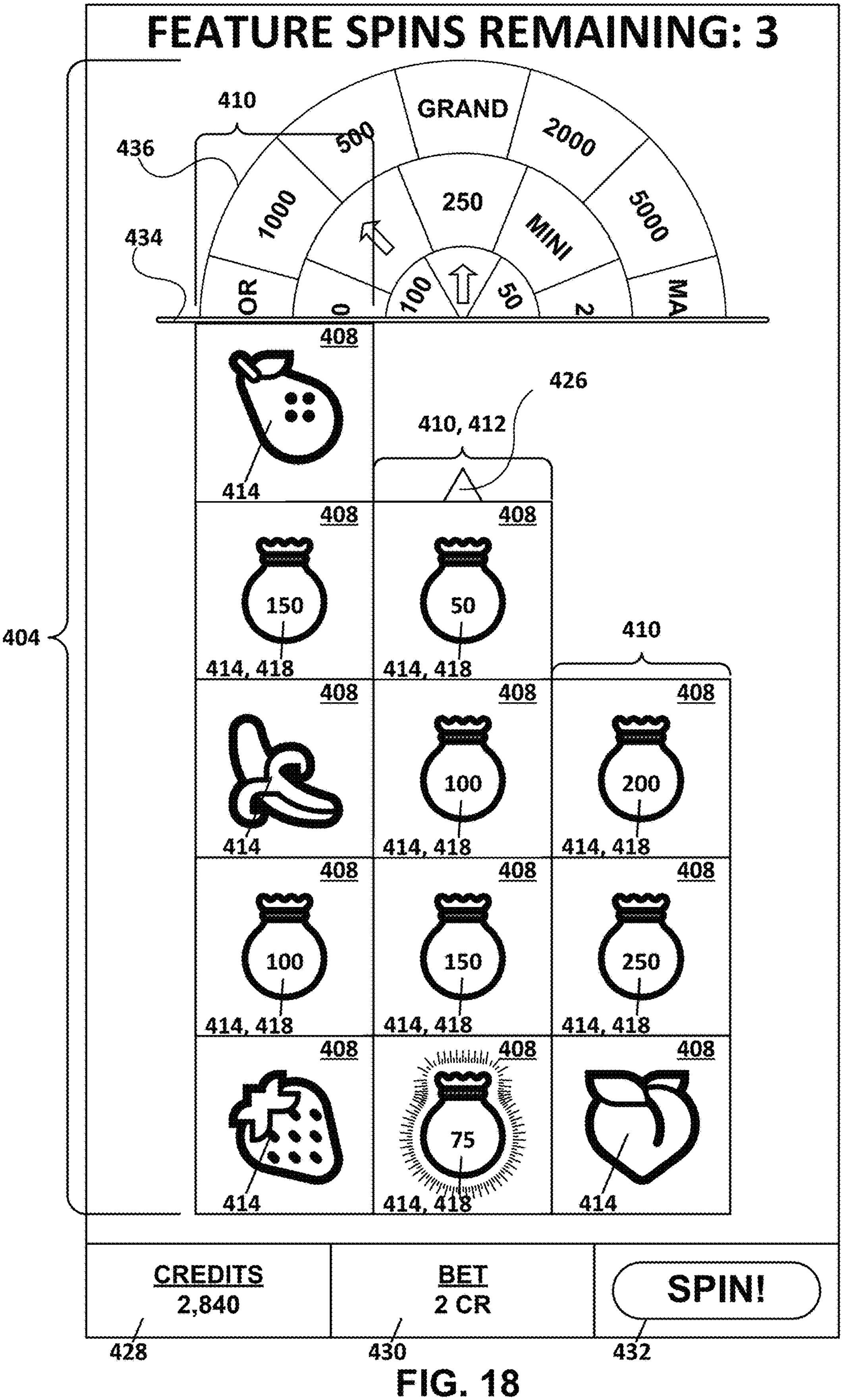

FIG. 18 shows the GUI for the feature game 404 after further plays of the feature game. As can be seen, additional symbols 414 of the first symbol type 418 have been displayed in the symbol positions 408 second from the top of the left column 410 and second from the bottom of the first column 412 in earlier plays of the feature game. Additionally, a symbol 414 of the first symbol type 418 has been newly displayed in the bottommost symbol position 408 of the first column 412, resulting in all of the symbol positions 408 of the first column 412 displaying symbols 414 of the first symbol type 418. As the first column 412 does not yet include the corresponding maximum number of symbol positions 408, the display of symbols 414 of the first symbol type 418 in all of the symbol positions 408 of the first column 412 results in the first column 412 being expanded to include a further symbol position 408.

Figure 19:
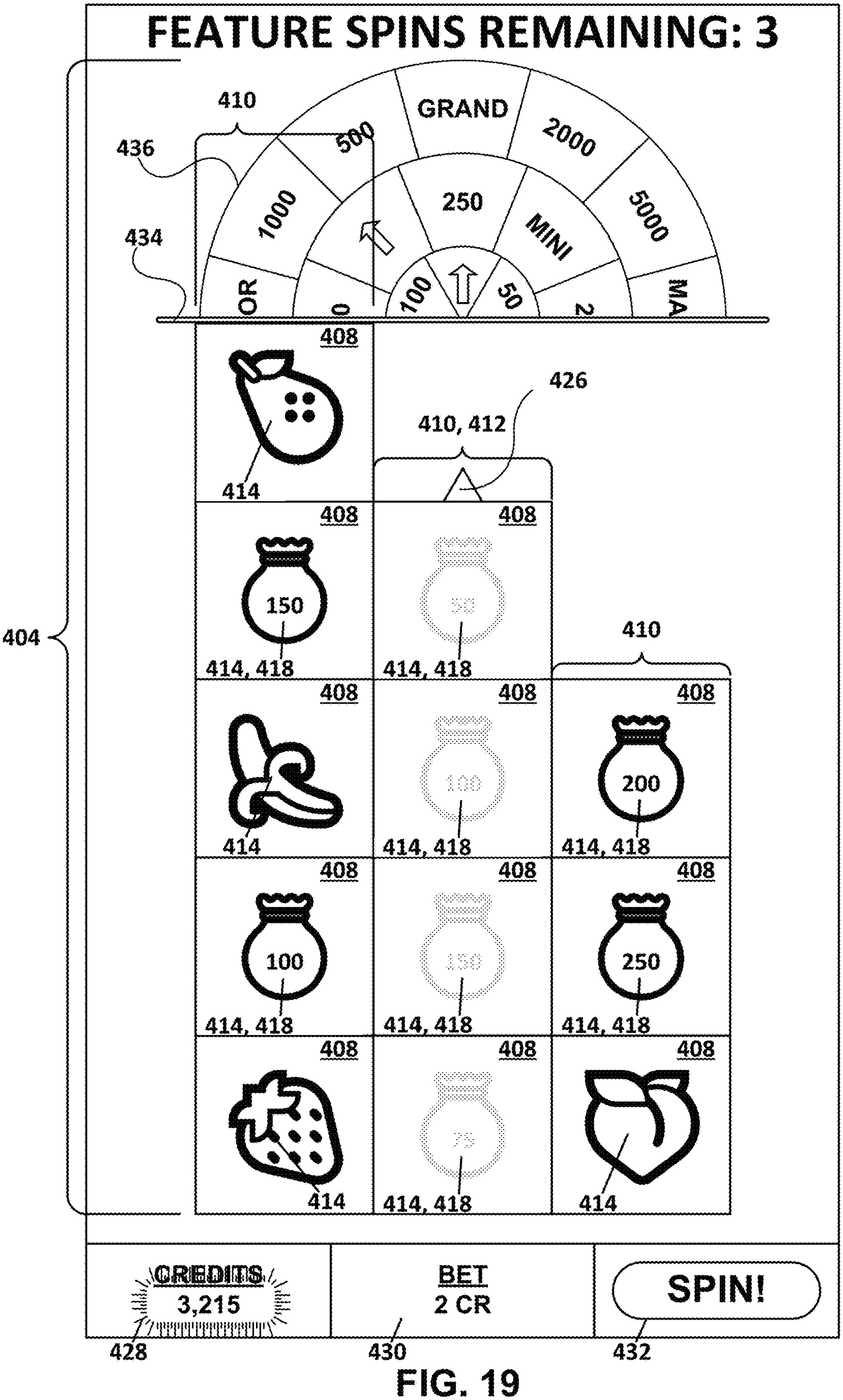

As with the earlier expansion of the first column 412, e.g., as shown in FIGS. 8 through 10, the values shown on the symbols 414 of the first symbol type 418 in the first column 412 may, prior to (or as part of) the expansion of the first column 412 of symbol positions 408, be awarded to the player, as reflected in the additional amount added to the credit meter 428 in FIG. 19.

Figure 20:
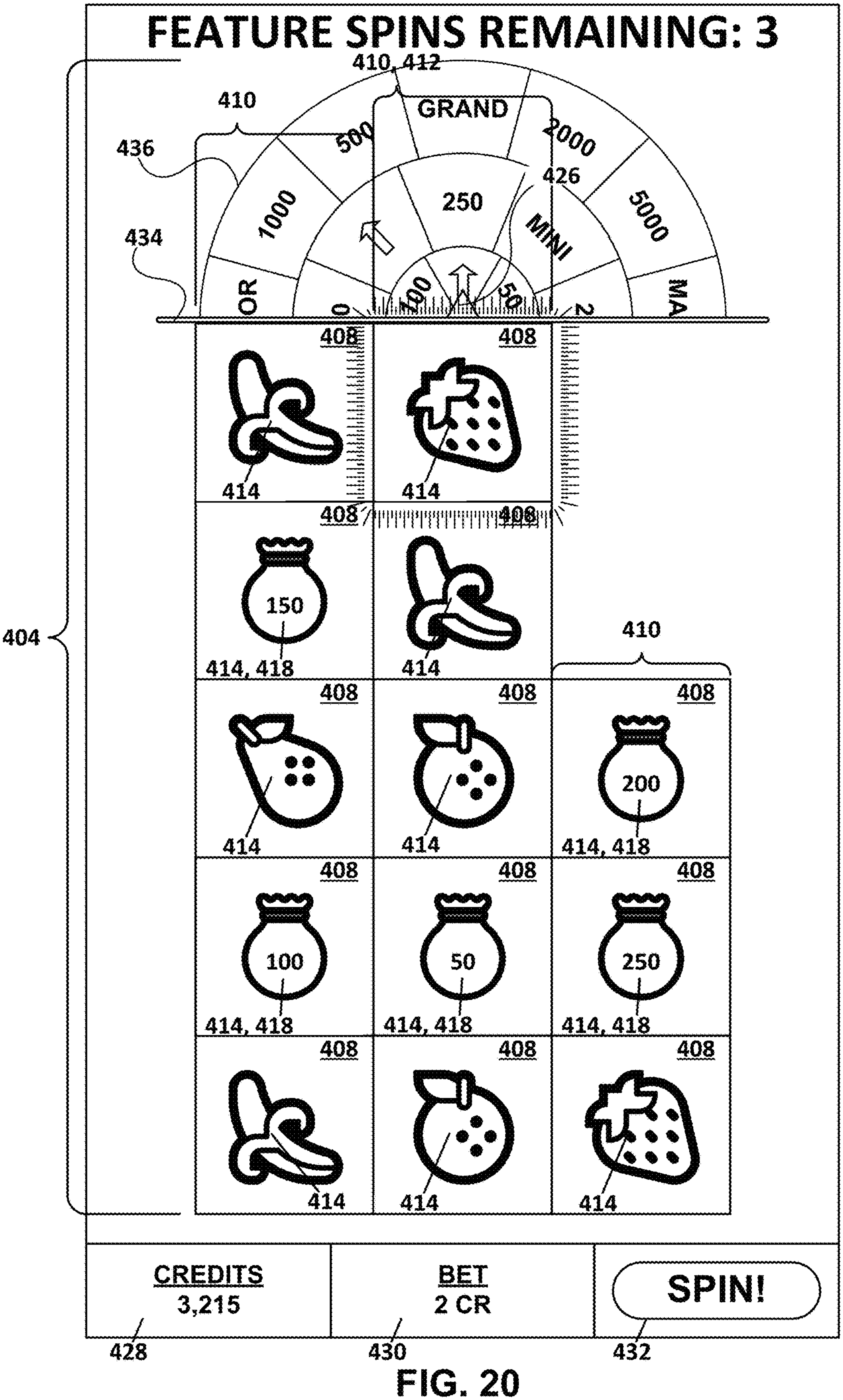

In FIG. 20, the GUI for the feature game 404 has been updated to add an additional symbol position 408 to the first column 412 of symbol positions 408. Moreover, newly selected symbols 414 have been caused to be displayed in the symbol positions 408 of the expanded first column 412 after the symbols 414 of the first symbol type 418 displayed in the symbol positions 408 of the first column 412 have been caused to cease being displayed. As can be seen, the newly displayed symbols 414 in the first column 412 include a newly displayed symbol 414 of the first symbol type 418, which will be held in subsequent plays of the feature game.

Figure 21:
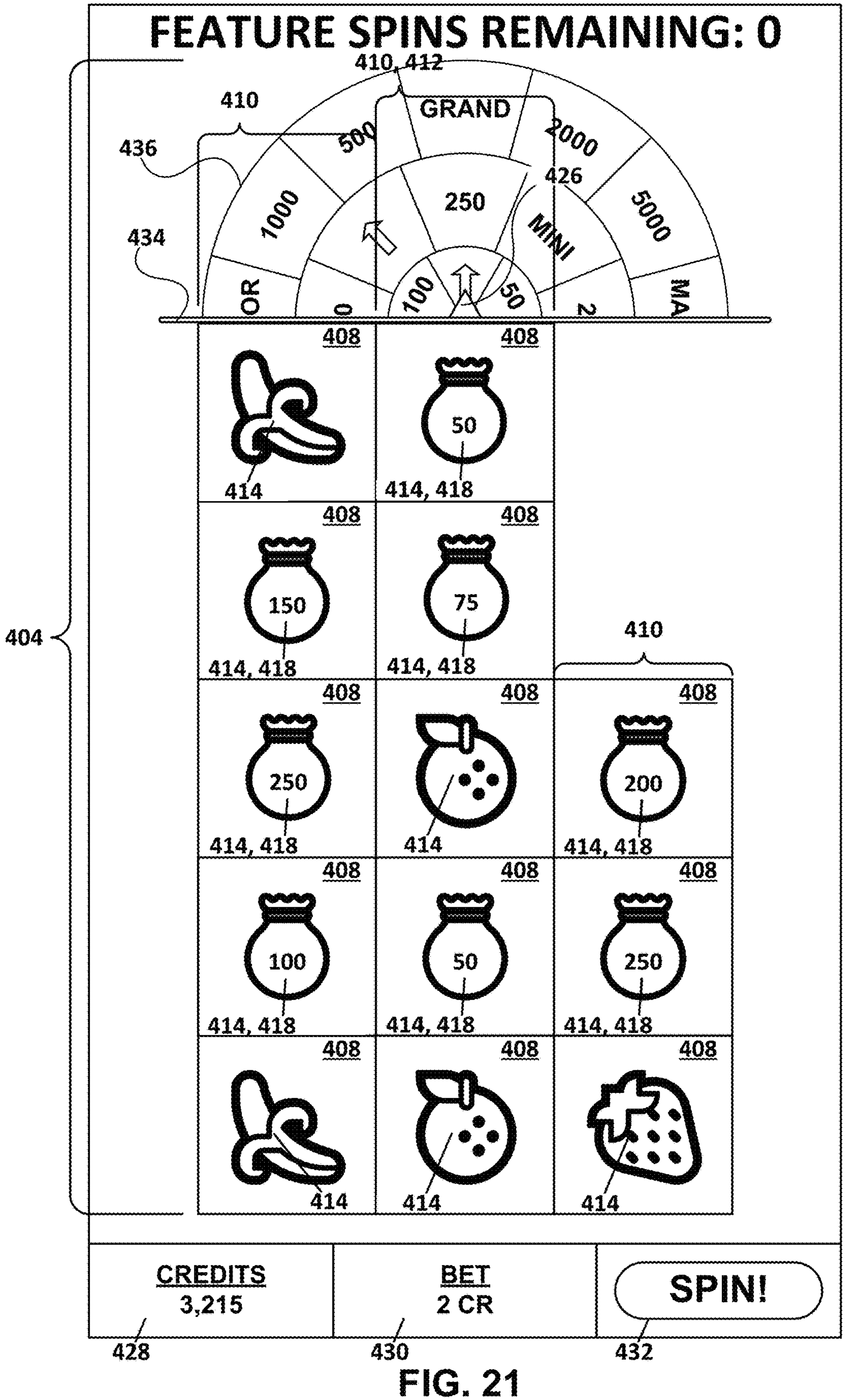

FIG. 21 depicts the GUI for the feature game 404 after several additional plays of the feature game. During such additional plays of the feature game, additional symbols 414 of the first symbol type 418 have been displayed in the symbol positions 408 in the middle of the left column 410 and the top two symbol positions 408 of the first column 412. However, the most recent play of the feature game did not result in any newly displayed symbols 414 of the first symbol type 418, and the number of remaining plays of the feature game, as indicated by the text along the top of the GUI for the feature game 404 indicates that no further plays of the feature game remain. As a result, the feature game concludes, similar to how the feature game instance depicted in FIGS. 6 through 12 concluded.

Figure 22:
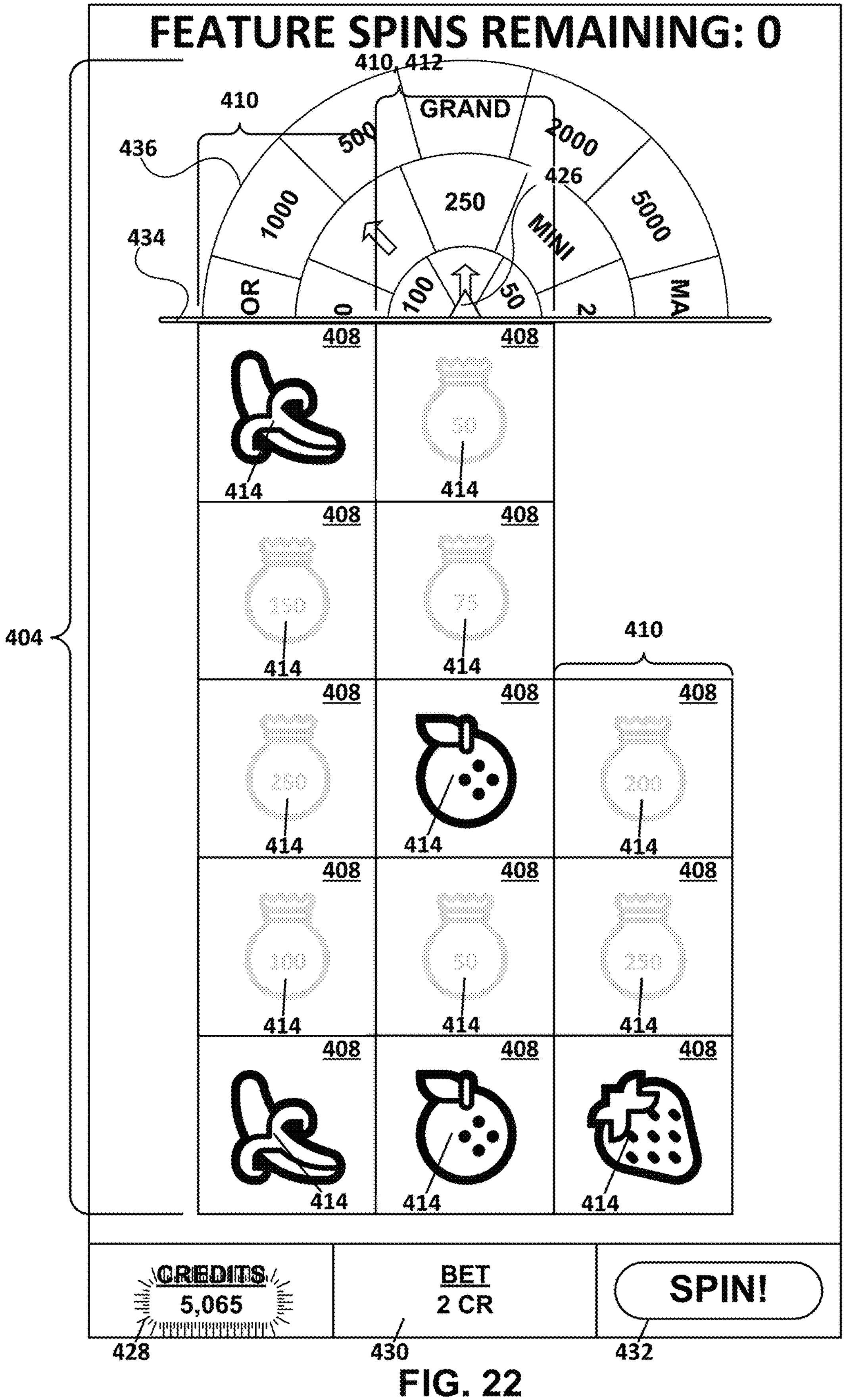

For example, as depicted in FIG. 22, the amounts indicated by the symbols 414 of the first symbol type 418 may be awarded to the player. Thus, in FIG. 22, the credit meter 428 in the GUI of the feature game 404 indicates that the amounts of indicated by the symbols 414 of the first symbol type 418 that are shown in FIG. 21 have been added to the amount shown in the credit meter 428 in FIG. 21.

Figure 23:
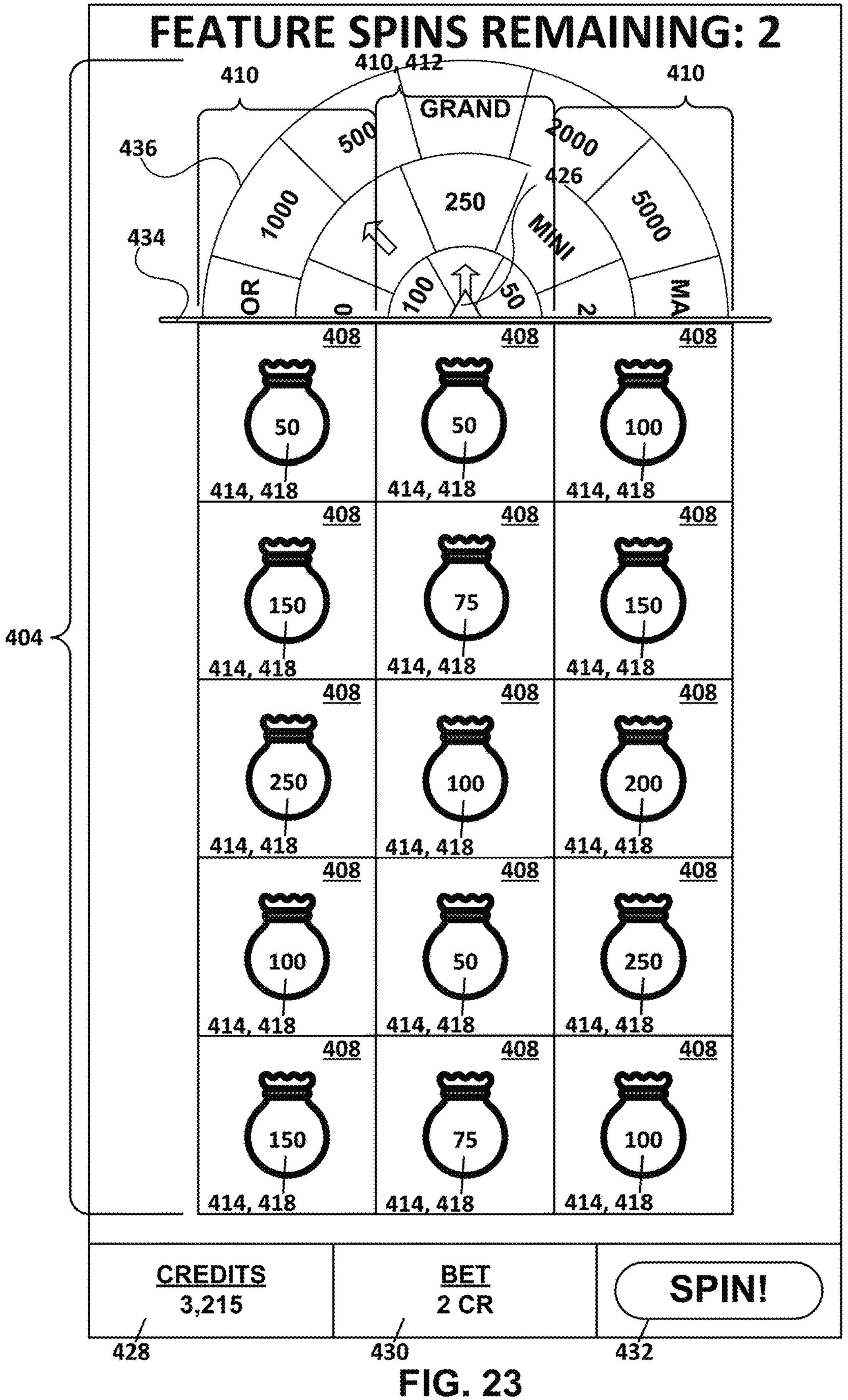

As noted earlier with respect to FIG. 11, the way in which the feature game concludes with respect to FIGS. 21 and 22 is one of at least two ways that the feature game may conclude. FIG. 23 depicts an alternate way in which the feature game may conclude—even when there are still unused feature game plays remaining. For example, if a play of the feature game while all of the columns 410 include their respective maximum number of symbol positions 408 results in all of the symbol positions 408 displaying symbols 414 of the first symbol type 418, this may alternatively cause the feature game to conclude. This is illustrated in FIG. 23, in which each of the three columns 410 include the respective maximum number, e.g., five in this case, of symbol positions 408, and all of the symbol positions 408 display symbols 414 of the first symbol type 418 (with the most recent play of the feature game having resulted in a newly displayed symbol 414 of the first symbol type 418 being displayed in the symbol position 408 second from the bottom of the first column 412).

Figure 24:
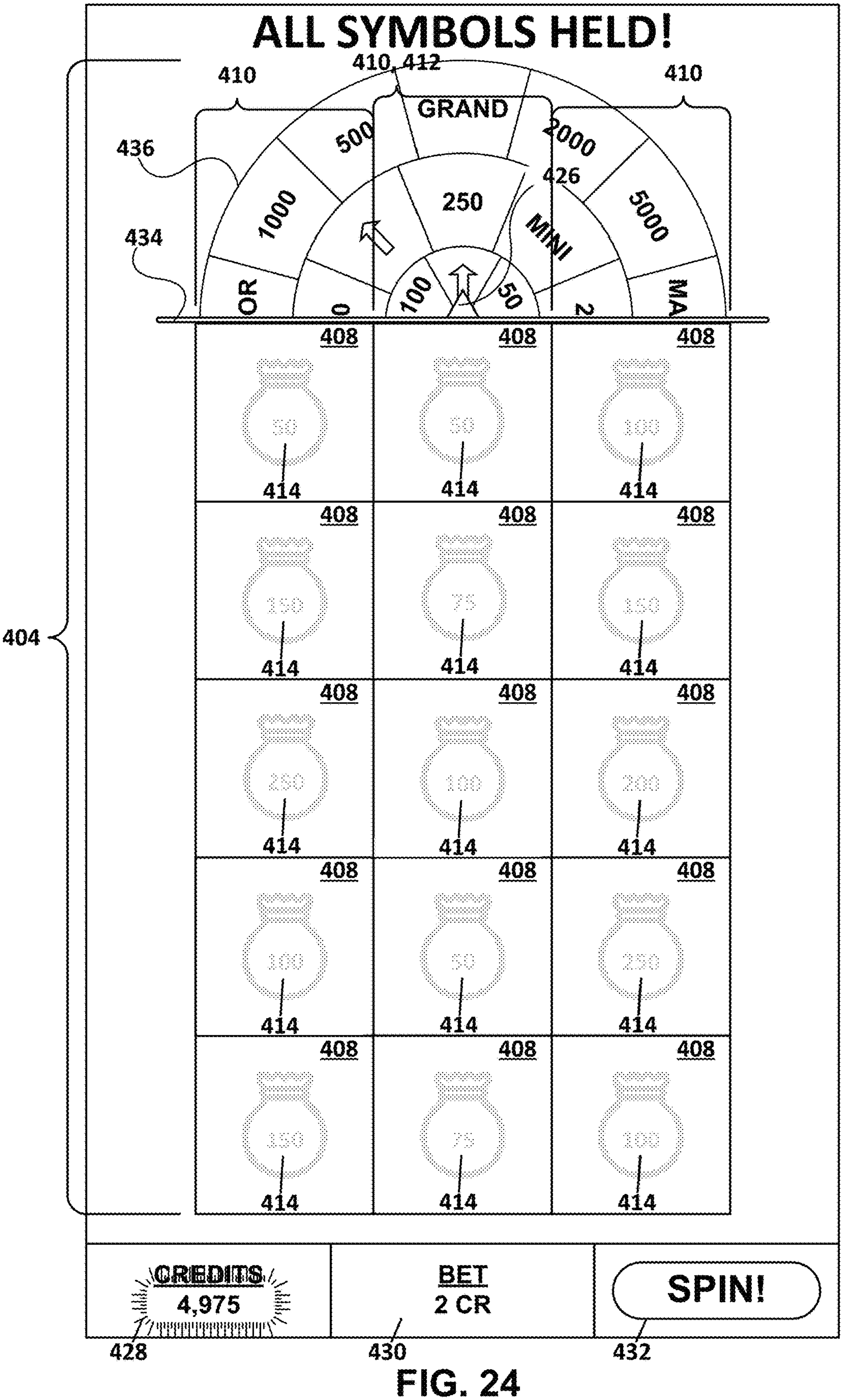

As can be seen in FIG. 24, the GUI for the feature game 404 has been updated to reflect that the feature game has concluded (the text along the top of the GUI for the feature game 404 now says "ALL SYMBOLS HELD!" to indirectly indicate this), and the credit meter 428 has been updated to reflect the award of all of the amounts indicated by the symbols 414.

Figure 25:
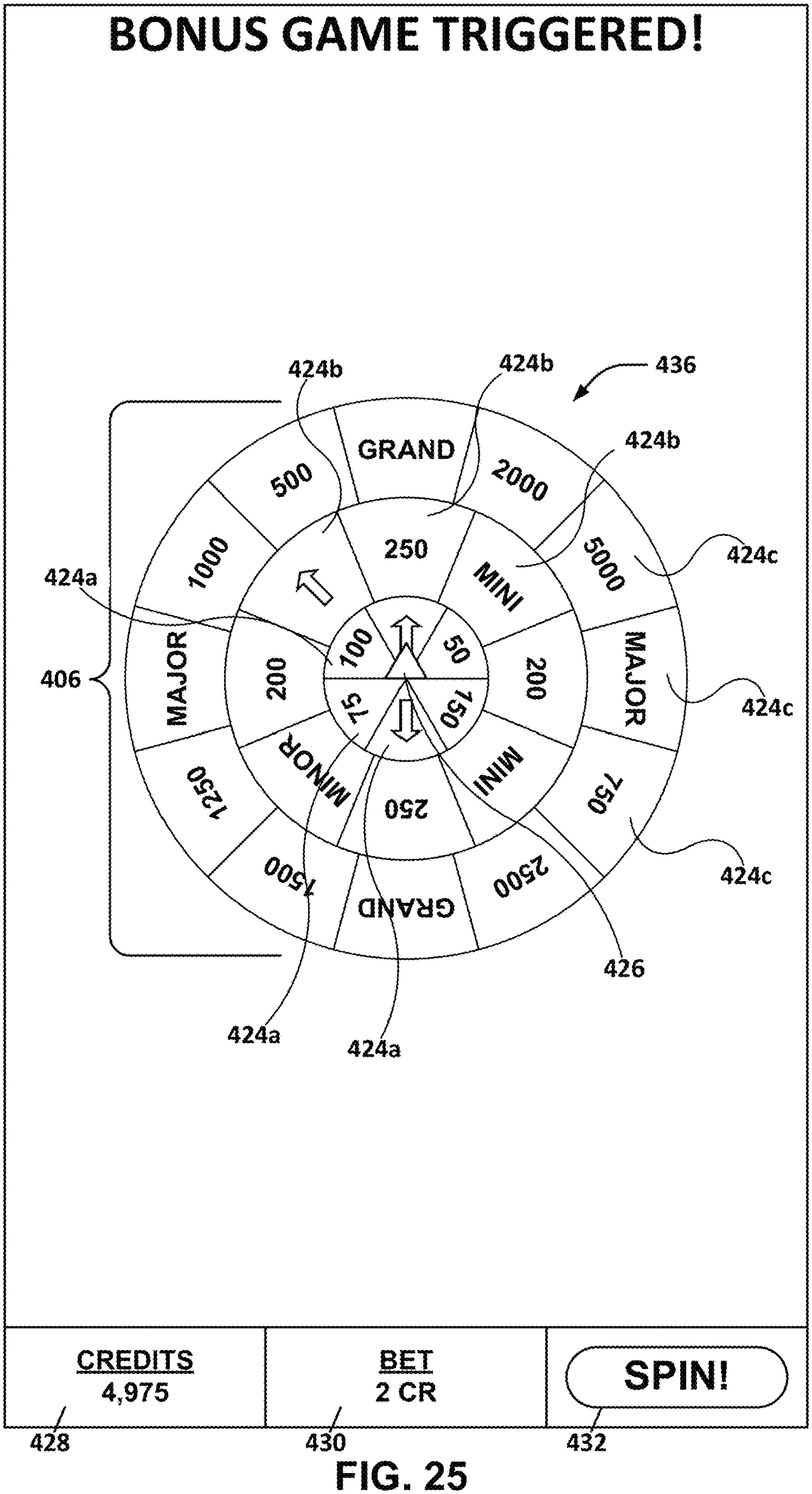

In instances in which the feature game concludes with the first column 412 having its maximum number of symbol positions 408 (which would include every instance in which the feature game concludes as shown in FIGS. 23 and 24), some implementations may provide for a bonus game to be initiated after the feature game concludes (or as part of the conclusion of the feature game). For example, the GUI for the feature game 404 may be transitioned to a GUI for a bonus game 406, as shown in FIG. 25. The GUI for the bonus game 406, in this example, includes the wheel display 436 that was included in the GUI for the base game 402 and the GUI for the feature game 404. It will be appreciated that while the wheel display 436 was shown, in whole or at least in part, in all three of the GUI for the base game 402, the GUI for the feature game 404, and the GUI for the bonus game 406, other implementations may, for example, hide the wheel display 436 (or any alternative bonus game GUI elements that may be used in place of the wheel display 436) in one or both of the GUI for the base game 402 and the GUI for the feature game 404. Moreover, it will be appreciated that while the wheel display 436 is shown in its entirety in the GUI for the bonus game 406, other implementations may continue to display the wheel display 436 in the manner shown in the GUI for the base game 402 and the GUI for the feature game 404, e.g., half-hidden, as if the wheel of the wheel display 436 were positioned behind a wall that obscures the lower half of the wheel but allows the upper half to be visible.

Regardless of what format of bonus game is shown in the GUI for the bonus game 406, the GUI for the bonus game 406 may include a plurality of outcome indicators. One or more of the outcome indicators may be selected responsive to each play of the bonus game, indicated by the GUI for the bonus game 406 as being a selected outcome indicator, and the player then provided with whatever reward is indicated by the selected outcome indicator(s) (if any—in some implementations, one or more of the outcome indicators may not have any reward associated therewith). In the example of FIG. 25, the GUI for the bonus game 406 includes a plurality of outcome indicators in the form of wheel segments 424, such as wheel segments 424*a*, 424*b*, and 424*c* that are arranged in circular arrays about a common center point to provide the wheel display 436. The wheel segments 424*a*, 424*b*, and/or 424*c* may be caused, for example, to rotate about the center point during play of the bonus game and then caused to stop, for example, with the selected outcome indicator/wheel segment 424 positioned such that the pointer indicator 426, if used, is pointing towards or into the selected outcome indicator/wheel segment 424.

The wheel display 436 is, in this example, a multi-tier wheel display 436 in which there are three tiers of wheel segments 424. Bonus games having such multi-tier wheel displays 436 (or similar multiple tiers of outcome indicators in other formats) may be configured such that only an outcome indicator from the first tier of outcome indicators may be selected during play of the bonus game while the bonus game is in a first phase, which may be the phase of the bonus game in which the bonus game is initiated. One or more of the outcome indicators in the presently active tier may, when selected as the selected outcome indicator, cause the bonus game to progress to a subsequent phase in which selections of the selected outcome indicator may be made from the outcome indicators in the next tier of outcome indicators. During play of such a bonus game, selection of a particular outcome indicator or indicators from the outcome indicators that are selectable in a given phase may result in the bonus game progressing to a next phase of the bonus game in which the selected outcome indicator may be selected from a different group of outcome indicators in response to a play of the bonus game.

In the wheel display 436, there is a first plurality of six first wheel segments 424*a*, a second plurality of eight second wheel segments 424*b*, and a third plurality of twelve third wheel segments 424*c* that are all arranged about the common center point, e.g., with the first plurality of first wheel segments 424*a* lying within the second plurality of second wheel segments 424*b* and the second plurality of second wheel segments 424*b* lying within third plurality of third wheel segments 424*c*.

Figure 26:
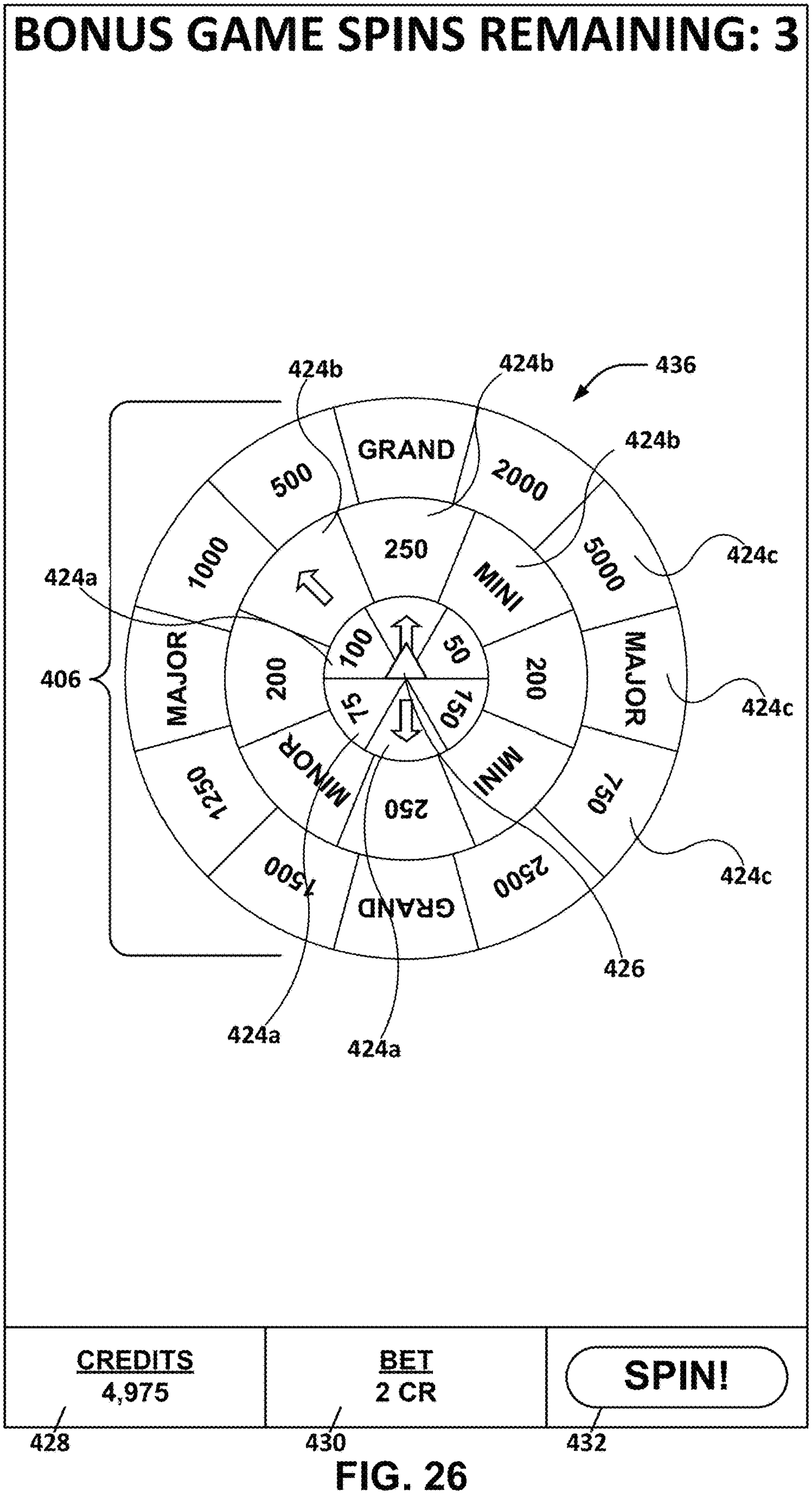

When the bonus game is initiated, the GUI for the bonus game 406 may be caused, as shown in FIG. 26, to indicate a first amount of bonus game plays available to the player (three bonus game plays in this example), similar to how the GUI for the feature game 404 may be caused to indicate a number of feature game plays available to the player. In some implementations, the first amount of bonus game plays may be a fixed amount, e.g., one bonus game play, two bonus game plays, or three bonus game plays. In other implementations, the first amount of bonus game plays provided to the player by way of the GUI for the bonus game 406 at the initiation of the bonus game may vary depending on various factors. For example, if only the first column 412 of symbol positions 408 in the feature game includes the corresponding maximum number of symbol positions 408 at the time the bonus game is initiated, then the first amount of bonus game plays available at the initiation of the bonus game may be set to a first value, e.g., one. Similarly, if the first column 412 of symbol positions 408 and one other column 410 in the feature game each includes the corresponding maximum number of symbol positions 408 at the time the bonus game is initiated, then the first amount of bonus game plays available at the initiation of the bonus game may be set to a second value higher than the first value, e.g., two, and if the first column 412 of symbol positions 408 and two other columns 410 in the feature game each include the corresponding maximum number of symbol positions 408 at the time the bonus game is initiated, then the first amount of bonus game plays available at the initiation of the bonus game may be set to a third value higher than the second value. Generally speaking, in such implementations the first amount of bonus game plays that are made available may increase with each additional column 410 that includes the corresponding maximum number of symbol positions 408.

Figure 27:
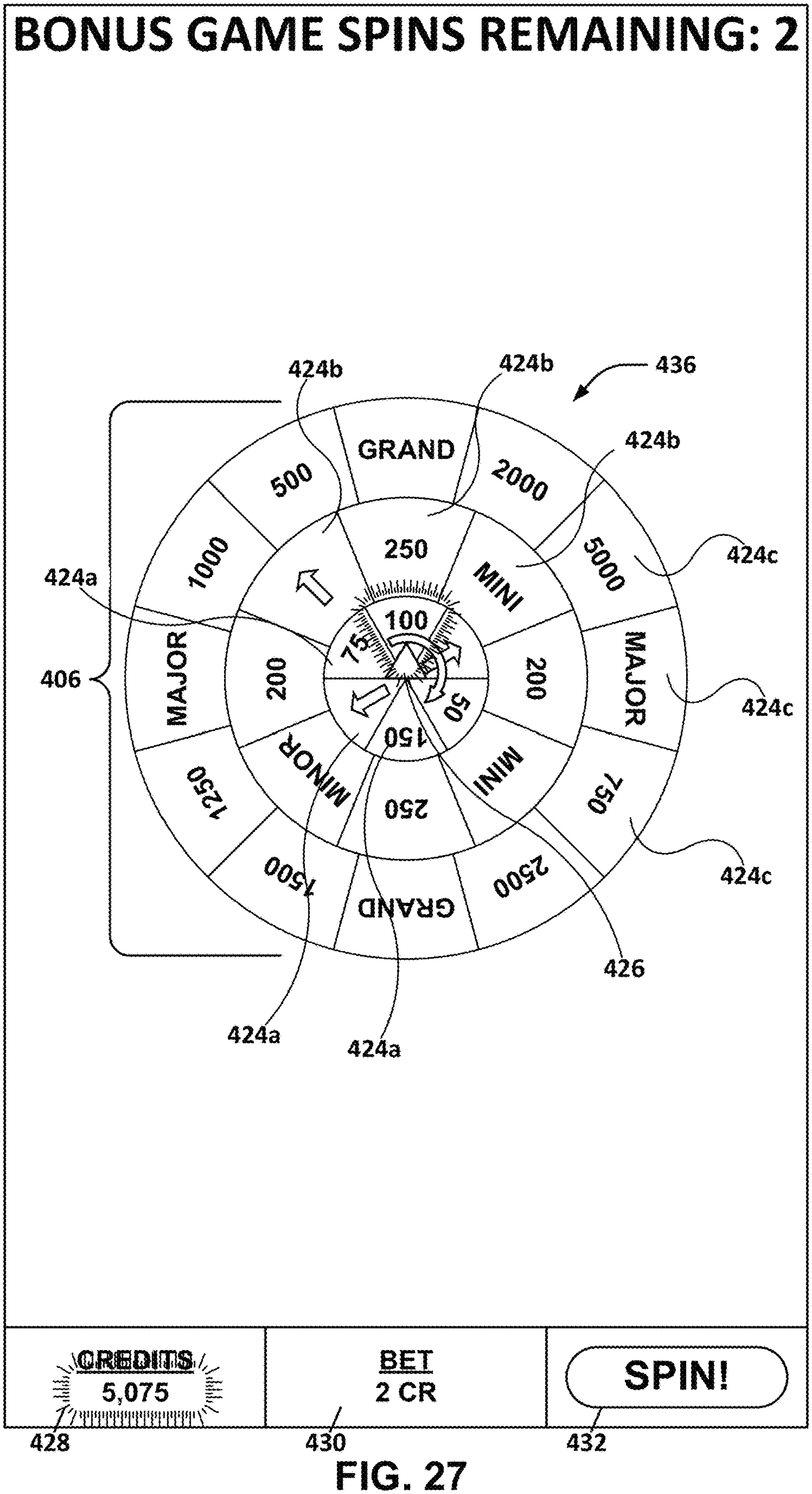

FIG. 27 depicts the GUI for the bonus game 406 after a first play of the bonus game has occurred. Plays of the bonus game may occur automatically, e.g., shortly after the GUI for the bonus game 406 is displayed or presented, or may occur in response to receipt of an input signal, e.g., a signal generated in response to a player interaction with the play button 432. A play of the bonus game may generally feature the selection of one or more of the outcome indicators, as indicated by a selected outcome indicator, e.g., the pointer indicator 426. In multi-tier bonus games, such as that shown in the example GUI for the bonus game 406 of FIG. 27, the bonus game may, as discussed above, be able to be progressed through several phases.

For example, in the implementation of FIG. 27, the bonus game may, depending on the outcomes of plays of the bonus game, be progressed through multiple different phases. Such a bonus game may initiate in a first phase of the multiple phases. In the first phase, the selected outcome indicator may be selected from the outcome indicators represented by the first wheel segments 424*a*. The first wheel segments 424 may include one or more first wheel segment types, e.g., in FIG. 27, the two first wheel segments 424 with arrows in them. During a bonus game play while the bonus game is in the first phase, at least the first plurality of first wheel segments 424*a* may be caused to rotate about the center point and to then stop so as to cause the pointer indicator 426 to indicate which of the first wheel segments 424*a* is the selected outcome indicator/first wheel segment 424*a*. If a bonus game play during the first phase results in one of the first wheel segments 424*a* of the first wheel segment type being indicated as the selected outcome indicator, then the bonus game may be progressed to the next phase, e.g., a second phase, of bonus game play.

In FIG. 27, the first play of the bonus game has resulted in a first wheel segment 424*a* that is not of the first wheel segment type being the selected outcome indicator. Instead, the selected first wheel segment 424*a* indicates an award value of 100 credits, which is then shown as being added to the credit meter 428. The number of bonus game plays remaining is also decremented by one to indicate that the player has used one of the available three bonus game plays, leaving two bonus game plays remaining. Generally speaking, when all of the available bonus game plays have been exhausted, the bonus game may conclude and the GUI for the bonus game may transition to the GUI for the base game 402. This may potentially include intermediately transitioning to the GUI for the feature game 404 in doing so. For example, in some implementations, the GUI for the bonus game 406 may be presented in between when the bonus game is triggered in the feature game and when the amounts shown on the symbols 414 of the first symbol type 418 are provided to the player, in which case the GUI for the bonus game 406 may first transition back to the GUI for the feature game 404 in order to allow the values indicated on the symbols 414 of the first symbol type 418 to be provided to the player before subsequently transitioning back to the GUI for the base game 402. When the GUI is caused to transition back to the GUI for the base game 402, as will be discussed later below, the columns 410 of symbol positions 408 may be caused to be reset to have only their corresponding base number of symbol positions 408 displayed.

It will be noted that the second wheel segments 424*b* and the third wheel segments 424*c* remain stationary in this example. In other implementations, such additional tiers of wheel segments may also be caused to spin or rotate about the center point during a phase of the bonus game in which they are not selectable.

Figure 28:
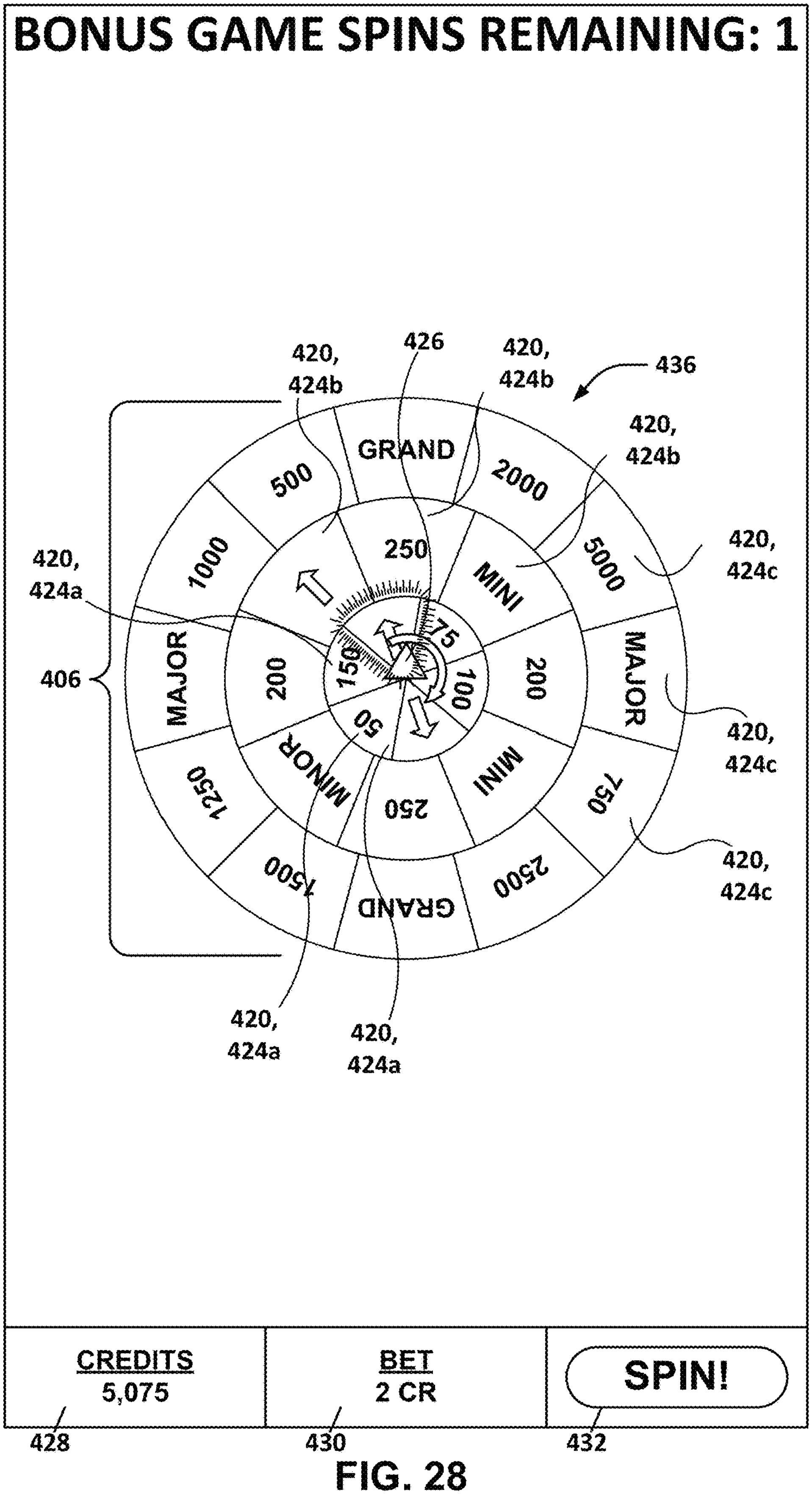
Figure 29:
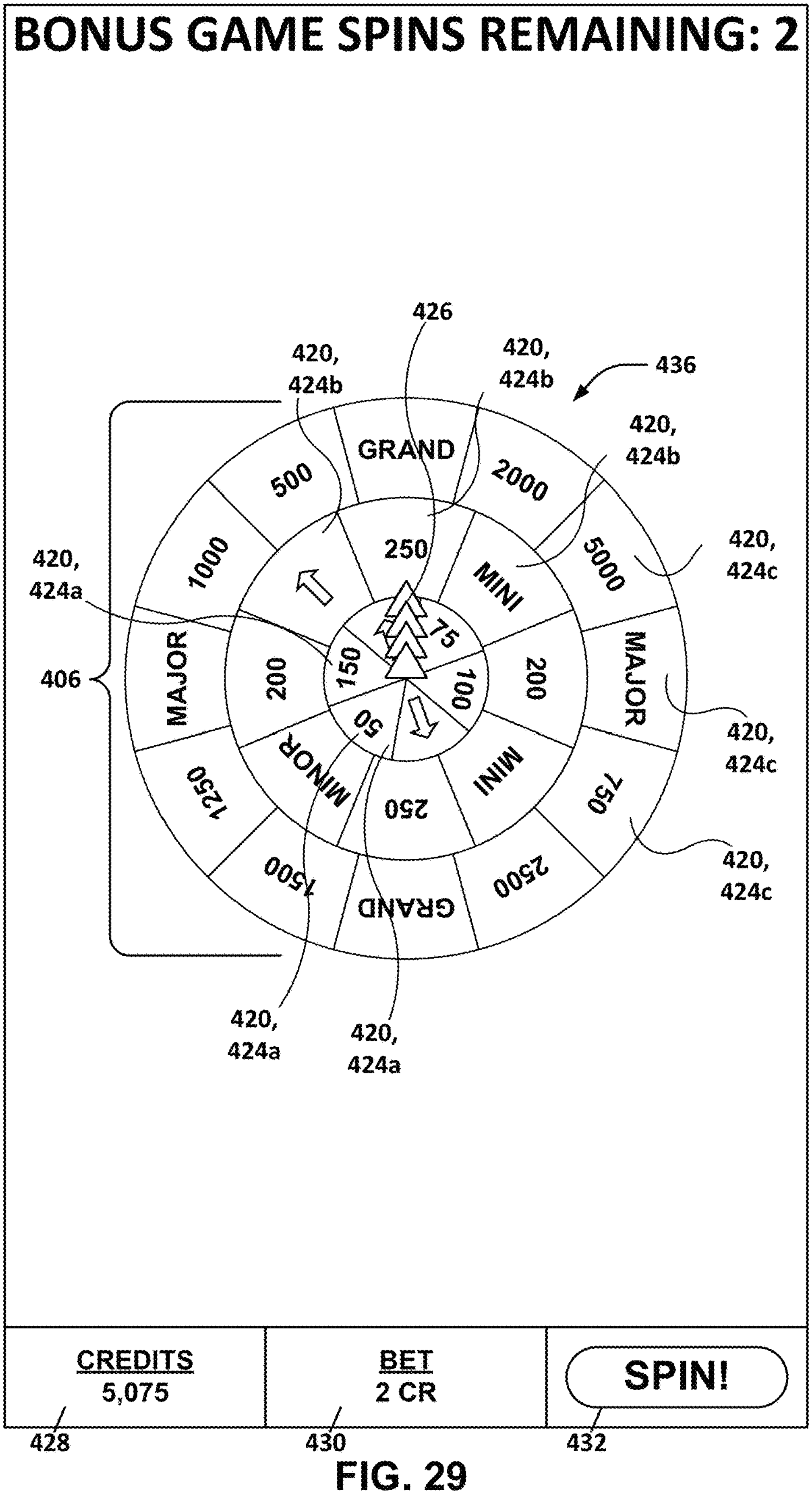

In FIG. 28, a further play of the bonus game has occurred, and the GUI for the bonus game 406 has been updated to reflect a further rotation or "spin" of the first wheel segments 424*a* about the center point. The indication of the number of bonus game plays remaining has been caused to be decremented by one to reflect this. In this case, the selected first wheel segment 424*a* is of the first wheel segment type, e.g., displaying an arrow. Accordingly, the bonus game is caused to transition from the first phase to the second phase. In the example GUI, this is indicated in FIG. 29 by having the pointer indicator 426 move upwards so as to point towards/into one of the second wheel segments 424*b*. However, in other implementations, the pointer indicator 426 may remain unchanged (or, at least, in the same position) and the second wheel segments 424*b* may be caused to extend radially inward, covering up the first wheel segments 424*a* such that the pointer indicator 426 points towards, and into, the second wheel segments 424*b*. In some implementations, a bonus game play that results in such a transition from one bonus game phase to another may also result in the number of bonus game plays that are available being incremented by one additional bonus game play. This is reflected in FIG. 29 by the number of bonus game plays (spins) remaining being indicated as having been incremented back up to two. In at least some such instances of the bonus game, the player may not be provided with any reward other than receiving another play of the bonus game, e.g., the player may not be awarded any points or credits.

In other implementations, if the pointer indicator 426 indicates a first wheel segment 424*a* of the first wheel segment type, thereby causing the bonus game to change from the first phase to the second phase, the player may also be awarded whatever reward is indicated in the second wheel segment 424*b* to which the pointer indicator 426 points as part of that same bonus game play. In such implementations, the player may, in some cases, also be provided with an additional one or more plays of the bonus game in connection with such a bonus game play. However, in other instances, the player may not be provided with any additional bonus game plays in connection with such a bonus game play. Implementations in which the player is provided with a reward indicated by a second wheel segment 424*b* in conjunction with a bonus game play that results in the bonus game transitioning from the first phase to the second phase may be particularly well-suited for instances in which the second wheel segments 424*b* and the third wheel segments 424*c* are also caused to rotate about the center point even during the first phase of the bonus game. This allows for the potential reward that may be provided from the second wheel segments 424*b* should the bonus game transition from the first phase to the second phase to change with each play of the bonus game.

Similar conventions to those discussed above and below may be followed for other bonus game plays that result in a change in bonus game phase. For example, similar practices may be followed for bonus game plays that result in a change from the second phase of the bonus game to the third phase of the bonus game, although with respect to the second wheel segments 424*b* and the third wheel segments 424*c*.

It will also be understood that the wheel segment types that, when indicated by the pointer indicator 426 as a result of a play of the bonus game, may result in a change in phase of the bonus game may also, in some cases, cause the player to be provided with an award of credits or points. Thus, in such implementations, the selection and indication of a first wheel segment 424*a* that is of such a first wheel segment type may not only cause the bonus game to transition from the first phase to the second phase but may also cause the player to be provided with an amount of credits or points associated with the first wheel segment.

In some implementations, one or more of the wheel segments for a given tier of wheel segments may have no effect when selected as a result of a play of the bonus game (aside from causing a play of the bonus game to be expended). Such wheel segments, for example, have no point or credit award indicated and are also not wheel segments of the first type of wheel segment (or equivalent for higher tiers). In some additional or alternative implementations, one or more of the wheel segments may provide rewards that affect play of the bonus game or that affect future or past rewards. For example, one or more of the wheel segments in a particular tier or tiers of wheel segments may be wheel segments that, when selected as the result of a bonus game play, cause the number of remaining bonus game plays available to the player to be incremented by some number, e.g., a number specified on such a wheel segment or a number that is randomly selected from a range of potential numbers. For example, such a wheel segment may, when selected, cause the number of remaining bonus game plays to be incremented by between 1 and 3 additional bonus game plays (with the actual number of additional bonus game plays being displayed at the time the wheel segment is selected (or thereafter)). In another example, one or more of the wheel segments in a particular tier or tiers of wheel segments may be wheel segments that, when selected as the result of a bonus game play, cause a multiplier to be applied to the next point or credit reward that the player may be provided with as a result of bonus game play or, alternatively, a multiplier to be applied to the most recent point or credit reward that the player was provided with as a result of bonus game play.

Figure 30:
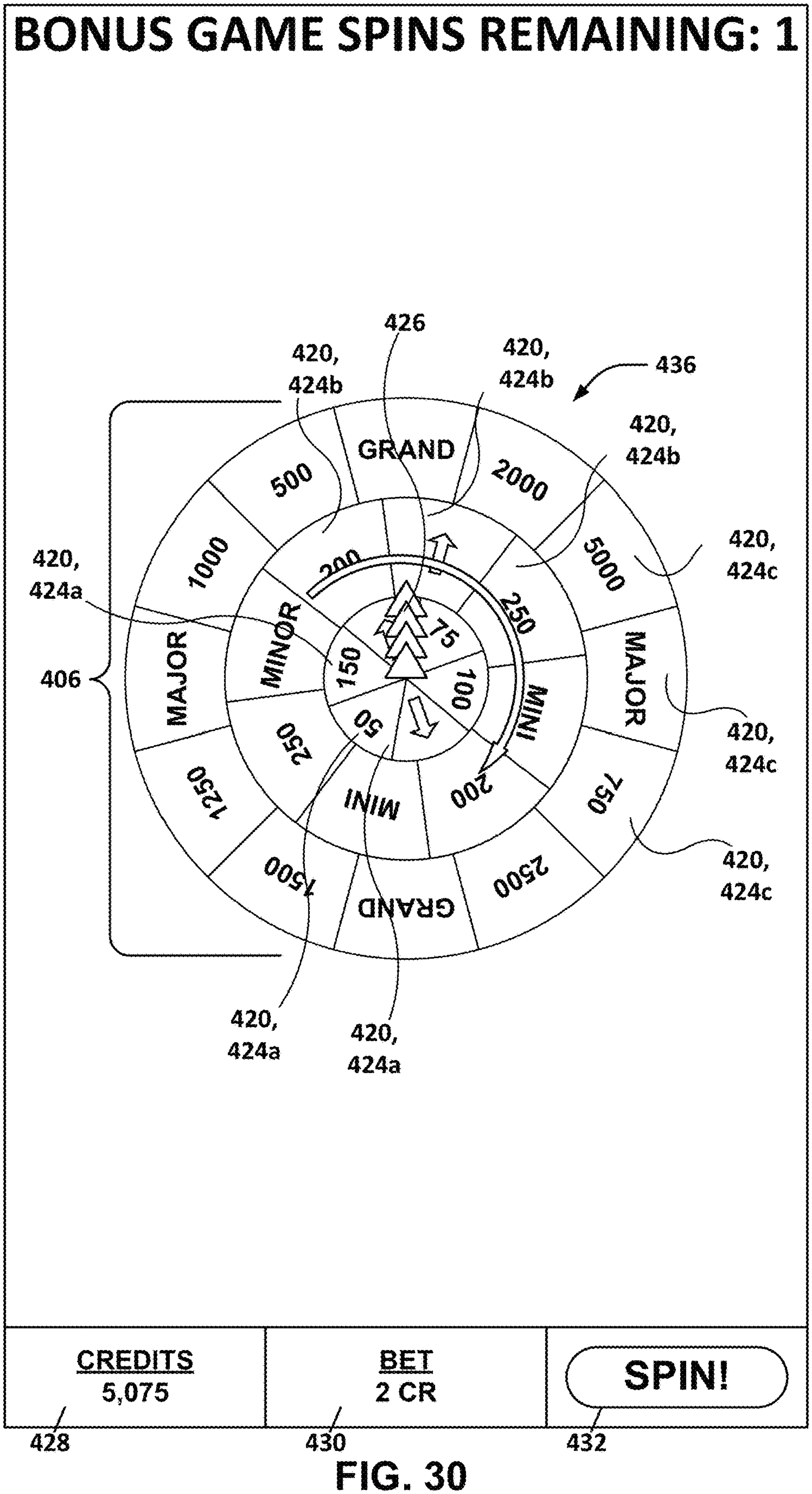

If there are remaining plays of the bonus game available after the phase of the bonus game is advanced, e.g., as is the case in FIG. 29, then the remaining plays of the bonus game may occur using the tier of wheel segments 424 associated with the current phase of the bonus game. This is depicted in FIG. 30, in which a further bonus game play has been initiated, resulting in the number of available plays of the bonus game being decremented by one and in the second wheel segments 424*b* being rotated about the center point to allow for a selection of a particular second wheel segment 424*b* by the pointer indicator 426. In FIG. 30, the depicted play of the bonus game has resulted in a second wheel segment 424*b* of a second wheel segment type being selected. The second wheel segment types may operate in a similar manner to the first wheel segment types but may instead trigger a transition from the second phase of the bonus game to a third phase of the bonus game, e.g., where outcome indicators are selected from the third wheel segments 424*c*, instead of a transition from the first phase of the bonus game to the second phase of the bonus game. It will be appreciated that similar such conventions may be followed for multi-tier wheel-based bonus games featuring additional tiers of wheel segments 424 beyond the three tiers depicted. For example, such wheel-based bonus games may include four, five, six, seven, eight, nine, ten, etc. tiers of wheel segments, each of which would be active in a corresponding phase of the bonus game.

It will also be appreciated that the wheel-based bonus games discussed herein may have fewer tiers, e.g., two tiers, or even no tiers (which may also be thought of as a single-tier wheel-based bonus game).

Figure 31:
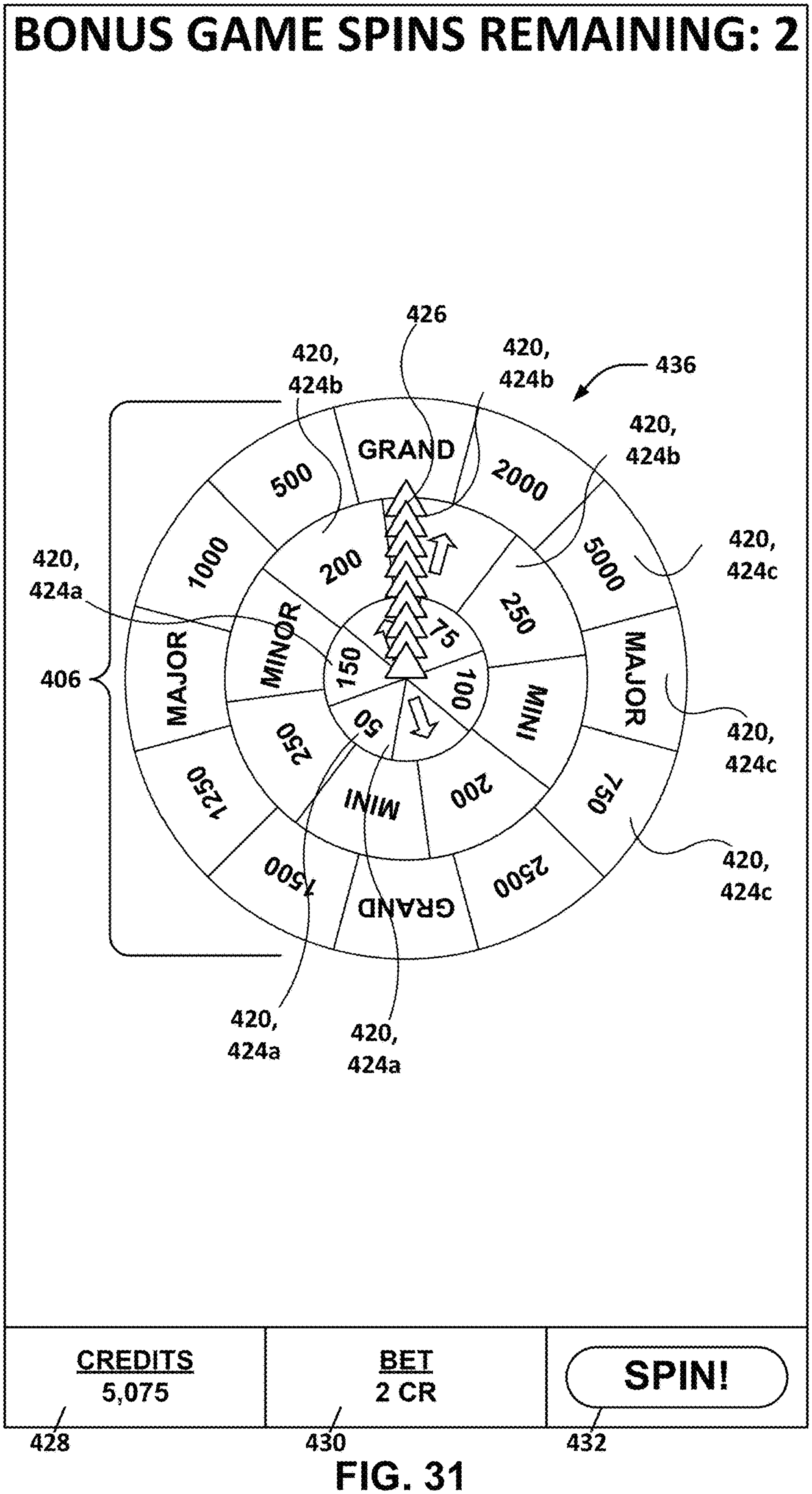

In FIG. 31, the GUI for the bonus game 406 has been updated to reflect that the pointer indicator 426 has moved upwards again and now points at, and into, the third wheel segments 424*c*. Additionally, the number of bonus game plays remaining has been incremented by one, as indicated in the text indicator along the top of the GUI for the bonus game 406 of the number of bonus game plays remaining.

Figure 32:
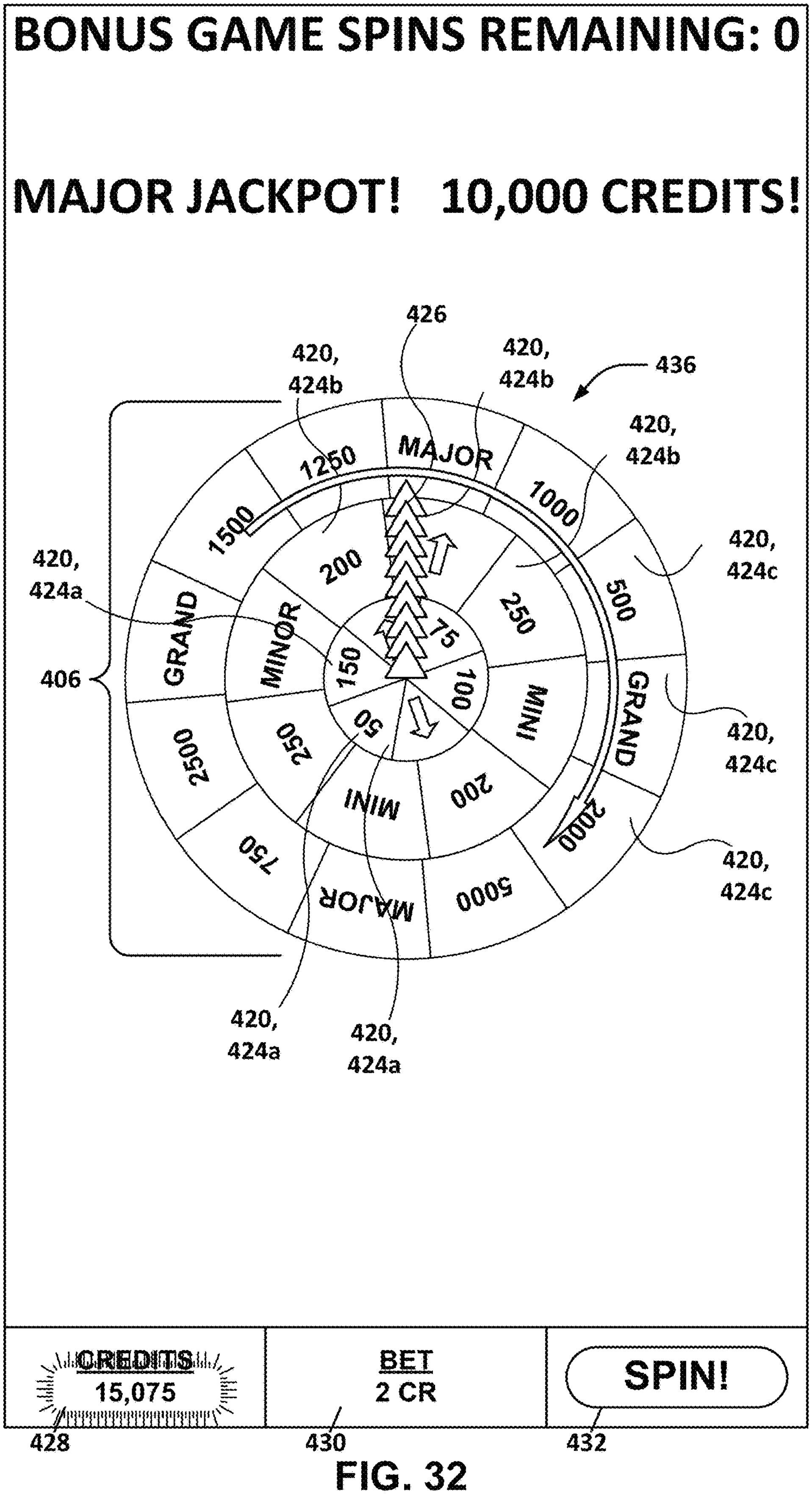

In FIG. 32, the GUI for the bonus game 406 is shown after two additional bonus game plays have occurred subsequent to the presentation of the GUI for the bonus game 406 shown in FIG. 31. As can be seen, the number of bonus game plays remaining has reached zero (and no further increments of the number of such bonus game plays remaining have been provided as a result of the most recent bonus game play). The earlier of the two additional bonus game plays resulted in the third wheel segment 424*c* indicating "500" being selected as the selected outcome indicator, resulting in 500 additional credits being provided to the player, as reflected in the total credits in credit meter 428. The last bonus game play, however, resulted in the third wheel segment 424*c* indicating "MAJOR" being selected as the selected outcome indicator. In this case, the MAJOR award that is provided to the player is an amount of 10,000 credits, which is also reflected in the amount indicated in the credit meter 428. The third wheel segments 424*c* with MINI, MINOR, MAJOR, and GRAND indicated therein may, when selected as selected outcome indicators, cause associated credit values to be provided to the player. Such values may be fixed or may, for example, be progressive, depending on the nature of the bonus game. Generally speaking, however, more credits or points may be won when a wheel segment with GRAND on it is selected than when a wheel segment with MAJOR on it is selected, and more credits or points may be won when a wheel segment with MAJOR on it is selected than when a wheel segment with MINOR on it is selected, and more credits or points may be won when a wheel segment with MINOR on it is selected than when a wheel segment with MINI on it is selected.

Once the bonus game has concluded, the GUI for the bonus game 406 may be caused to transition back to the GUI for the base game 402 (potentially with an intermediate transition to the GUI for the feature game 404, as discussed earlier). When the GUI is caused to transition from the GUI for the feature game 404 to the GUI for the base game 402 without an intervening transition to the GUI for the bonus game 406, the columns 410 of symbol positions 408 are caused to be presented in the GUI for the base game 402 with the same numbers of symbol positions 408 they had in the GUI for the feature game 404 when the feature game concluded. Thus, any expansion of the number of symbol positions 408 in each column 410 is maintained in the GUI for the base game 402. However, when the GUI is caused to transition from the GUI for the feature game 404 to the GUI for the base game 402 with an intervening presentation of the GUI for the bonus game 406, e.g., responsive to presentation and conclusion of the bonus game, the columns 410 of symbol positions 408 are caused to be presented in the GUI for the base game 402 with the only their corresponding base numbers of symbol positions 408 displayed. This, in effect, "resets" the base game.

It will be recognized that a variety of underlying mechanisms may be used to determine outcomes for games such as those described above. However, one potential approach that may be followed is outlined below.

In some implementations, a plurality of different sets of ordered sequences of symbols, e.g., reel strip sets, may be defined. Such reel strip sets may, for example, be designed to produce different base game play experiences, e.g., having a greater or lesser likelihood of triggering the feature game or having a greater or lesser chance of generating a winning symbol pattern during base game play, when symbols are selected for display in the symbol positions 408 of the columns 410 from the reel strip sets. Generally speaking, each set of ordered sequences of symbols may have one ordered sequence of symbols for each column 410 of symbol positions 408. When such a set of ordered sequences of symbols is used to determine an outcome for the base game, a block of sequentially adjacent symbols (as discussed earlier) may be selected from each ordered sequence of symbols and the symbols in that block of sequentially adjacent symbols may then be displayed, in the same sequence, in the symbol positions 408 of a corresponding one of the columns 410 (and as noted earlier, such ordered sequences may be circular or modulo sequences such that when blocks of sequentially adjacent symbols are selected that straddle the start or end of the sequence, symbols from the other of the start or end of the sequence are used to complete the block of symbols).

As noted above, there may be a plurality of sets of ordered sequences of symbols that may be usable for selecting symbols for display in the columns 410 of symbol positions 408 for each play of the base game. The particular set of ordered sequences of symbols that is used for symbol selection for any given play of the base game may, in some instances, be randomly selected from the plurality of sets of ordered sequences of symbols in association with that play of the base game. Such random selection may, for example, be a weighted random selection in which weighting factors assigned to each set of ordered sequences of symbols may determine the likelihood of any particular ordered sequence of symbols being randomly selected from the plurality of sets of ordered sequences of symbols. In some such implementations, there may be different weighting factors assigned to the sets of ordered sequences of symbols depending on, for example, the number of symbol positions 408 that are in each column 410.

For example, for the GUI for the base game discussed above with respect to FIGS. 4 and 5, there may be up to 18 different permutations of symbol positions 408 in the columns 410. FIG. 33 depicts a table summarizing these 18 different permutations. It will be noted that there is no permutation for all of the columns 410 having their maximum number of symbol positions 408 since such a condition would, in the depicted example, have caused the bonus game to trigger after the feature game concluded and would thus have caused the columns 410, on returning to the GUI for the base game 402, to revert back to including only their respective baseline numbers of symbol positions 408 (there is thus no opportunity to play the base game with all columns 410 having their maximum number of symbol positions).

Each such permutation of symbol positions 408 in the columns 410 may be associated with a different weight for each set of ordered sequences of symbols. This is partially illustrated, for example, in FIG. 34, which shows a table listing the 18 different permutations of symbol positions 408 of FIG. 33 as rows and different sets of ordered sequences of symbols as columns. As can be seen, each set of ordered sequences of symbols may have a corresponding weight assigned to it for each permutation of symbol positions 408 in the columns 410. In FIG. 34, there are X total sets of ordered sequences of symbols, but the table only shows the weights for six of the sets of ordered sequences of symbols; the others are omitted to allow the Figure to be of a readable size.

In this example, the weights for a given set of ordered sequences of symbols are set to zero for many of the permutations of symbol positions 408 in the columns 410; in such instances, such a set of ordered sequences of symbols would not be selected for use in determining an outcome when such permutations of symbol positions 408 in the columns 410 are present. By appropriately selecting the weights for each set of ordered sequences of symbols for each permutation of symbol positions 408 in the columns 410, it is possible to use some sets of ordered sequences of symbols when the columns have smaller numbers of symbol positions and other sets of ordered sequences of symbols when the columns have larger numbers of symbol positions. This allows the frequency with which the feature game is to be triggered to be managed with more control, e.g., using sets of ordered sequences of symbols that have a higher chance of triggering the feature game when there are fewer symbol positions 408 present and using sets of ordered sequences of symbols that have a lower chance of triggering the feature game when there are more symbol positions 408 present.

It will be appreciated that the ordered sequences of symbols discussed herein may be of any suitable type of ordered sequence used in games involving symbol selection. For example, such an ordered sequence of symbols may be a static ordered sequence of symbols in which the ordered sequence remains the same between instances in which the ordered sequence of symbols is used in determining an outcome. In other instances, aspects of one or more of the symbols in an ordered sequence of symbols may vary in some manner between instances in which the ordered sequence of symbols is used in determining an outcome. For example, an ordered sequence of symbols may have one or more symbols that are dynamic symbols that may, when selected be replaced by a different symbol, e.g., a symbol randomly selected from a set of symbols. In additional or alternative implementations, an ordered sequence of symbols may include one or more symbols that may, for example, each be replaced by one or more other symbols selected from a set of symbols or a set of symbol sets.

In this example, during feature game play, the symbols that are selected for display in each symbol position may be randomly selected from one of a plurality of different sets of symbols. Each such set of symbols may be associated with a different column 410 of symbol positions and a different number of "held" symbols in that column. Each such set of symbols may also be configured such that a weighted random selection of a symbol may be made therefrom.

When a symbol is to be selected for a given symbol position 408, the set of symbols that is associated with the number of symbol positions 408 present in the same column 410 as that symbol position 408, as well as with the number of "held" symbols already present in that column 410, may be selected and the symbol for display in that symbol position 408 may then be randomly selected therefrom.

In some implementations, there may also be separate such sets of symbols that may be used for symbol selection based on whether or not the column 410 that includes the symbol position 408 for which a symbol is being selected has experienced expansion, e.g., by adding a symbol position 408 thereto, since the feature game was most recently initiated (i.e., since the GUI for the base game 402 was most recently caused to transition to displaying the GUI for the feature game 404).

FIG. 35 depicts a table representing an example of such sets of symbols for the left column 410 of symbol positions 408. The other two columns 410 of symbol positions may have corresponding sets of symbols as well, but are not explicitly discussed here in the interest of brevity. The leftmost column (column A) in the table indicates a number representing a position within the respective sets of symbols; each column (columns B-V) in the table to the right of the leftmost column in the table represents the symbols that are in a respective set of symbols. Only the first ten symbols are shown for each set of symbols, but it will be understood that each set of symbols may have dozens, hundreds, or even thousands of symbols. In the depicted table, two different types of symbols are represented—symbols of the first symbol type 418 (which are represented by "X" and have shaded table cells) and symbols that are not of the first symbol type 418 (which are represented by "O"). It will be understood that the symbols represented by "X" may include a variety of different symbols, i.e., they need not all be identical, that are all of the first symbol type. Similarly, the symbols represented by "O" may also include a variety of different symbols that are all of a symbol type other than the first symbol type.

As can be seen, the sets of symbols represented by columns B-M are for use with symbol positions 408 that are in columns 410 that have not had any symbol positions 408 added thereto since play of the feature game was initiated. Thus, for example, if the left column 410 had an additional symbol position or positions 408 added in a previous instance or instances of the feature game but has not had any symbol position 408 added during the current instance of the feature game, or if the left column 410 had only its baseline number of symbol positions, a symbol position in the left column 410 would be caused to display a symbol drawn from one of the sets of symbols represented by columns E-M. However, once such a symbol position 408 is added to the left column 410 of symbol positions 408 during the current instance of the feature game (with the instance of the feature game referring to the presentation of the feature game starting with the initiation of the feature game and ending with the conclusion of the feature game), subsequent selections of symbols for symbol positions 408 in the left column 410 may be made from the sets of symbols represented in columns N through V.

It can also be seen that the sets of symbols represented in the table of FIG. 35 are also further subdivided into sets of symbols that are each associated with a different number of symbol positions 408 in the left column 410 and with a different number of "held" symbols displayed within the left column 410. When a symbol is to be selected for display in a symbol position 408 of the left column 410, the set of symbols that the symbol is selected from may be selected based on such parameters. For example, if the left column 410 of symbol positions includes five symbol positions—all of which were added in previous instances of the feature game—and three of those symbol positions presently display "held" symbols (i.e., previously displayed symbols of the first symbol type 418 that have persisted), then the set of symbols represented in by column L may be selected and a symbol for display in such a symbol position 408 selected therefrom.

As is suggested in FIG. 35, in some implementations, the sets of symbols used to provide symbols for display in the symbol positions 408 of columns 410 that have not yet had a symbol position 408 added during the current instance of the feature game may have a higher frequency of occurrence of symbols of the first symbol type than the sets of symbols used to provide symbols for display in the symbol positions 408 of columns 410 that have had a symbol position 408 added during the current instance of the feature game. This has the effect of increasing the chance of having a column 410 of symbol positions 408 expanding by an additional symbol position 408 when no such expansion of that column 410 has occurred during the present instance of the feature game, but then decreasing (or even eliminating) the chance for further expansion of the column 410 within the current instance of the feature game after that.

It will be appreciated that the sets of symbols referred to above may be a list of symbols, with each instance of a symbol in the list having an equal chance of being randomly selected, or may be a weighted list, e.g., with symbols in the list having unequal chances of being randomly selected. In some instances, the set of symbols may have only two symbols—symbols of the first symbol type and symbols of a type other than the first symbol type. In some implementations, the latter may be a "blank" symbol. In implementations with only two symbols, different weights may be assigned to the two symbols such that they each have a corresponding probability of being randomly selected during play of the feature game.

In some implementations, the selection of a selected outcome indicator for the bonus game may also be by weighted random selection. For example, in the wheel display 436, the wheel segments 424 in each set of wheel segments 424 may be assigned weights that govern how likely each segment is to be selected during a given bonus game play. In some such implementations, there may be different weights assigned to the outcome indicators for different phases of the bonus depending on how many bonus game plays were available to the player at the start of each phase.

For example, FIG. 36 depicts weighting tables for each of the first wheel segments 424*a*, the second wheel segments 424*b*, and the third wheel segments 424*c*. The entries shown in the left-most column of each weighting table list the various outcome indicators that are represented by the first wheel segments 424*a*, the second wheel segments 424*b*, and the third wheel segments 424*c*. Each column to the right of the leftmost column in each table represents weights that are associated with each of the outcome indicators. Each different such column provides weights that are to be used when making a random selection from the wheel segments in use during a particular phase of the bonus game. The exact column of weights that is used in a particular phase may be selected based on how many bonus game plays (spins of the wheel display 436) are available to the player at the start of that phase. Thus, for example, if the player triggers the second phase and has two bonus game plays remaining at the initiation of the second phase, then the selection of an outcome indicator using the wheel display 436 may be made using the weights in the middle column of the table listing the "second wheel segments" in the upper left corner.

Implementations such as those discussed above allow for the GUIs that are presented herein to be used to present a game of chance that is easily displayed, e.g., on compact displays such as on smartphones, while still providing a level of depth of play that may typically be expected in games of chance that may require much larger displays.

It will be understood that the various GUIs and game mechanics discussed herein may be implemented entirely locally, e.g., by a processor or processors of a single device, such as a smartphone, or may be provided using processors located in different devices or systems. Information regarding the selection of symbols, awards associated with special symbols, etc., may be transmitted, e.g., via a network connection (wired, wireless, or a mixture of both) to another device, e.g., a smartphone, the processor or processors of which may then implement the GUI and/or feature game mechanic using the information regarding the symbols, awards, etc. Such information may be generated and/or sent in response to receipt of a request from such another device, e.g., a request from a smartphone for the server to provide such information. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting symbols stored on one or more memory devices of a server, while computer-executable instructions presenting the GUI.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.

b) The client device stores instructions for causing A, B, and C to occur, but the server stores no instructions that cause A, B, and C to occur.

c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.

d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.

e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.

b) The second set of one or more processors may be caused to perform each of A, B, and C, and the first set of one or more processors may not perform any of A, B, or C.

c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.

d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more displays;

one or more processors; and one or more memory devices, the one or more memory devices storing computer-executable instructions which, when executed by the one or more processors, cause the one or more processors to:

cause a graphical user interface (GUI) for a base game of chance to be presented on the one or more displays, the GUI including a plurality of symbol positions arranged into X adjacent columns, each column having a corresponding base number of symbol positions;

cause, responsive to each receipt of a signal indicating a play of the base game of chance, each symbol position of the plurality of symbol positions to display a corresponding symbol having a symbol type selected from a plurality of different symbol types, the different symbol types including at least a first symbol type;

cause, responsive to a first triggering condition being met, a feature game to be initiated and a GUI for the feature game to be presented on the one or more displays, wherein the GUI for the feature game that is presented includes the plurality of symbol positions and any of the symbols of the first symbol type that are displayed in the symbol positions;

cause, responsive to each receipt of a signal indicating a play of the feature game and for each of the symbol positions not displaying a symbol of the first symbol type, a symbol of one of the symbol types to be selected and displayed in that symbol position as part of the play of the feature game;

cause, for each column having less than a corresponding maximum number of symbol positions and in which the symbol displayed in each symbol position of that column as a result of a play of the feature game is of the first type of symbol:

an additional symbol position to be added to that column, and the symbols of the first symbol type displayed in the symbol positions of that column to cease to be displayed in the symbol positions of that column;

cause, responsive at least in part to a first column of the X columns having the corresponding maximum number of symbol positions, a bonus game to be initiated and a GUI for the bonus game to be presented on the one or more displays, the GUI for the bonus game including a plurality of outcome indicators; and cause, responsive to each receipt of a signal indicating a play of the bonus game, one of the outcome indicators to be indicated as a selected outcome indicator by the GUI for the bonus game.

2. The system of claim 1, wherein the one or more memory devices further store additional computer-executable instructions which, when executed by the one or more processors, further cause the one or more processors to cause the GUI for the base game to be presented again, inclusive of any additional symbol positions added to any of the columns, responsive to a conclusion of the feature game that does not result in presentation of the GUI for the bonus game.

3. The system of claim 2, wherein the one or more memory devices further store additional computer-executable instructions which, when executed by the one or more processors, further cause the one or more processors to cause the GUI for the base game to be presented again, with each column of symbol positions including only the corresponding base number of symbol positions, responsive to a conclusion of the bonus game.

4. The system of claim 1, wherein X is an odd number and the first column is the middle column of the X columns.

5. The system of claim 1, wherein the one or more memory devices further store additional computer-executable instructions which, when executed by the one or more processors, further cause the one or more processors to:

cause the GUI for the bonus game to be presented on the one or more displays when the first column has the corresponding maximum number of symbol positions and the feature game has concluded cause the feature game to conclude responsive to a number of plays of the feature game since the feature game was initiated exceeding a first amount of feature game plays; and cause the first amount of feature game plays to increase by at least one feature game play each time a play of the feature game causes one or more of the symbol positions of the GUI for the feature game to transition to displaying the symbol or symbols of the first symbol type.

6. The system of claim 5, wherein the one or more memory devices further store additional computer-executable instructions which, when executed by the one or more processors, further cause the one or more processors to cause the feature game to also conclude responsive to each of the columns having the corresponding maximum number of symbol positions and all of the symbol positions displaying symbols of the first symbol type.

7. The system of claim 6, wherein the first triggering condition is met when at least Y symbols that are of a triggering symbol type are displayed in the symbol positions.

8. One or more non-transitory computer-readable media storing computer-executable instructions which, when executed by one or more processors, cause the one or more processors to:

cause a graphical user interface (GUI) for a base game of chance to be presented on one or more displays of a gaming device, the GUI including a plurality of symbol positions arranged into X adjacent columns, each column having a corresponding base number of symbol positions;

cause, responsive to each receipt of a signal indicating a play of the base game of chance, each symbol position of the plurality of symbol positions to display a corresponding symbol having a symbol type selected from a plurality of different symbol types, the different symbol types including at least a first symbol type;

cause, responsive to a first triggering condition being met, a feature game to be initiated and a GUI for the feature game to be presented on the one or more displays, wherein the GUI for the feature game that is presented includes the plurality of symbol positions and any of the symbols of the first symbol type that are displayed in the symbol positions;

cause, responsive to each receipt of a signal indicating a play of the feature game and for each of the symbol positions not displaying a symbol of the first symbol type, a symbol of one of the symbol types to be selected and displayed in that symbol position as part of the play of the feature game;

cause, for each column having less than a corresponding maximum number of symbol positions and in which the symbol displayed in each symbol position of that column as a result of a play of the feature game is of the first type of symbol:

an additional symbol position to be added to that column, and the symbols of the first symbol type displayed in the symbol positions of that column to cease to be displayed in the symbol positions of that column;

cause, responsive at least in part to a first column of the X columns having the corresponding maximum number of symbol positions, a bonus game to be initiated and a GUI for the bonus game to be presented on the one or more displays, the GUI for the bonus game including a plurality of outcome indicators; and cause, responsive to each receipt of a signal indicating a play of the bonus game, one of the outcome indicators to be indicated as a selected outcome indicator by the GUI for the bonus game.

9. The one or more non-transitory computer-readable media of claim 8, further storing additional computer-executable instructions which, when executed by the one or more processors, further cause the one or more processors to cause the GUI for the base game to be presented again, inclusive of any additional symbol positions added to any of the columns, responsive to a conclusion of the feature game that does not result in presentation of the GUI for the bonus game.

10. The one or more non-transitory computer-readable media of claim 9, further storing additional computer-executable instructions which, when executed by the one or more processors, further cause the one or more processors to cause the GUI for the base game to be presented again, with each column of symbol positions including only the corresponding base number of symbol positions, responsive to a conclusion of the bonus game.

11. The one or more non-transitory computer-readable media of claim 8, wherein the one or more computer-readable media further store additional computer-executable instructions which, when executed by the one or more processors, cause the one or more processors to cause the GUI for the bonus game to be presented on the one or more displays when the first column has the corresponding maximum number of symbol positions and the feature game has concluded.

12. The one or more non-transitory computer-readable media of claim 11, wherein the one or more computer-readable media further store additional computer-executable instructions which, when executed by the one or more processors, cause the one or more processors to:

cause the feature game to conclude responsive to a number of plays of the feature game since the feature game was initiated exceeding a first amount of feature game plays; and cause the first amount of feature game plays to increase by at least one feature game play each time a play of the feature game causes one or more of the symbol positions of the GUI for the feature game to transition to displaying the symbol or symbols of the first symbol type.

13. The one or more non-transitory computer-readable media of claim 12, wherein the one or more memory devices further store additional computer-executable instructions which, when executed by the one or more processors, further cause the one or more processors to cause the feature game to also conclude responsive to each of the columns having the corresponding maximum number of symbol positions and all of the symbol positions displaying symbols of the first symbol type.

14. The one or more non-transitory computer-readable media of claim 13, wherein the first triggering condition is met when at least Y symbols that are of a triggering symbol type are displayed in the symbol positions.

15. A method comprising:

causing, by one or more processors, a graphical user interface (GUI) for a base game of chance to be presented on one or more displays, the GUI including a plurality of symbol positions arranged into X adjacent columns, each column having a corresponding base number of symbol positions;

causing, by the one or more processors and responsive to each receipt of a signal indicating a play of the base game of chance, each symbol position of the plurality of symbol positions to display a corresponding symbol having a symbol type selected from a plurality of different symbol types, the different symbol types including at least a first symbol type;

causing, by the one or more processors and responsive to a first triggering condition being met, a feature game to be initiated and a GUI for the feature game to be presented on the one or more displays, wherein the GUI for the feature game that is presented includes the plurality of symbol positions and any of the symbols of the first symbol type that are displayed in the symbol positions;

causing, by the one or more processors and responsive to each receipt of a signal indicating a play of the feature game and for each of the symbol positions not displaying a symbol of the first symbol type, a symbol of one of the symbol types to be selected and displayed in that symbol position as part of the play of the feature game;

causing, by the one or more processors and for each column having less than a corresponding maximum number of symbol positions and in which the symbol displayed in each symbol position of that column as a result of a play of the feature game is of the first type of symbol:

an additional symbol position to be added to that column, and the symbols of the first symbol type displayed in the symbol positions of that column to cease to be displayed in the symbol positions of that column;

causing, by the one or more processors and responsive at least in part to a first column of the X columns having the corresponding maximum number of symbol positions, a bonus game to be initiated and a GUI for the bonus game to be presented on the one or more displays, the GUI for the bonus game including a plurality of outcome indicators; and causing, by the one or more processors and responsive to each receipt of a signal indicating a play of the bonus game, one of the outcome indicators to be indicated as a selected outcome indicator by the GUI for the bonus game.

16. The method of claim 15, further comprising causing, by the one or more processors, the GUI for the base game to be presented again, inclusive of any additional symbol positions added to any of the columns, responsive to a conclusion of the feature game that does not result in presentation of the GUI for the bonus game.

17. The method of claim 16, further comprising causing, by the one or more processors, the GUI for the base game to be presented again, with each column of symbol positions including only the corresponding base number of symbol positions, responsive to a conclusion of the bonus game.

18. The method of claim 15, further comprising causing, by the one or more processors, the GUI for the bonus game to be presented on the one or more displays when the first column has the corresponding maximum number of symbol positions and the feature game has concluded.

19. The method of claim 18, further comprising causing, by the one or more processors:

the feature game to conclude responsive to a number of plays of the feature game since the feature game was initiated exceeding a first amount of feature game plays; and the first amount of feature game plays to increase by at least one feature game play each time a play of the feature game causes one or more of the symbol positions of the GUI for the feature game to transition to displaying the symbol or symbols of the first symbol type.

20. The method of claim 19, further comprising causing, by the one or more processors, the feature game to also conclude responsive to each of the columns having the corresponding maximum number of symbol positions and all of the symbol positions displaying symbols of the first symbol type.

* * * * *